April 30, 1935.    W. S. GUBELMANN    1,999,727
CALCULATING MACHINE
Original Filed March 24, 1915    18 Sheets-Sheet 1

INVENTOR
WILLIAM S. GUBELMANN
BY
ATTORNEYS

April 30, 1935.  W. S. GUBELMANN  1,999,727
CALCULATING MACHINE
Original Filed March 24, 1915  18 Sheets-Sheet 3

INVENTOR
WILLIAM S. GUBELMANN
BY
ATTORNEYS

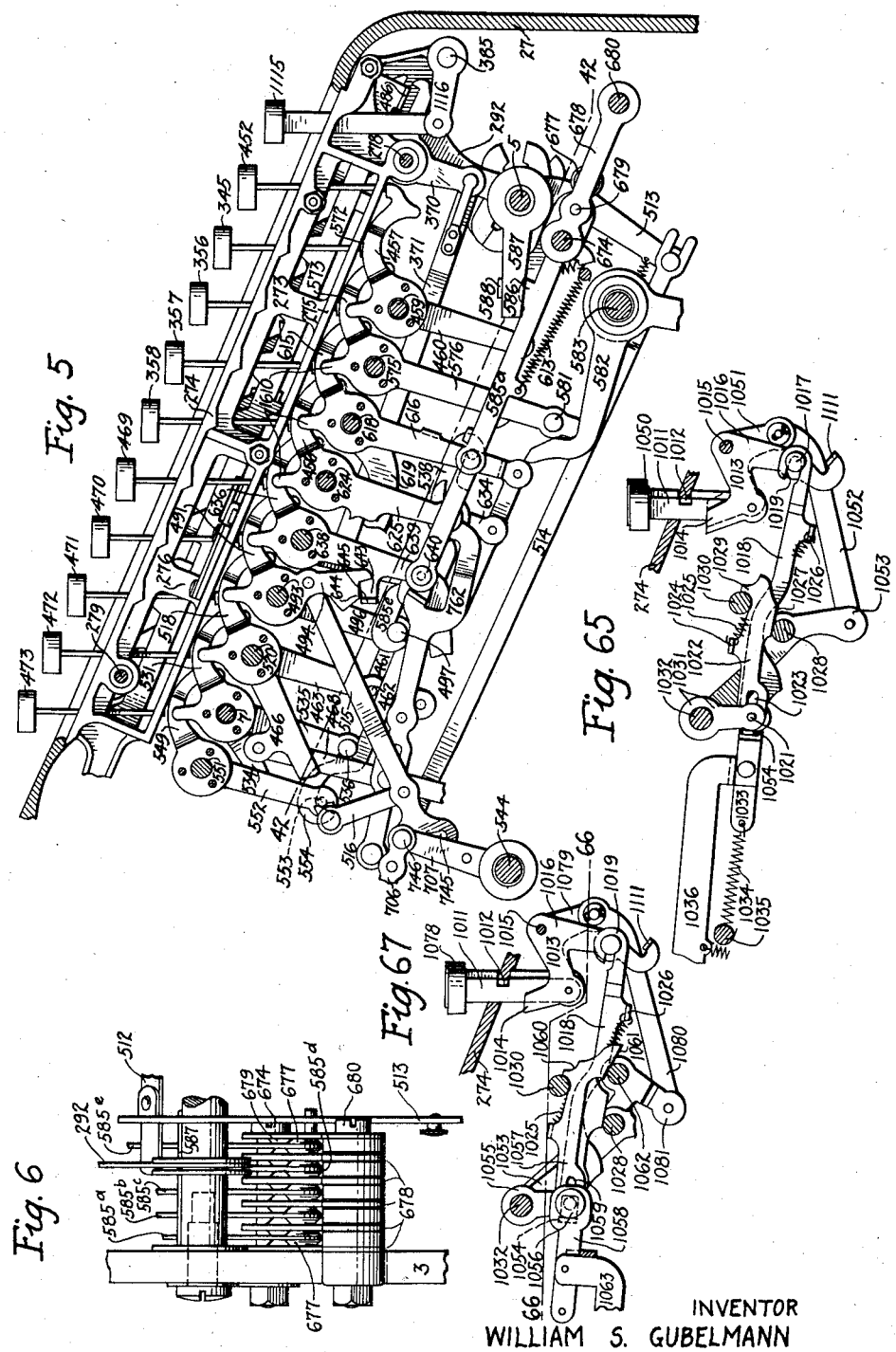

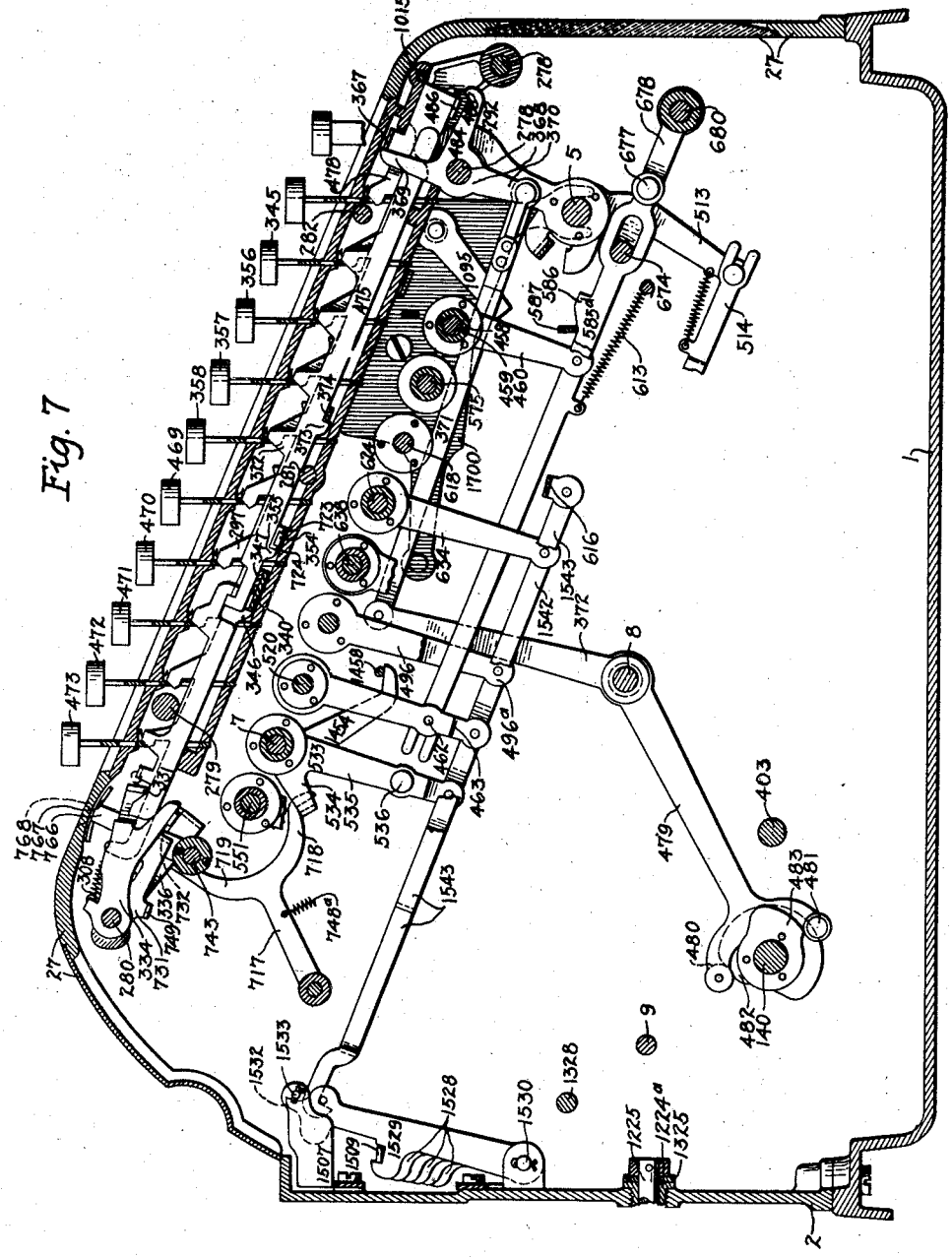

April 30, 1935.   W. S. GUBELMANN   1,999,727
CALCULATING MACHINE
Original Filed March 24, 1915   18 Sheets-Sheet 6

INVENTOR
WILLIAM S. GUBELMANN
BY
ATTORNEYS

April 30, 1935. W. S. GUBELMANN 1,999,727
CALCULATING MACHINE
Original Filed March 24, 1915    18 Sheets-Sheet 7
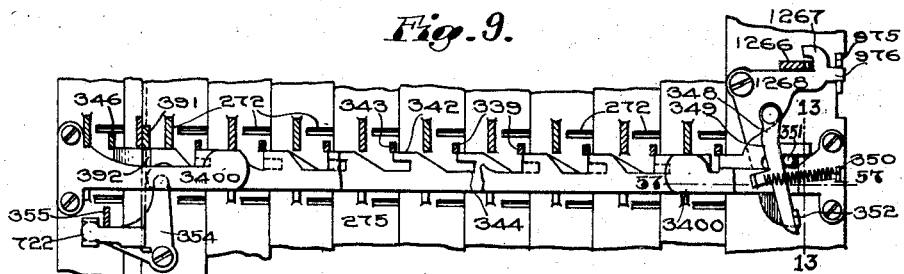
Fig. 9.
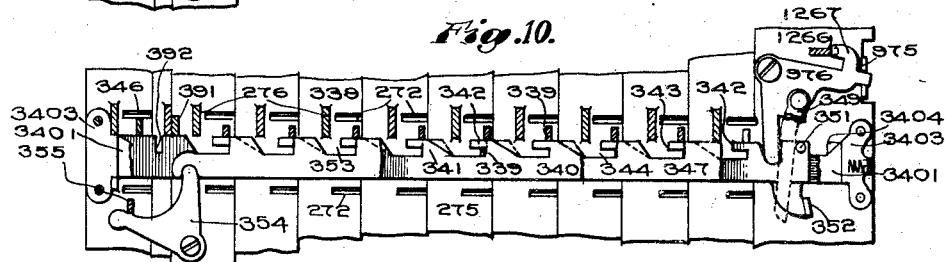
Fig. 10.
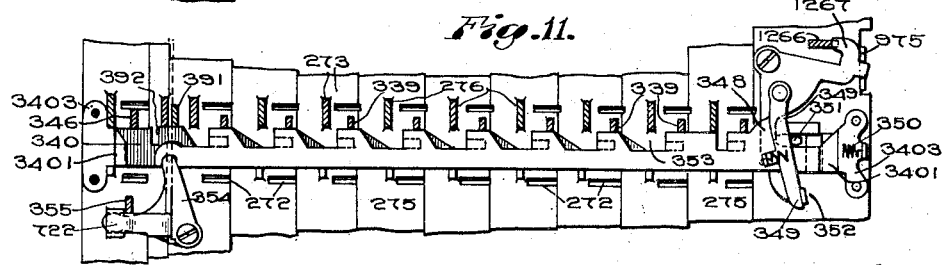
Fig. 11.
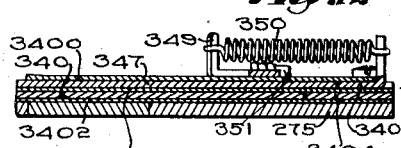
Fig. 12.
Fig. 13
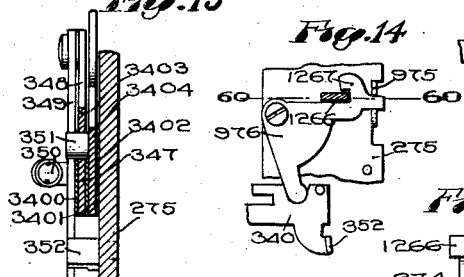
Fig. 14.    Fig. 18
Fig. 15.
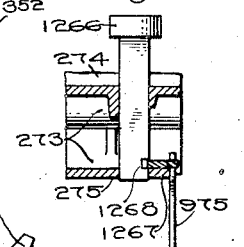
Fig. 16.
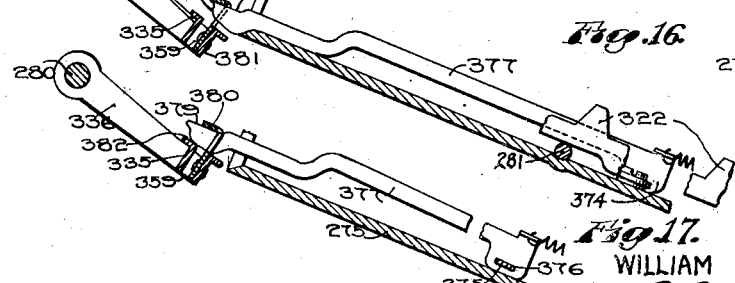
Fig. 17.
INVENTOR
WILLIAM S. GUBELMANN
BY
ATTORNEYS

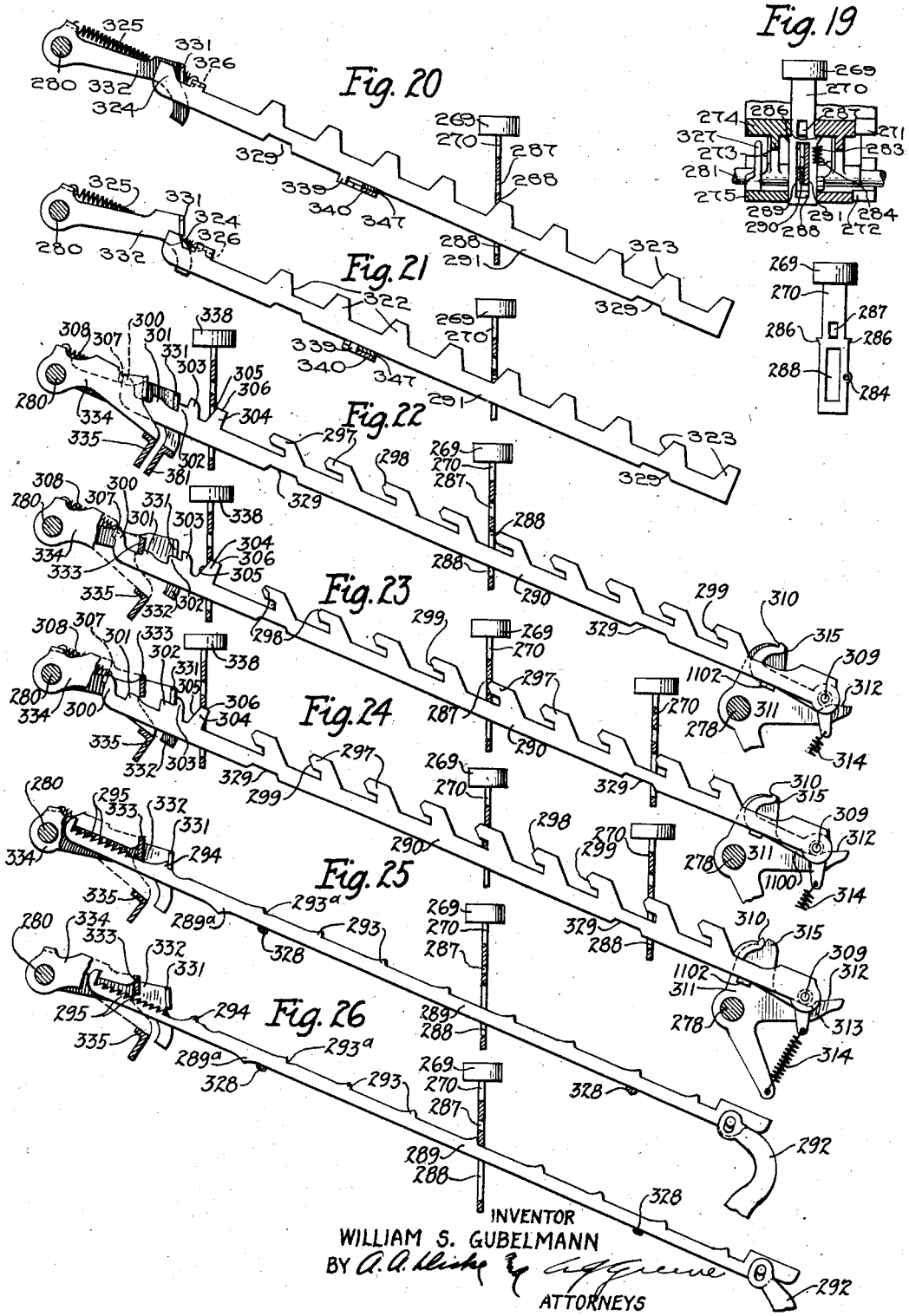

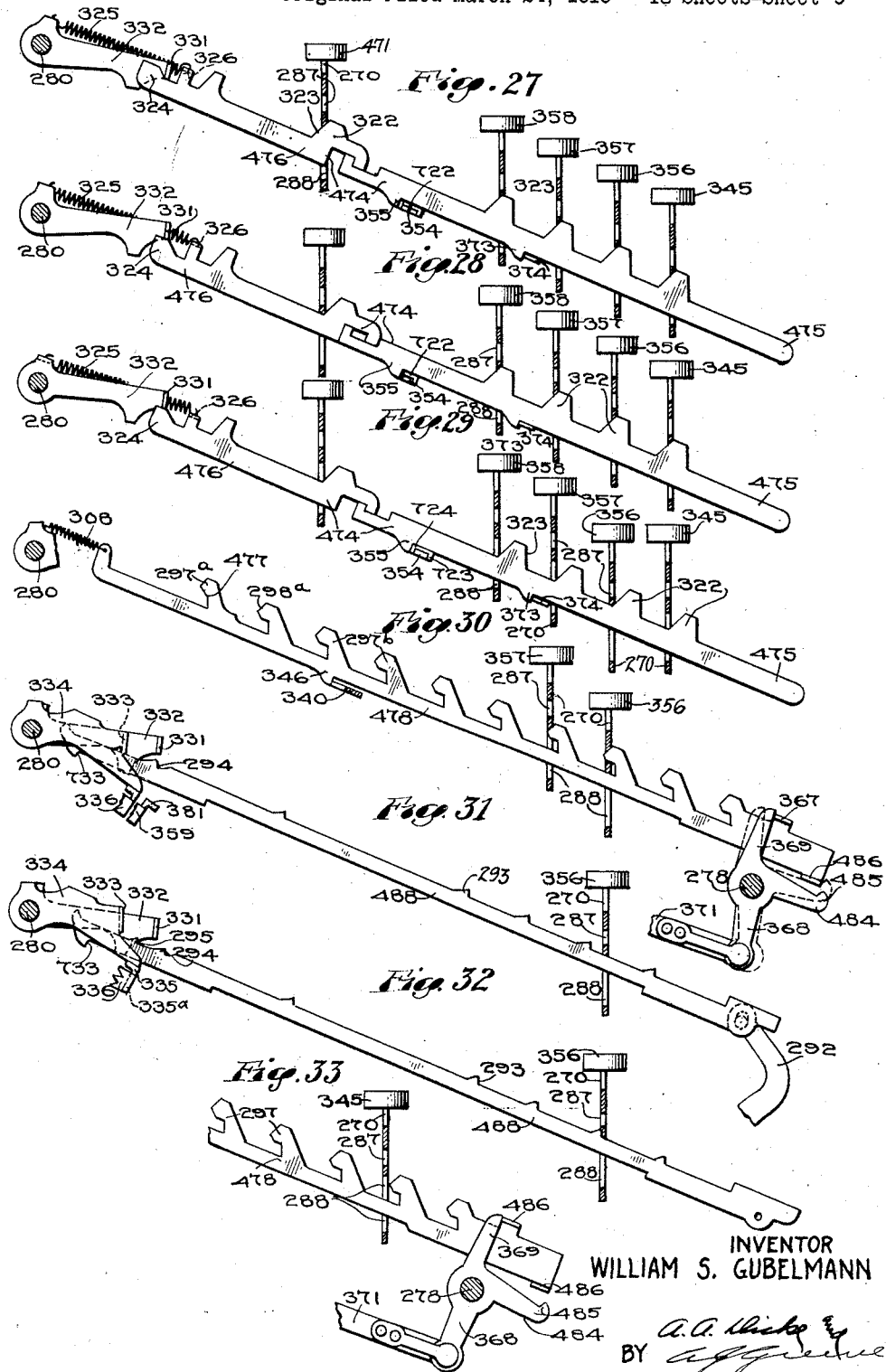

April 30, 1935. W. S. GUBELMANN 1,999,727
CALCULATING MACHINE
Original Filed March 24, 1915 18 Sheets-Sheet 10
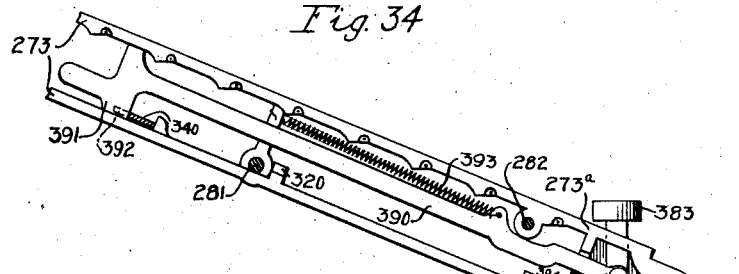
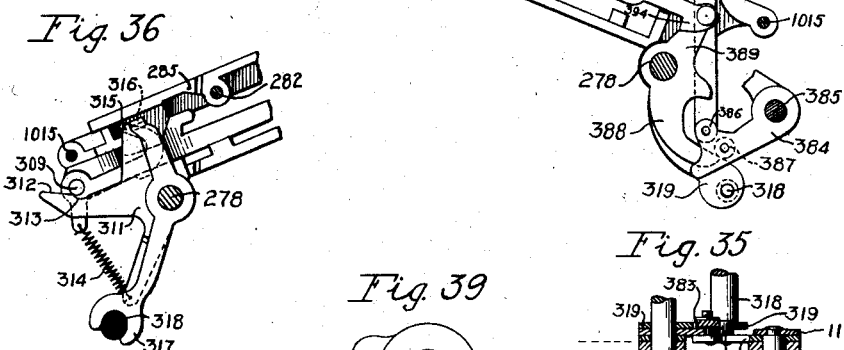
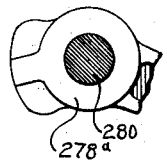
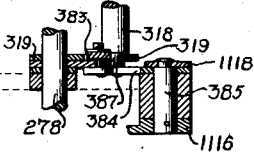
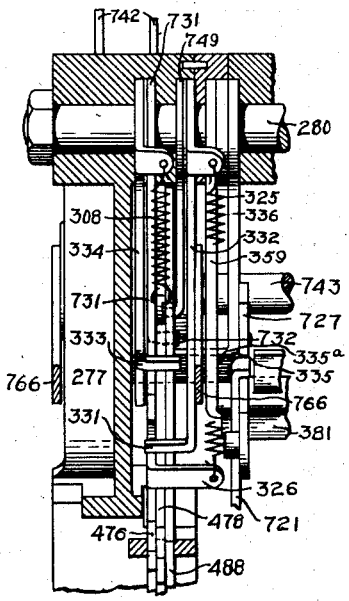
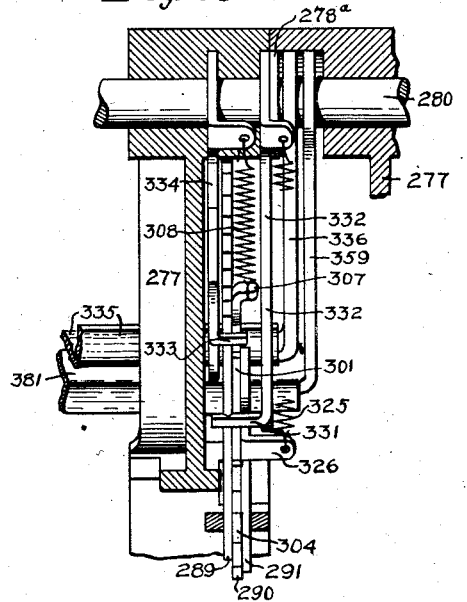
INVENTOR
WILLIAM S. GUBELMANN
BY
ATTORNEYS April 30, 1935.   W. S. GUBELMANN   1,999,727
CALCULATING MACHINE
Original Filed March 24, 1915   18 Sheets-Sheet 11

INVENTOR.
WILLIAM S. GUBELMANN
BY
ATTORNEYS.

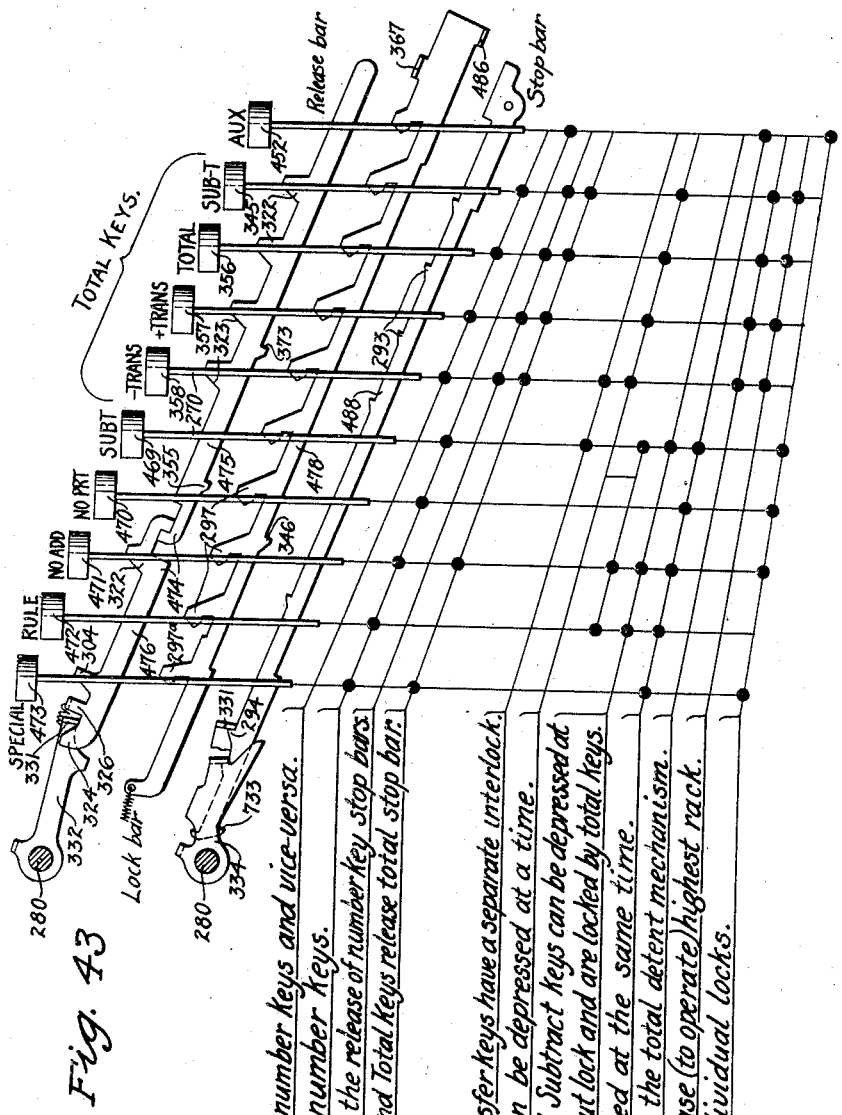

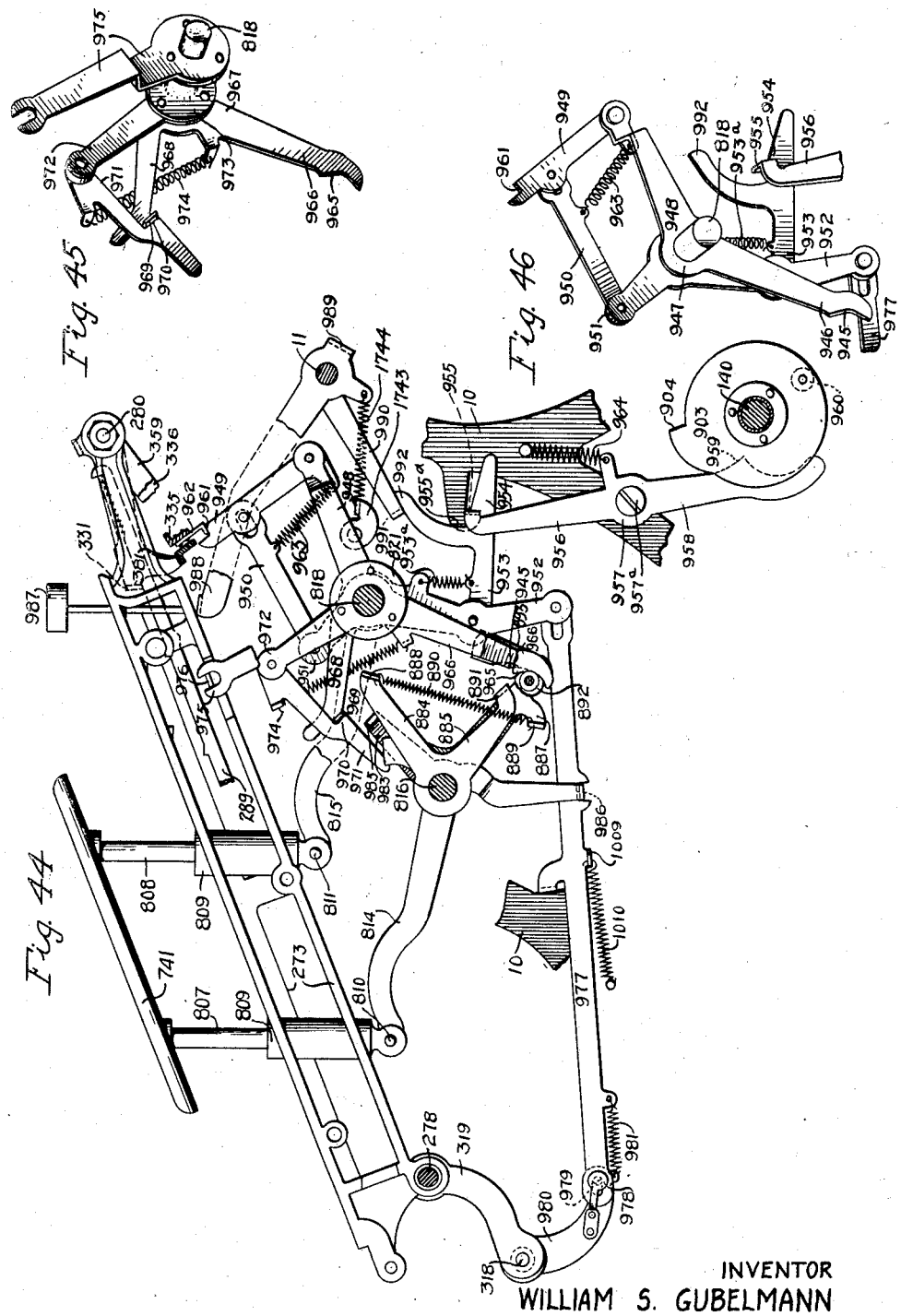

April 30, 1935.    W. S. GUBELMANN    1,999,727
CALCULATING MACHINE
Original Filed March 24, 1915    18 Sheets-Sheet 14
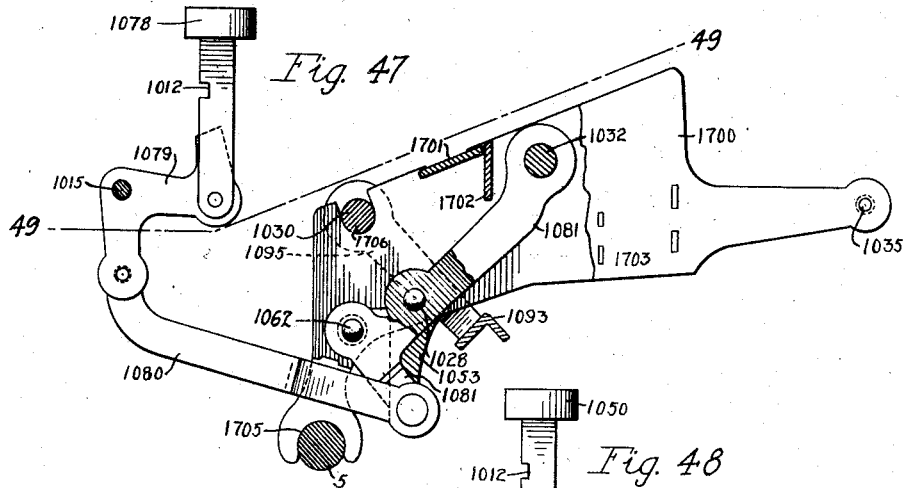
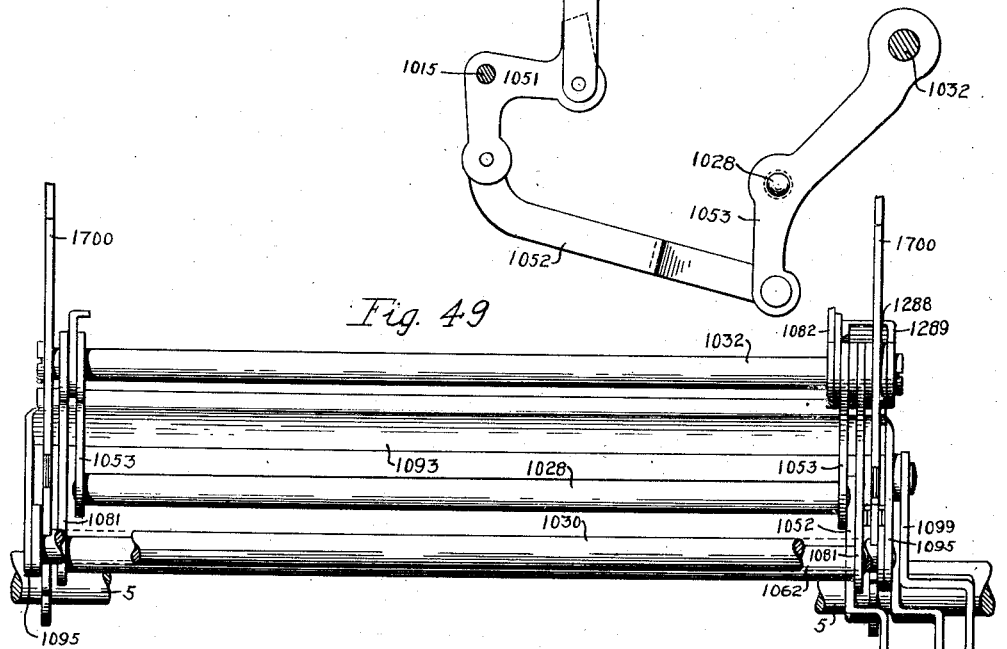
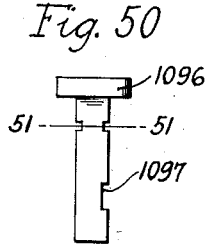
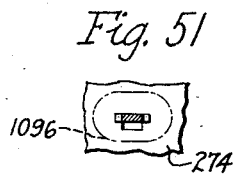
INVENTOR
WILLIAM S. GUBELMANN
BY
ATTORNEYS April 30, 1935.  W. S. GUBELMANN  1,999,727
CALCULATING MACHINE
Original Filed March 24, 1915   18 Sheets-Sheet 15
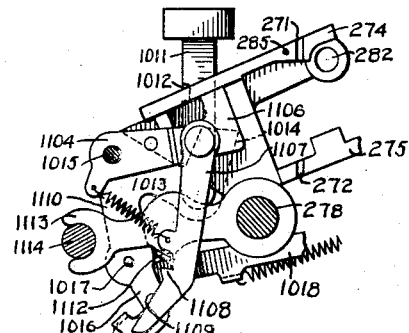
Fig. 52
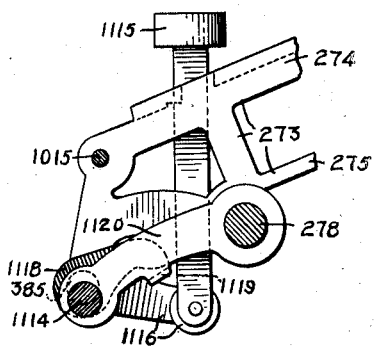
Fig. 53
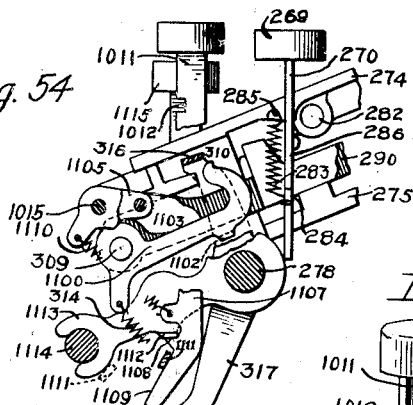
Fig. 54
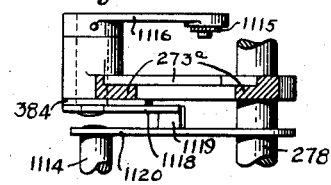
Fig. 55
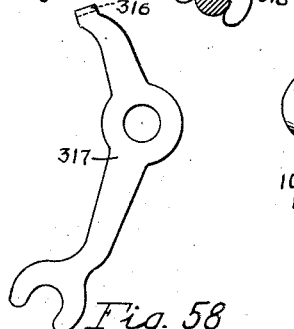
Fig. 57
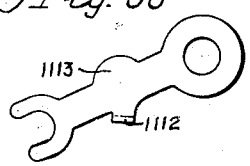
Fig. 58
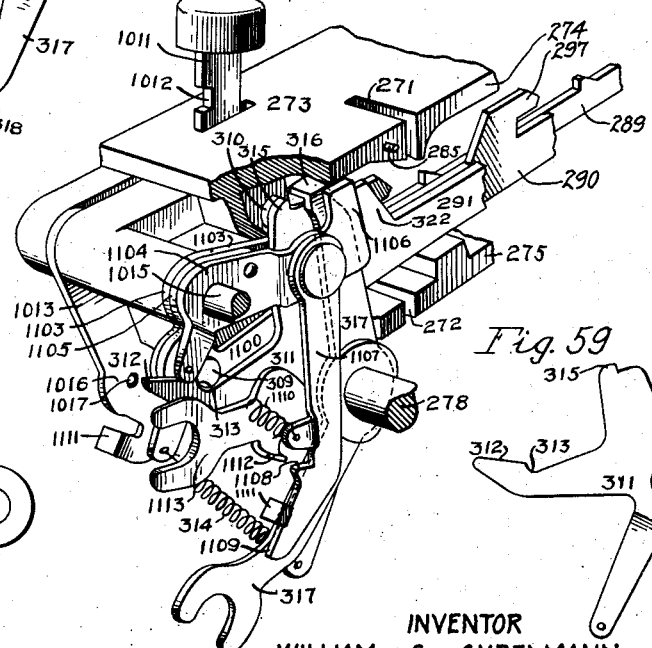
Fig. 56
Fig. 59
INVENTOR
WILLIAM S. GUBELMANN
BY
ATTORNEYS April 30, 1935.  W. S. GUBELMANN  1,999,727
CALCULATING MACHINE
Original Filed March 24, 1915   18 Sheets—Sheet 16
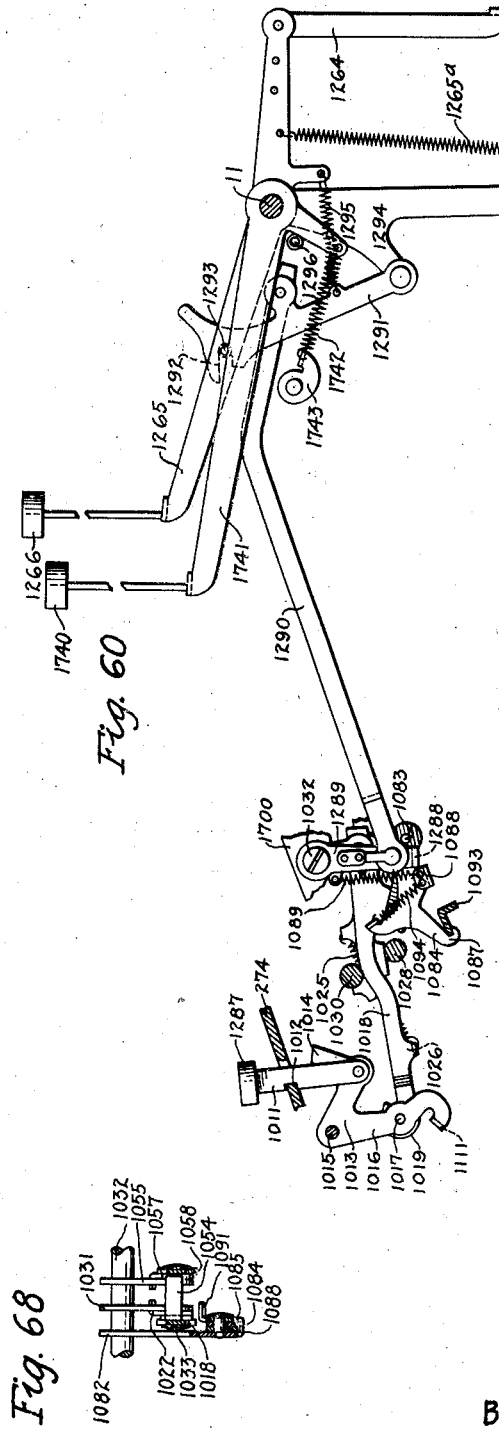
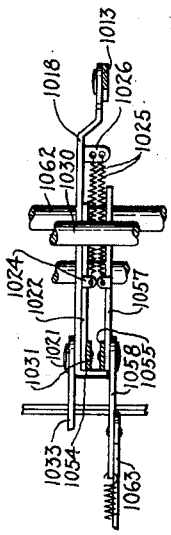
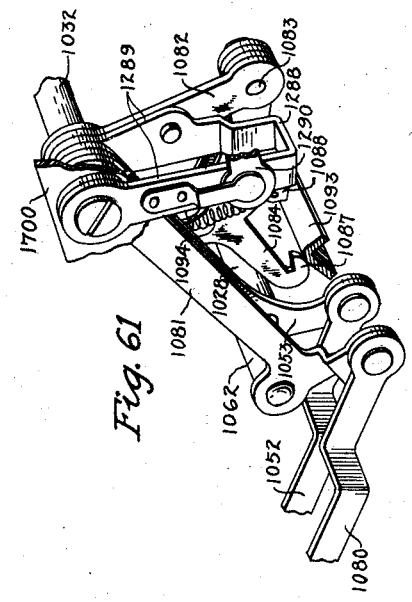
INVENTOR
WILLIAM S. GUBELMANN
BY
ATTORNEYS

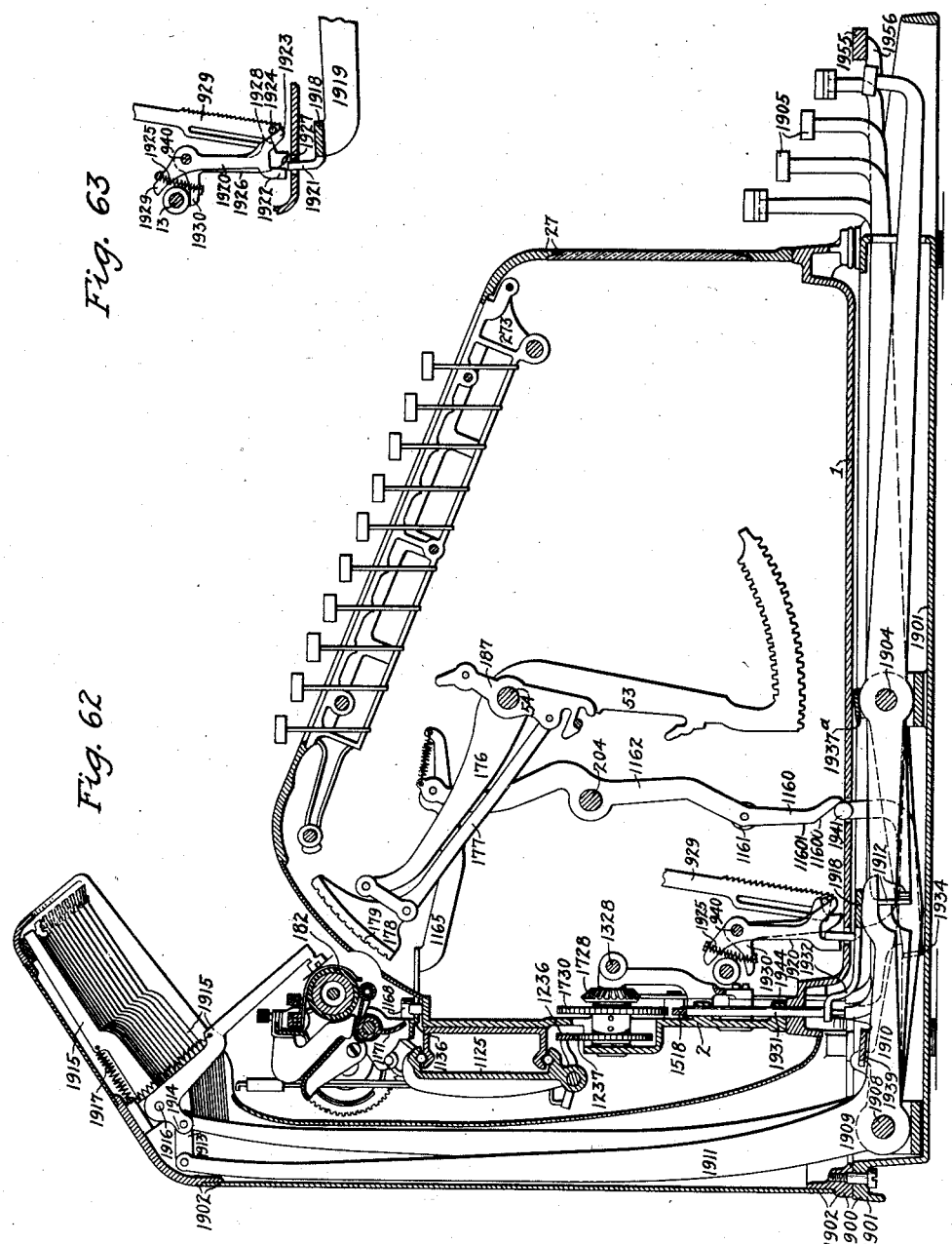

April 30, 1935.   W. S. GUBELMANN   1,999,727
CALCULATING MACHINE
Original Filed March 24, 1915    18 Sheets-Sheet 18

INVENTOR
WILLIAM S. GUBELMANN
BY
ATTORNEYS

Patented Apr. 30, 1935

1,999,727

UNITED STATES PATENT OFFICE 1,999,727

CALCULATING MACHINE

William S. Gubelmann, Brooklyn, N. Y.

Original application March 24, 1915, Serial No. 16,636. Divided and this application June 16, 1930, Serial No. 461,312

90 Claims. (Cl. 235—60)

This application is a division of my prior copending application, Serial No. 16,636, filed March 24, 1915, to which reference may be made for a full illustration and description of mechanisms not directly associated with the subject of this divisional application. Said parent application discloses comprehensive improvements in what are commonly known as adding machines and includes that type thereof capable of not only adding or accumulating but also of subtracting, and in which operations may be performed on different sets of accumulators for such purposes as grand totalizing, bookkeeping, etc., and in which printed lists of the operations may be simultaneously produced, and which performs a number of desirable functions not possible in machines heretofore known and which performs the usual functions of this class of machines in a superior manner. The machine is in many respects a modified and improved construction of the machine described in my pending application filed September 19, 1912, Serial No. 721,141; now Patent No. 1,817,451, issued August 4, 1931; and also of my application filed January 10, 1900, Serial No. 1,004, now Patent No. 1,429,201, issued September 12, 1922.

The present application is directed particularly to the keyboard and key mechanisms, and such parts as cooperate therewith, and includes the construction of the keyboard, the arrangement classification and relations of the different types of keys, the control of different keys or groups of keys by each other and their control by and of the operating mechanism, the arrangement of parts by which keys are enabled to perform the desired functions, and structural features and mechanisms functioning in conjunction with or related to the key mechanism.

The accompanying drawings consist of figures and parts of figures selected from the drawings for the above-mentioned parent application, and are as follows:

Fig. 5 is a fragmentary vertical longitudinal section showing the parts operated by the shifting keys.

Fig. 6 is an enlarged front view of the single mechanism associated with certain of the shifting keys.

Fig. 7 is a fragmentary vertical longitudinal section showing the shifting keys and parts operating in conjunction therewith.

Fig. 9 is a detail fragmentary sectional plan view of the keyboard frame, showing principally the total and number key interlocking mechanism and the universal key locking mechanism in their normal positions.

Fig. 10 is a view similar to Fig. 9, but showing the parts in the position assumed when a number key is depressed and the machine is operating.

Fig. 11 is a view similar to Fig. 9, but showing the parts in the position assumed when a total key is depressed and the machine is operating.

Fig. 12 is an enlarged detail fragmentary view taken on the line 12—12 of Fig. 9.

Fig. 13 is an enlarged detail fragmentary view taken on the line 13—13 of Fig. 9.

Fig. 14 is a detail sectional plan view showing the interlocking device of the column key and operating mechanism.

Fig. 15 is a vertical sectional view, illustrating the device shown in Fig. 14, on line 15—15 of Fig. 14.

Fig. 16 is a detail vertical sectional view showing, in normal position, the device whereby the total keys release the number key latches.

Fig. 17 is a view showing part of the device illustrated in Fig. 16 in the position assumed when a total key is depressed and the machine is operating.

Fig. 18 is a fragmentary detail sectional view taken on the line 18—18 of Fig. 3.

Fig. 19 is a fragmentary vertical sectional view transversely of one of the keyboard frame sections, illustrating one of the number keys complete and a detached number key.

Fig. 20 is a side elevation of one of the number key release bars and adjuncts in normal position.

Fig. 21 is a view similar to Fig. 20, but the key being depressed and the release bar in its operative position.

Fig. 22 is a side elevation of one of the number key lock bars and adjuncts in normal position.

Fig. 23 is a view similar to Fig. 22, but the key being depressed and the lock bar in its half-locking position.

Fig. 24 is a view similar to Fig. 22, but with the lock bar in its fully-locking position.

Fig. 25 is a side elevation of one of the number key stop bars and its adjuncts in normal position.

Fig. 26 is a view similar to Fig. 25, but showing the key depressed and the stop bar stopped thereby in its operated position.

Fig. 27 is a side elevation of the identifying shifting key release bar and its five controlling keys and adjuncts in normal position.

Fig. 28 is a view similar to Fig. 27, but with the no-add key depressed.

Fig. 29 is a view similar to Fig. 27, but with the total key depressed.

Fig. 30 is a side elevation of the identifying shifting key lock bar with the total key in depressed position and other adjuncts in normal position.

Fig. 31 is a side elevation of the identifying shifting key stop bar and adjuncts with the total key depressed.

Fig. 32 is a view somewhat similar to Fig. 31, but the stop bar being stopped by the total key in its operated position.

Fig. 33 is a fragmentary side elevation of the identifying shifting key lock bar and adjuncts in key releasing position.

Fig. 34 is a detail fragmentary side elevation of the keyboard frame section which carries the universal correction key, said key and its adjuncts being in their operating position.

Fig. 35 is a fragmentary sectional plan view taken on the line 35—35 of Fig. 34.

Fig. 36 is a detail fragmentary side elevation of one of the keyboard frame sections, and of the correction mechanism (which is operable by the universal correction key) in normal position.

Fig. 37 is an enlarged detail sectional plan view of the rear portion of the three left-hand keyboard frame sections.

Fig. 38 is an enlarged detail sectional plan view of the rear portion of the two right-hand keyboard frame sections.

Fig. 39 is a detail view showing a special washer and its supporting and securing means.

Fig. 43 is a diagrammatic view of the identifying shifting keys illustrating their locking relations to each other and to associated mechanism.

Fig. 44 is a fragmentary side elevation showing the operating and repeat keys and mechanism operable thereby in normal position.

Fig. 45 is a perspective view showing the mechanism whereby the operating key locks all the number and identifying shifting keys.

Fig. 46 is a perspective view showing the mechanism whereby the operating key releases all the stop bars.

Fig. 47 is an enlarged fragmentary right-side elevation of one of the various keys, parts controlled thereby, and frame for supporting said parts.

Fig. 48 is an enlarged detail view of the split key and its connections.

Fig. 49 is a fragmentary detail plan view taken on the line 49—49 of Fig. 47 showing the relative positions of the "split", "rule", and "specific functional" frames, and their key connections.

Fig. 50 is a detail front elevation of the special function key.

Fig. 51 is a sectional view on the line 51—51 of Fig. 50 illustrating the detaining device for the special function key.

Fig. 52 is an enlarged detail side elevation of the column-lock mechanism, showing a "various" key depressed and the column-lock mechanism not operated.

Fig. 53 is an enlarged detail side elevation showing the column lock key depressed and connected parts moved accordingly.

Fig. 54 is an enlarged fragmentary side elevation showing the column lock key depressed, a number key depressed, and a "various" key returned to normal position after being depressed for column locking.

Fig. 55 is a sectional plan view taken on the line 55—55 of Fig. 53.

Fig. 56 is an enlarged fragmentary perspective view of the front end of a key frame section showing principally the column lock mechanism.

Figs. 57, 58 and 59, are enlarged detail side elevations of members forming part of the mechanism illustrated in Fig. 55.

Fig. 60 is a side elevation of the automatic column feeding mechanism and its controlling key.

Fig. 61 is a fragmentary perspective view of the column feeding mechanism and its connections.

Fig. 62 is a vertical sectional view illustrating the relation of the typewriter key mechanism to the calculating machine.

Fig. 63 is a detail view of the interlocking mechanism between the typewriting keys and the calculating machine.

Fig. 65 is a fragmentary side elevation showing one of the split or keyboard dividing mechanisms with the controlling keys therefor depressed.

Fig. 66 is a sectional view taken on the line 66—66, Fig. 67, viewed from above, portions being omitted.

Fig. 67 is a side elevation showing one of the vertical rule mechanisms in operating position.

Fig. 68 is a fragmentary sectional plan view showing one of several similar mechanisms each associated with and operated by one of the various keys.

*General description*

This machine is of the class in which are arranged side by side, in successive denominational order, a series of sets of actuating, accumulating and recording devices; each set comprising an adding wheel, its cooperating printing devices, a row of nine digital setting keys which may be set for controlling without actuating said adding and printing devices, an actuator for actuating the adding and printing devices according to the setting of said keys, and cooperating devices for carrying from a set of one denomination to another of the sets; and which machine is also provided with a universal operating mechanism for causing simultaneous actuation of said adding and printing devices by their respective actuators.

Figure 40:
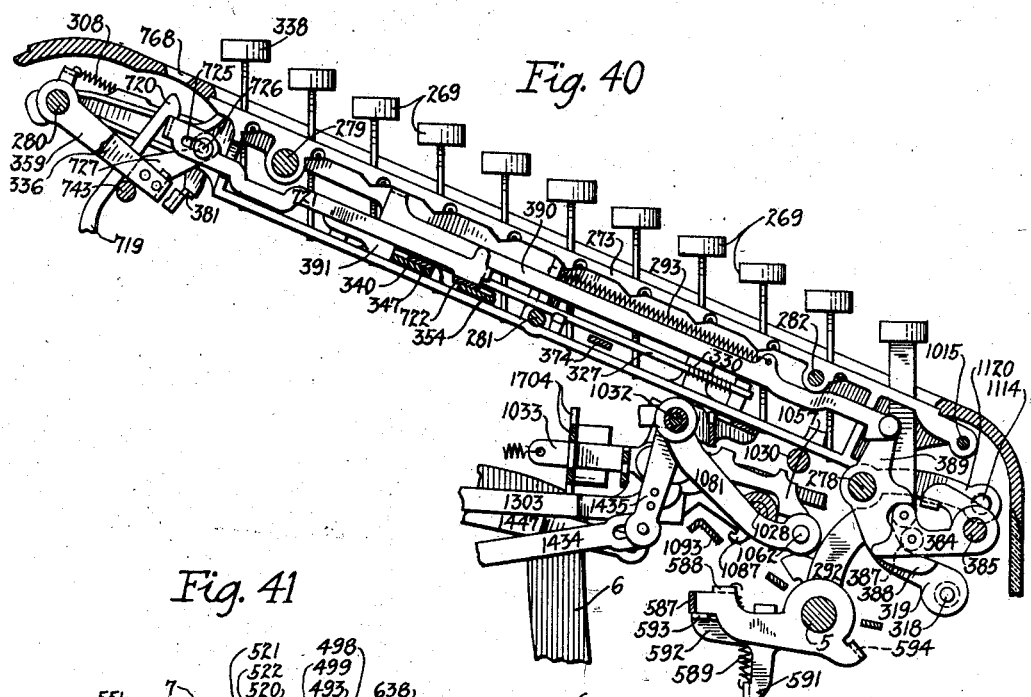
Fig. 40 is a fragmentary vertical longitudinal section showing various mechanisms operated by or operating upon the numeral keys, the various keys, and the shifting keys.

Each row of keys is provided with a stop bar 289 (Figs. 25 and 54) upon which is formed a series of stops 293, one for each key, each of said stops being arranged at a different distance from its respective key, according to the value of said key. Each stop bar 289 is associated with a differential stop bar to which it is connected by an arm 292 (Figs. 4, 25 and 40) and a yoke, the differential stop bar, arm and yoke, all being mounted on the shaft 5. An accumulating wheel, an auxiliary accumulating wheel, and an actuating rock lever having a rearwardly extending arm to which is hung an oscillating printing segment, as well as carrying-devices for the accumulating wheels and actuating devices for the printing segment, are also provided for each row of keys 269, all as more fully described in the parent application, Serial No. 16,636.

The machine is provided with a main operating shaft 140, and a source of power, such as a spring for rotating said shaft, the shaft, however, is normally prevented from being turned by said power spring by a detaining hook 901 (Fig. 4) pivoted at 901a and engaging a nose 904 on a cam 903 secured to said shaft 140, and the operating key 741 and the operating lever 775 are connected by the link 897 to said detaining hook 901 for releasing said operating shaft to permit it to make a single revolution at each depression of either said operating key 741 or said operating lever 775.

When items are to be added and listed on the machine the keys representing the digits of the first item are depressed and temporarily remain in this depressed or set position, forming abutments for the respective stops on said stop bars 289 (Figs. 25 and 26). The depression of the keys releases the stop bar 289 from the pawl 331 in each row in which a key has been depressed. The stop bars 289 are, however, still detained in their normal position by the detent pawls 333 of a universal detaining mechanism until the operating lever 775 or key 741 is thereafter actuated, which causes the universal detaining mechanism to disengage its pawls 333 from the stop bars 289 allowing those stop bars which have also been previously released, by the keys, to be moved forward by the action of the springs 337. Immediately thereafter the detaining hook 901 is withdrawn from the nose 904 on cam 903 of the main operating shaft 140, permitting the latter to make a complete revolution under power supplied by the power spring. This causes the operating frames to move, and the stop bars 289 and the differential stop bars to be moved by the action of their springs 337 until each stop bar 289 is arrested by a depressed key 269 of its row engaging with its stop on said stop bar 289, whereby each differential stop bar is positioned to present in the path of the correlated actuator a stop corresponding to the key depressed in its respective row.

*Number setting key mechanism*

The number setting key mechanism is constructed to provide the following:—

First, means are provided for producing a keyboard combining the advantages of both flexible and locked keyboards, to allow the easy depression of any one key in a column, but whereby the depression of a second key in the same column releases the first key depressed in said column but requires considerably more force than is required to depress the first key depressed in the same column, this additional resistance serving to notify the operator that a key has already been depressed in that column, thereby guarding against error.

Second, means are provided for locking the setting keys, after being depressed, until released by the operation of the machine or the depression of another setting key or its column correction key or the universal correction key.

Third, means are provided for locking all the keys, by means of a universal locking bar, in their respective elevated and depressed positions, by the depression or partial depression of the operating key.

Fourth, means are provided for locking all the number and total keys, by means of column locking bars, as soon as the machine starts to operate and during the first part of the operation of the machine.

Fifth, means are provided whereby the setting keys that have been depressed are released and restored, and the setting keys that have not been depressed but have been locked against movement during the first part of the operation of the machine are released so that they can be set for a subsequent operation, before the return movement of the actuating gears and operating mechanism. This arrangement obviates the necessity of the operator waiting before setting the keys for a subsequent operation until the operation of the machine is completed, thereby saving much time.

Sixth, means are provided for preventing the machine from operating when a number key or total key is only partly depressed.

Seventh, means are provided whereby the depression of a number key locks all the total keys and vice versa.

Eighth, means are provided for releasing the total keys at or near the completion of the operation of the machine.

Ninth, means are provided whereby the total keys operate the number key latches.

Tenth, means are provided whereby the machine is prevented from operating when the universal correction key is depressed or partly depressed.

Eleventh, means are provided for locking the universal correction key during the first part of the operation of the machine.

Twelfth, means are provided for releasing the universal correction key before the return movement of the actuating gears.

The key setting mechanism is constructed as follows: 269, Figs. 1, 3, 4, 20 and 54, represents the number setting keys which are arranged in parallel longitudinal rows or columns, there being nine of such keys in each row, and as many rows as are required to provide the intended capacity of the machine. These keys are each provided with a depending stem or shank 270 which is guided in the upper and lower key ways or slots 271 and 272, Fig. 56, in the keyboard frame, so as to be capable of vertical reciprocation therein. The keyboard frame is constructed of a series of sections 273 arranged side by side and running from the front of the top of the machine toward the back. Each of these sections may be cast in a single piece having a top plate 274, a bottom plate 275, upright connections 276 between them, and a rearwardly extending neck or arm 277. Each key supporting member or keyboard frame section 273 is formed with its upper and lower plates or bars in parallel relation and united by a web, or by several webs connecting the end and intermediate portions at intervals. The upper and lower plates or bars constitute flanges of the frame sections, these flanges on one side have the key ways 271 and 272 formed therein, so as to intersect their respective edges, and the key ways of the upper flange register with those of the lower flange. The keyboard sections are fitted snugly together, and dowel pins 285 (Fig. 4) are provided at their joints, these pins also serving as means for attaching springs 283 (Figs. 4 and 54) which springs are connected to the respective key shanks 270 for elevating and supporting the keys. Depressions or countersinks are formed around the pins 285 or around the apertures into which the pins extend into the contiguous frame section, providing spaces for the spring loops around the dowel pins 285. The several sections 273 are supported on front and rear rods 278 and 279 which are secured to the main side frames of the machine by screws arranged to clamp the main side frames between their heads and the ends of the rods 278 and 279. By loosening the screws the entire keyboard is easily removed.

The several key frame sections 273 including the key mechanisms are assembled and secured together by the tie rods or bolts 280, 281 and 282 (Fig. 7); The rods 278 and 279 (Figs. 3, 8 and 18) also serve the same purpose, but are constructed of sufficient extra length to extend partly through the main side frames 3 and 4, said frames being apertured to receive them, and counter-bored to receive the heads of the rod securing screws. This construction affords a convenient means of securing the key frame section in position, the tightening of the screws for rods 279 and 280 draws their heads into the countersunk portions of frames 3 and 4 and binds the said frames and the key frame section securely together.

This manner of constructing the keyboard frame makes it possible to assemble the keys and other working parts in their proper positions very quickly and easily in manufacture. It also provides a keyboard that may readily be removed from the machine without disarranging the various other parts.

The key shanks 270 are flat sided and their guideways or openings 271 and 272 are of corresponding form to prevent the keys from rotating. The setting keys are each normally held in an elevated position by a spring 283; each spring is attached to an ear 284 (Figs. 19 and 54) on its respective key shank and to a transverse pin 285 between two adjacent keyboard sections, there being a separate pin for each key. Shoulders 286 (Fig. 19) on the key shank engage the under side of the upper plate of the keyboard frame and limit the upward movement of the keys. Each setting key is provided in its shank or stem between the upper and lower guide plates with upper and lower openings 287 and 288. Extending lengthwise through the lower openings of the several key shanks in each row is a set of three longitudinally movable bars 289, 290 and 291, which are arranged side by side. The stop bar 289 (Fig. 25), at the left in each of these sets, is connected at its front end with the upper arm 292 of one of the differential stop levers (Figs. 25 and 26) and is provided on its upper side with a series of stop lugs 293. Each stop lug has an abrupt front side and an inclined rear side and is adapted to cooperate with the upper edge of the lower slot 288 in one of the setting key stems. Each stop 293 is spaced a distance from its respective key stem such as to arrest the stop bar after a movement corresponding to the value of the set or depressed key. For example, the stop for the "one" key is so located that when this key is set the stop bar is arrested thereby after one step of movement, while the stop cooperating with the "two" key permits the stop bar two steps of movement, and so on. The control of accumulator actuating gears by the stop bars is fully described in the parent application.

On each stop bar 289, the stops 293 for each of the keys 1 to 7 are alike, but the eight stop is only slightly raised above the upper edge of the stop bar, and immediately in front of the low number eight stop is a depression or notch 293$^a$, while on the lower edge of each bar and preferably in the rear of notch 293$^a$ is a projection or cam 289$^a$. When the "eight" key of the row is depressed and the bar 289 moves forward the inclined cam 289$^a$ rides upon one of the arms 328 (which will be presently described) forcing bar 289 up until notch 293$^a$ engages with the "eight" key and the low eighth stop 293 rests against said key.

The stop bars 289 are not provided with a tooth or stop for the nine key. When the nine key (which is over the eighth stop 293) is depressed the bar 289 may be moved forward until its respective differential stop bar comes into contact with, and is arrested by, a cross tie plate which stands in its path, as more fully described in the parent application, Serial No. 16,636. By this arrangement for the eight and nine keys, a greater amount of movement is obtained for the bars 289 and the associated differential stop bars.

Near its rear end each stop bar 289 is provided with a single main detent tooth 294, and in rear of said main detent tooth with a series of closely spaced auxiliary detent teeth 295, arranged lower than the main detent tooth and corresponding in number with the setting keys of its row. Each tooth 295 has an abrupt front side and an inclined rear side, as will be seen in Figs. 25 and 26.

*Number key locking bar*

The locking or central bar 290 (Figs. 22, 23 and 24) of each set is provided on its upper side with a plurality of rearwardly projecting hooks 297, one of which is adapted to engage with the upper opening 287 of each setting key. Each of these hooks has its bill provided at its rear end with a rearwardly inclined upper face 298 forming a cam, and with a forwardly inclined lower cam face 299. At its rear end each locking bar is provided with a rear lug 300 and in front of said rear lug with low, intermediate and high stop shoulders 301, 302 and 303 respectively, arranged one in advance of the other.

Between its hooks and stop shoulders each locking bar is provided with a correction lug 304 having an inclined rear face 305 and an upper face 306 parallel with said bar 290.

At its extreme rear, projecting to the right of lug 300, the lock bar is provided with an ear 307 to which is attached the spring 308 (Figs. 37 and 38) which normally tends to draw the lock bar rearwardly. At its front end each locking bar 290 is provided with a laterally projecting pin 309 (Fig. 56). Pivoted on the pin 309 and extending rearwardly beside bar 290 is a short lever carrying a rearwardly facing restoring lug or shoulder 310, (Figs. 22, 23, 24 and 54), which lug may for the present be considered as formed on lock bar 290. 311 represents a plurality of vertically swinging tension fingers which are pivoted loosely on a transverse rod or shaft 278 in the upper front part of the machine and each having a flat upper front face 312 and an abrupt face or shoulder 313 in rear of the plain face, as shown in Figs. 22, 23, 24, 36 and 59. Each of the tension fingers is yieldingly pressed against the under side of the shoulder or pin 309 of its respective locking bar 290 by a spring 314, and is provided adjacent to the restoring lug 310 of the locking bar with a similar lug 315, as best shown in Figs. 56 and 59. Transversely in rear of the lugs 315 and 310 of each tension finger 311 and its locking bar 290 is a restoring finger 316. The restoring fingers are formed on rock levers 317 which are pivoted on bar 278 (Figs. 54, 56 and 57) and have their lower forwardly projecting arms, which terminate in forks, straddling a universal restoring bar 318. The universal restoring bar is supported at its ends by curved arms 319 (Fig. 44) which are pivotally mounted on the bar 278.

The bar 318 receives an oscillating movement laterally of its axis and toward and from the front of the machine from the driving mechanism, as will be hereinafter described. During its rearward movement the bar 318 rocks levers 317 so that their fingers 316 return all the tension fingers and locking bars of the setting keys to their normal position. During the return forward movement of the bar 318 it rocks the levers 317 so as to withdraw the fingers 316 from engagement with their respective tension fingers and locking bars. While the tension fingers 311 are provided for the purpose of rendering it more difficult to depress a second key while a key in the same row is depressed, it is to be understood that the movement of the lock bar into its intermediate or half locking position also performs this function, and the tension fingers could be dispensed with if the lock bar springs were sufficiently strong.

*Number key releasing bar*

The right hand or releasing bar 291 (Figs. 19, 20, 21 and 56) of each set is provided on its upper side with a plurality of lugs 322 which have inclined rear sides 323 and each of which lugs is adapted to cooperate with one of the setting key stems. At its rear end each releasing bar is provided with an upwardly projecting lug 324 having an inclined face or cam on its front side. When free, each releasing bar is moved rearwardly by a spring 325 (Fig. 38) which spring is carried by a laterally projecting ear 326 on bar 291.

Figure 8:
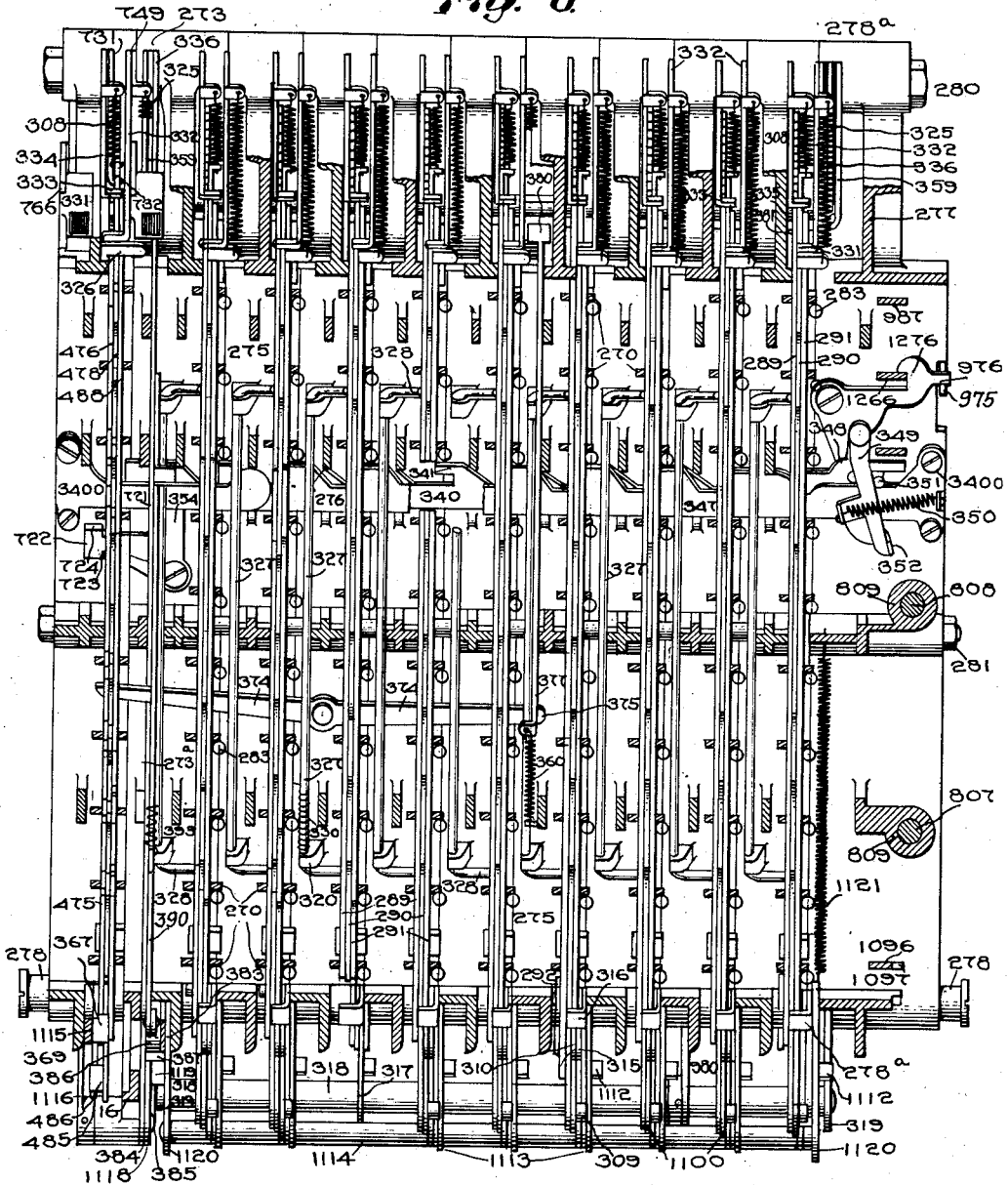
Fig. 8 is a sectional view upon a plane through and parallel with the top of the keyboard, parts being broken away to secure greater clearness.

The locking and releasing bars 290 and 291, respectively, are only capable of longitudinal movement, but the stop bar 289 is capable of both longitudinal and vertical movement for a purpose hereinafter described. Normally each stop bar 289 is yieldingly held in its elevated position by a rock shaft 327 (Fig. 8) journaled in lugs 320 on top of the lower guide plate 275, and having at opposite ends arms 328 which project laterally below notches 329 in the underside of the locking and releasing bars 290 and 291 and into engagement with the underside of the respective stop bar. A spring 330 applied to the rock shaft 327 operates to turn the same so as to lift the stop bar 289, as best shown in Figs. 8 and 25. The shaft or rod 327 is preferably formed of springy material so that it can be quickly and easily sprung into its seat, which is formed by the several staggered and overhung lugs which constitute bearings and securing means. The spring 330 may be dispensed with and the rod 327 may be formed so as to impart the necessary spring action for raising the stop bar 298.

331 (Figs. 20 to 26, inclusive) represents a plurality of releasing pawls, each arranged transversely above the rear end of one set of stop, locking and releasing bars, and supported by rock arms 332 which are mounted loosely at their rear ends on the transverse rod or shaft 280. In the normal position of the parts, each of the releasing pawls 331 engages with its front side against the middle shoulder 302 of the locking bar 290, as shown in Fig. 22, and holds the latter against backward movement, while its rear side is engaged by the detent lug or shoulder 294 of the stop bar 289, as shown in Fig. 25, and the rear cam 324 of the releasing bar 291, as shown in Fig. 20.

333 represents a plurality of detent pawls one of which is arranged in rear of each releasing pawl 331 and is supported on the rod or shaft 280 by means of its respective rock arm 334 (Figs. 23, 24, 25, 26, 36 and 37).

In the normal position each detent pawl 333 is engaged on its rear side by the foremost of the closely spaced detent teeth 295 of the stop bar 289, shown in Fig. 25. The releasing and detent pawls are yieldingly held in their normal position by gravity, aided by the springs 308 and 325 (Figs. 37 and 38).

335, Figs. 4, 16, 17, 25, 31, 37 and 38, represents a universal detent pawl releasing bar arranged transversely underneath the several number key detent pawls 333, and having a finger 335ª which extends under the pawl 333 for the row of identifying shifting keys, to be hereinafter described. Said bar 335 is supported at opposite ends by rock arms 336 which are mounted loosely at their rear ends on the transverse rod or shaft 280. The side arms 334 of the detent pawls 333 are provided with downward extensions or feet to be engaged by the universal detent pawl releasing bar 335, and the latter is adapted to lift the detent pawls simultaneously out of engagement from the several stop bars 289. The upward movement of the universal bar 335 is effected during the first part of the movement of the operating mechanism in a manner which will be hereinafter described.

The operation of the setting mechanism thus far described is as follows:

In Figs. 20, 22 and 25, the several parts of the mechanism are shown in their normal position, in which all of the keys are elevated and the stop bars 289 and the releasing bars 291 are in their rearmost position; each inclined rear side 323 of the lugs 322 on the releasing bars 291 abuts against the upper side of the lower opening 288 in one of the number key stems 270, and the locking bars 290 are in their foremost position. The several releasing pawls 331 are depressed and engage with the abrupt front sides 294 of the detent lugs of the stop bars 289 and the middle stop shoulders 302 of the locking bar 290; the several detent pawls 333 are respectively engaged with the foremost auxiliary detent teeth 295 of the several series on the several stop bars 289; and the tension fingers 311 rest with their upper faces 312 against the laterally projecting pins or shoulders 309 respectively of the lock bars 290, offering practically no resistance to the movement of the lock bars.

Assuming now that in any column a key, such as the number five key, of a series is depressed, as shown in Figs. 21, 23 and 26, the upper edge of the lower opening 288 of its stem will first engage the inclined rear side 323 of the adjacent lug 322 of its respective releasing bar 291 and shift the latter forwardly into the position shown; causing its rear lug 324 to raise its respective releasing pawl 331 sufficiently to disengage it from the stop 294 on the respective stop bar 289, which is, however, still held against forward movement by the detent pawl 333; and to disengage the said releasing pawl 331 from the middle stop 302 of its respective lock bar 290, allowing the latter to move rearward until arrested by its rear stop 301 against the respective detent pawl 333. This movement of the lock bar 290 is just sufficient to allow its hook 297 to pass through the upper opening 287 of said key stem 270 and lock the latter in its depressed position with the cam face 298 of the hook in line with the upper edge of the lower slot 288 of the keys of the row not in the depressed position (Fig. 23); and to move the laterally projecting pin or shoulder 309 rearwardly of the shoulder 312, allowing the tension finger 311 to rise under the tension of its spring 314 and present its abrupt face or shoulder 313 against the pin 309 on the lock bar thus displaced.

The effect of the above is that when a number key is depressed in any column its respective stop bar 289 is released from its releasing pawl 331 but is still held against movement by its detent pawl 333 in engagement with its tooth 295, and the number key depressed is held in the depressed position; but should it be desired to depress another key in the same column, instead of the one already depressed, as for instance when the first key is depressed in error, the second key may be depressed, whereupon the upper face of the lower opening 288 of its stem engages the inclined cam face 298 of its hook on the lock bar and forces the latter forward thereby withdrawing from the opening 287 of the previously depressed key the hook 297 which is holding said key depressed, and permitting its restoration by its spring 283. The continued downward movement of the second key brings its upper opening 287 in line with its hook 297 on the lock bar 290, whereupon said lock bar is again drawn rearwardly by its spring 308, and the second key is locked down. As the lock bar is forced forward by such a depression of a second key after the first has been set, its pin 309 engages the abrupt face 313 of its respective tension finger 311, which offers considerable increased resistance to the forward movement of the lock bar and thus to the depression of the second key. This increased resistance serves to notify the operator that a key has previously been depressed, should the attempted setting of a second key in the same column be a mistake. This is what I term the combination keyboard, as it combines the advantages of both the locked and the flexible keyboard.

After the desired keys have been set and the machine is operated by manipulating its operating lever or operating key, and during the first part of the forward or downward movement of th operating lever or key, which later will hereinafter be more fully described, the universal releasing bar 335 is raised by the operating mechanism and in turn raises all the detent pawls 333, which release all the stop bars 289, allowing such of them as have also been released by their respective release pawl 331 in any column where a key has been depressed to move forward by the action of a spring 337 until the said stop bar is arrested by the stop 293 corresponding to the key depressed.

The raising of the detent pawls 333 at the initial part of the operation of the machine also liberates the lock bars 290, allowing them to move rearwardly by the action of their springs 308 until arrested by their high stops 303 each engaging the front side of the corresponding release pawl 331; this allows the hooks 297 to move rearwardly in the lower slot 288 of all the number keys that have not been depressed in said row, moving the inclined face of the hooks 297 beyond the path of the upper side of the lower opening 288 in the key stem and, instead of presenting the incline face, presenting the flat upper side of the hook, thereby securely locking all the keys against movement and preventing the depression of any of the number keys in a row where one key remains depressed after the machine has started to operate, as shown in Fig. 24.

As the operation is continued and the operating frame nears the end of its forward movement and after it has moved enough to allow the totalizer actuating segments to reach the nine position, the universal restoring bar 318 is moved rearwardly, swinging all the restoring fingers 316 forwardly, engaging the restoring lugs 319 of the lock bars 290, moving said lock bars forwardly until the middle stops 302 are in a position in advance of the releasing pawls 331 and withdrawing the hooks 297 of the lock bar 290 out of engagement with and releasing the keys depressed, which latter are restored to their normal or raised position by their springs. At the same time, the restoring fingers 316 engage the lugs 315 on the tension fingers 311, moving their abrupt faces or shoulders 313 out of the path of the pin 309 of the stop bar and preventing the tension fingers from resisting the forward movement of the lock bars.

Immediately preceding the release of the keys, the detent pawls 333 are allowed to drop down and in so doing they engage one or another of the auxiliary detent teeth on the stop bars 289, preventing the stop bars from making any further forward movement when the keys are released.

The releasing bars 291 are returned to their normal position by their springs 325 as soon as the keys are unlocked, and their releasing pawls assume their normal positions.

The back and forth movements of the universal restoring bar are very rapid so that as soon as the fingers 316 reach their foremost position they begin to move rearwardly again, away from the tension fingers 311 and the locking bars 290 so that they may assume their normal positions immediately; the locking bars engaging their middle or intermediate stop shoulders 302 with their releasing pawls 331, and the tension fingers presenting their plane faces 312 to their respective pins 309 and offering but very slight resistance to the depression of a number key.

As the operating frame makes its return movement, the stop bar return rod moves forwardly and forces the stop levers forward and the stop bars 289 rearwardly to their normal position, in which position the stop bars are again engaged and retained by the detent pawls 333 and by the release pawls 331. The detent pawls 333 when in engagement with the teeth 295 on said stop bars allow the latter to move freely rearwardly but prevent their forward movement by the spring 337.

*Column correction key*

338 represents column correction keys, one arranged at the upper end of each row or column of keys, as shown in Figs. 22, 23 and 24, and which are of similar construction to the number key 269 with the exception that the upper opening 287 in the shank 270 may be omitted, but for convenience in manufacturing it may be retained. In its normal or raised position, the upper part of the lower slot 288 of each key 269 is one step in rear of cam face 305 of the correction lug 304 on the lock bar 290, as shown in Fig. 22.

Whenever it is desired to release a key that has been depressed or set in a column, it may be accomplished by depressing the column correction key 338 situated at the head of such column of setting keys. When one of the column correction keys is thus depressed, (Fig. 23) the incline 305 of the correction lug 304 on the lock bar 290 is engaged by the upper end of the opening 288 of the correction key stem 270 and the lock bar is caused to move forwardly and disengage its hook from the lower side of the upper opening of any depressed key of the column and thereby release it; and the correction key again rises, by the action of its spring 283, as soon as the pressure on the same is released.

At the time during the operation of the machine when the locking bars move to their fully locking positions, the correction lug 304 is moved rearwardly until its upper flat face 306 is under the upper side of the lower slot 288 of the correction key 338, as shown in Fig. 24, and thereby prevents the correction key from being depressed after the machine has started to operate.

Operation of machine locks all the number keys

The locking of all the number keys in the columns where no key has been depressed when the machine is operated, is accomplished as follows:—

Formed on the lower edge of each releasing bar 291 is a downwardly projecting finger 339, Figs. 20 and 21. 340 (Figs. 8 to 11) is a universal locking bar lying in the lower part of the keyboard frame and passing from side to side of said keyboard at right angles to the releasing bars 291. 341 are teeth or hooks on the bar 340, one of which is provided for each finger 339, to co-operate therewith. Each hook has a rear face 342, an end face 343, and a notch or recess 344. The bar 340 has a reciprocating movement across the keyboard and when the machine is operated, (as well be later described), moves to the left so that the face 342 on each tooth 341 is in front of its respective finger 339, provided no key in that row has been depressed, thereby locking the respective releasing bar 291 and hence locking all of the keys of that row.

If, however, a key in any row of number keys is depressed it forces its releasing bar 291 forward until the finger 339 of that bar passes the face 343 of the hook 341 and stands in a position to enter the recess 344 on the bar 340 when the latter is moved to the left.

Should a careless operator only partly depress a key and hold it so and then attempt to operate the machine, the finger 339 would stand in the path of the face 343 of the hook 341, and the bar 340 would be prevented from moving to the left and, through means to be hereinafter described, the machine would be prevented from operating.

The bar 340 is moved to the left during the first part of the forward movement of the operating lever 715 or the first part of the downward movement of the operating key 741 so that all the keys are locked by the depression or partial depression of either the operating key or operating lever. Retaining and guiding plates 3400, 3401 and 3402 (Figs. 12 and 13) respectively are provided for the bars 340 and 341; and spacing plates 3403 and 3404 separate these guiding plates at their ends, so that the bars 340 and 341 may slide freely between said plates.

Number and total key interlock

Situated in the column of keys at the extreme left of the keyboard are the total keys, 345, 356, 357, and 358, (Figs. 5, 15 and 27 to 33). They are constructed in every way similarly to the number keys but their locking, releasing, and stop-bars are constructed differently. The principal functions and operations of these keys, however, will be described hereinafter. This portion of the description will be limited to the direct results of the depression of a total key.

The total key lock bar 478 (Fig. 30) is so constructed, as will be later more particularly described, that when a total key is depressed the lock bar first moves forward and then back to normal position. A finger 346, Figs. 9, 10 and 11, similar to the fingers 339 of the number key releasing bars, is formed on the lower edge of the total key locking bar. This finger 346, when the total keys are in their raised position or when any one of them is fully depressed, stands in rear of the left end of the universal locking bar 340 so as to allow said locking bar to make its required movements. When a total key is only partly depressed and held so, the finger 346 stands in the path of bar 340, locking it against movement and consequently locking the machine against operation.

An upper bar 347 (Figs 8 to 13 inclusive) lies just above universal locking bar 340 and has a rearwardly projecting part 348 on its right hand end. The projection 348 carries an arm 349 pivoted thereto and extending forwardly of the machine and transversely of the bar 347. A spring 350 tensioned between an upstanding lug on arm 349 and a lug on spacing plate 3403 tends constantly to pull arm 349 to the right, but this movement is limited by a pin 351 and a bent up finger 352 both of which are carried by the locking bar 340 (Fig. 10) and between which the strain of spring 350 is exerted on arm 349. When the bar 347 is longitudinally moved in either direction it causes a straining of spring 350, and if released will be returned to its normal position by said spring. Along the rear edge of bar 347 are recesses 353, each of which, when bar 347 is in its normal position, is directly in front of one of the fingers 339 of the number key releasing bars. A rock elbow lever 354 has its rearwardly extending arm connected to the upper bar 347 and its leftwardly extending arm in the path of a finger 355 on the under edge of the total key releasing bar 475. When a total key is depressed it rocks elbow lever 354, which forces upper bar 347 to the left, so that its slots 353 are removed from the path of the number key releasing bar fingers 339, and the rear edge or stops are presented in their stead, which locks all the number key release bars and through them locks all the number keys. When a number key is depressed the finger 339 of its release bar enters the respective slot 353 and locks the bar 347 against movement and, through the elbow lever 354, locks the total key release bar and thereby locks all the total keys.

The total key locking bar 478 (Fig. 30) carries a finger 367 which projects laterally and corresponds in its functions to the restoring lugs 310 on the number key locking bars. 368 is a total key restoring lever having an upwardly projecting arm 369 which stands in rear of the finger 367. A lower arm 370 is connected by a link 371 with a lever 372 (Fig. 7) receiving motion from cams 482 and 483 on the main driving shaft 140. As the machine nears the end of each operation the lever 372 is rocked rearwardly carrying link 371 with it, which in turn draws arm 370 rearwardly, throwing arm 369 forwardly, thereby moving the total key locking bar forwardly and releasing any total or other identifying shifting key which has been set.

The number key stop bar releasing pawls or "zero stops" 331 are released by the depression of a total key in the following manner:

373, Figs. 27, 28 and 29, represents a downwardly projecting finger or lug on the total key releasing bar forward of the finger 355 on locking bar 478 and adapted to contact with one end of a rock lever 374 (Fig. 8) extending transversely in the keyboard frame from the left or total key side to approximately the center of the keyboard. The right hand end of the lever 374 has a projection 375 which enters a slot 376 (Fig. 17) in the front end of a rearwardly extending bar 377 (Figs. 8, 16 and 17). The bar 377 rests with its front and rear ends on the lower plate 275 of one of the sections of the keyboard frame.

On its upper rear end the bar 377 has a plane face 379 which supports a connection 380 to a universal bar 381 which lies under all the number key releasing pawl rock arms 332. 382 is a lower beveled face of bar 377, which extends over the universal bar 381. The universal bar 381 is secured at its ends to a pair of rock arms 359 (Figs. 36 and 37) loosely mounted on rod 280, and rests its weight on the bar or link 377.

When a total key is depressed its releasing bar, in moving forward, operates the rock lever 374, which in turn pushes bar 377 rearwardly; the inclined face 382 is moved rearward over the universal detent pawl releasing bar 335, locking the latter to the universal bar 381 by the cooperation of connection 380. When the machine is thereafter operated the bar 381 is lifted with bar 335, releasing all the number key latches A spring 360 (Figs. 8, 16 and 17) tends constantly to hold link 377 in its forward position.

*The universal correction key*

Figure 1:
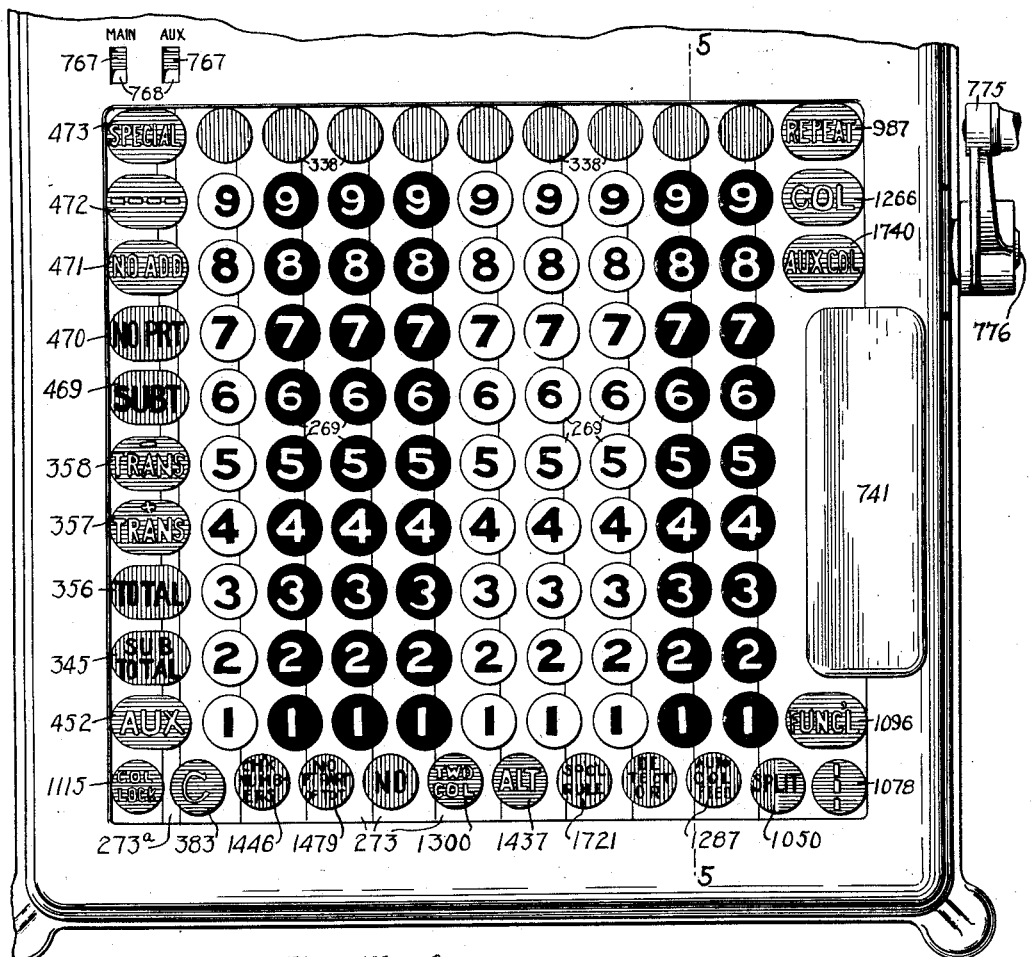
Fig. 1 is a plan view of the keyboard.

Situated at the foot of the column of number keys of the highest order is the universal correction key 383 (Figs. 1, 34 and 35). This key operates to return all the depressed number keys, but does not return the total keys if they are depressed. The means by which the universal correction key returns all the depressed number keys is as follows:

384 represents a rock arm pivoted loosely on a short shaft 385 mounted in a bearing formed in the front end of the left hand section 273 of the keyboard frame, said shaft extending in front of a filler section 273ª. Rock arm 384 extends rearwardly in the machine from its pivot. The filler section 273ª is not as long as the other sections and is not provided with the rearwardly extending neck. To compensate for this a washer, which is joined by dowel pins or any suitable means to the necks of the total key section or the highest number key section or both, as shown in Fig. 37, is mounted between them on the rear cross tied rod 280 of the keyboard. 386 is an upward projection, near the rear of the arm 384, to which the lower end of the universal correction key 383 is pivotally connected. Arm 384 carries a roller 387 projecting laterally above one of the arms 319 of the universal restoring bar 318, and also above a lower arm 388 of a rock lever, the upper arm 389 of which is connected to a rearwardly extending bar 390 supported in the section of the keyboard frame in which the universal correction key is located. The bar 390 has, near its rear end, a downwardly extending shoulder 391, Figs. 9, 10, 11 and 34, which normally stands in rear of a slot 392 in the rear edge of bar 340.

When the universal correction key is depressed it pushes arm 384 downwardly, causing the roller 387 to press down the arm 319 of the universal restoring bar 318, thereby causing the latter to restore all the depressed number keys to their unlocked position, by restoring their lock bars to normal position. At the same time, the roller 387 presses down the arm 388, throwing arm 389 forward. The latter pulls with it the bar 390, causing the shoulder 391 to enter the slot 392 in the bar 340, whereby the machine is prevented from operating in case either the operating key or operating lever is actuated. A spring 393 (Fig. 34) on the bar 390, returns the parts to normal position when the universal correction key is released, and the rearward movement of said bar 390 is arrested by a stop 394 engaging the front web of its frame section 273.

The universal correction key cannot be depressed when the machine has started operating, until the number keys are released, as the bar 340 moves the slot 392 out of the path of the shoulder 391 and interposes its higher edge or stop lug in the path thereof However, as soon as bar 340 is returned, the universal correction key is again operable.

*Early setting keys*

The keys may be set for a subsequent operation while the last operation is still in progress, whereby much time may be saved that is usually lost by an expert or rapid operator in being compelled to wait until near the end of the operation of the machine for the restoration of the number keys.

If, after the number keys have been thus early restored, and before the operation of the machine is complete, the operator depresses other keys in the same columns, the operation will be as follows:—

As has been described, the detent pawls 333 are lowered to engage the teeth 295, on the stop bars 289, immediately before the depressed keys are released and allowed to be raised by their springs, the purpose of which is to prevent the stop bars 289 and their stop arms from being moved forward when released from said key. Each displaced stop bar is restored to normal position during the latter half of the machine operation in the manner fully described in the parent application, and when, during its rearward movement, the inclined rear face of one of its stops 293 approaches a key depressed, the stop bar moves bodily downward to permit its stop to pass said key. The yielding support of the stop bar on the arms 328 of the rock shaft 327, heretofore described, permits this vertical bodily movement.

*Auxiliary key*

Situated in the same row as the total keys and forward of them is an auxiliary key 452.

The auxiliary key 452 (Figs. 1 and 5) is guided in slots in the top and bottom of the total key section of the keyboard frame, and cooperates with the locking bar 478 of this section (Fig. 43) though not with either the releasing or stop bars. The effect of this relation with the total key bars is to prevent the operation of the machine when the auxiliary key is only partly depressed, but not to operate the key interlocking mechanism controlled by the releasing bars of the total and number keys as previously described.

The lower end of the shank of the auxiliary key rests upon the forward end of a rock arm 457 which is secured to one end of a sleeve 458 (Fig. 41) which is mounted loosely on a stud 459 secured in the frame 3. To the other end of the sleeve 458 is fastened a downwardly extending rock arm 460 to which is pivoted a forked link 461 which extends rearwardly in the machine, the forked end of said link straddling a pin 462 projecting from the side of a downwardly extending rock arm 463. Arm 463 is fixed to a sleeve 464 loosely mounted on the shaft 520 which carries the lever associated with the "No print" key 470. In addition to the arm 463 the sleeve 464 has fixed to it two arms 466 and 467, the arm 467 being connected to the alternator, as described in the parent application, and the arm 466 extending rearwardly and its rear end connecting with mechanism which controls the auxiliary sign printing bar in the manner to be presently described. Near the middle of the arm 466 a link 468 is pivotally secured thereon for the purpose of controlling the totalizer engaging devices in the manner described in the parent application.

Identifying shifting keys

345, 356, 357, 358, 452, 469, 470, 471, 472 and 473, represent the keys of a column of identifying shifting keys, as shown in Figs. 1, 5 and 7. Reference is made to the diagrammatic representation of these keys shown in Fig. 43 for a clear understanding of the functions and particular attributes of each of these keys, said functions and attributes being separately described hereinafter.

The identifying shifting keys are constructed similar to the number keys, and arranged in a longitudinal row, parallel with and to the left of the number keys, for the purpose of facilitating their manipulation with the left hand while the right hand is engaged in setting the number keys or manipulating the operating key or lever, also for the purpose of facilitating the manufacture of the machine, these keys being in close proximity to the mechanism to which they are connected. The majority of the identifying shifting keys are constructed to automatically print a sign or word to the right of, and adjacent to, the number printed whenever the mechanism is under the control of one of these keys, to identify the key used and the nature of the operation, and for other purposes which will be treated in connection with the respective keys.

This row of keys has its differential stop bar 488 (Fig. 31) arranged to the right and its releasing bars 475 and 476 (Fig. 28) to the left of the central locking bar 478 (Fig. 30) and is preferably so constructed that the latter does not release to restore the depressed key until the operation of the machine is completed or nearly completed.

The means for restoring the depressed keys near the end of the operation of the machine has been described under the heading "Number and total key interlock."

Identifying shifting keys releasing bar

The releasing bar 474, Figs. 27, 28 and 29, is constructed in two sections (front and rear) 475 and 476, respectively. Section 475 has an upwardly facing hook at its rear end, and section 476 has a downwardly facing hook at its front end. These two hooks interlock so as to form a loose connection between the two sections. This loose connection is provided so that the total and number key interlocking mechanism heretofore described will have no effect on the other identifying shifting keys; that is, only the total keys (345, 356, 357 and 358) of this row will, when depressed, lock the number keys and release the zero stops, or be locked by depressing the number keys.

The section 475 is provided with four lugs 322 which are the same as the corresponding lugs of the number key releasing bars, and section 476 is provided with two of said lugs 322. The lugs on section 475 are for cooperating with the total keys while those on section 476 are for cooperating with keys 471 and 473. No such lugs are provided for keys 452, 469, 470 and 472, which do not operate said sections and the mechanism thereof.

Section 475 carries the two lower fingers or lugs 355 and 373, the functions and operation of which have already been described.

Section 476 has a rear lug 324, which is the same as those on the number key release bar, for the purpose of raising its latch 331 for allowing the related stop bar to move forward when any key of its row, for which there is a cooperating lug 322 on the release bar 474, is depressed and the machine operated.

Identifying shifting keys lock bar

478, Figs. 30 and 33, represents the lock bar of the column of identifying shifting keys.

This bar has hooks 297[b] which are somewhat similar to the hooks 297 of the number key lock bar 290, differing in that the hooks 297[b] are shorter and of greater height, so that the upper cam face 298[a] of each hook engages against its associated key to stop the rearward movement of bar 478; the point of the bills being capable of entering the openings 287 and 288, but the entire bill being too high to fully enter either of said openings. In the normal position of the bar 478 its hooks are engaged into one or the other of the openings in the keys with faces 298[a] resting against the upper edges of said engaged openings. In this position of the bar 478, if a key is depressed, it acts upon the correlated face 298[a] to force bar 478 forward and release any key which may previously have been depressed; after which, the bar is drawn rearward by its spring 308 to engage in the opening 287 of the key last depressed and lock said key in depressed position.

As soon as the machine is operated the bar 478 is locked against movement and remains so locked until the end or near the end of the operation when it is moved forward to release the keys, and then returned to normal or what may be termed half-locking position. The mechanism for this purpose is as follows:

The restoring of the lock-bar 478 has previously been mentioned as effected by a lever 368 through a link 371 and a lever 372. This lever 372 has a downwardly and rearwardly extending arm 479 (Fig. 7) having a fork at its rear end carrying upper and lower rollers 480 and 481, respectively, which ride on the periphery of a pair of cam disks 482 and 483 fixed on the main driving-shaft 140. A forwardly extending arm 484 on restoring lever 368 has on its front end a hook 485 which co-operates with a laterally extending lower front finger 486 on the lock-bar 478. When the machine is operated the shaft 140 and cams 482 and 483 turn, rocking the lever 479 and moving link 371 forward, whereby arm 369 moves rearwardly, and hook 485 moves up in front of finger 486 and detains the bar 478 in its fully locked position. As the operating-shaft nears the end of its revolution, the parts are moved (on account of the contour of the peripheries of the cam disks 482 and 483) in the opposite direction whereby the hook 485 releases the locking-bar 478, and arm 369 contacts with the upper laterally extending finger 367 and forces the lock bar forward until the keys are released, after which the finger 369 return toward the rear far enough to permit bar 478 to be again moved to its half-locking position by its spring 308.

The locking bar 478 also differs from the locking bars 290 in that the latter has shoulders 301, 302 and 303 and lug 304 which are absent in the bar 478; and differences exist in other minor details.

Identifying shifting keys stop bar 488 (Figs. 31 and 32) represents the stop bar for the identifying shifting keys. This stop bar is provided with stop teeth or lugs 293 like those of the number key stop bars 289 but less in number, there being provided one for each of the following identifying shifting keys only, viz. 345, 356, 357, 358 and 471 (Fig. 43). The main detent tooth 294 acts as a stop lug to cooperate with key 473. Only one auxiliary detent tooth 295 is provided, whose only function is to hold the stop bar against movement until the machine operates, more of these teeth being unnecessary, as the machine does not release the keys of this row until near the end of the operation. A lower tooth or lug 733 is provided near the rear end of bar 488, the purpose of which is to cause printing of certain clear signs. The bar 488 is connected through a yoke 296, similar to the yokes of the number key stop bars, with sign print controlling mechanism fully described in the parent application.

Each of said identifying shifting keys has on its upper surface an identifying mark to designate the purpose for which said key is to be used.

Figure 41:
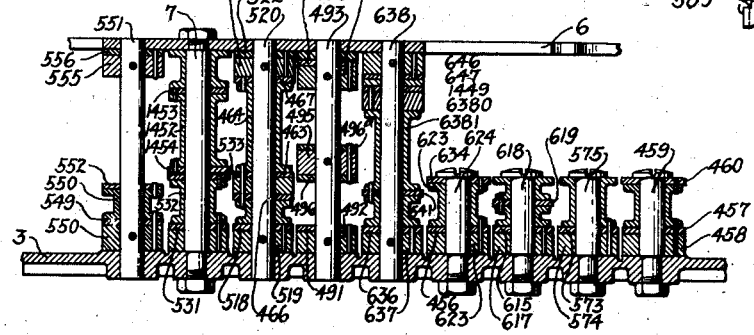
Fig. 41 is a sectional view on a plane passing through the center line of the identifying shifting key lever shafts and studs.

The subtracting key 469 (Figs. 1 and 5) represents the subtracting key. The mechanism actuated by the depression of this key is in part as follows:

The shank of the subtracting key 469 is positioned in the keyboard so that its lower end is directly above and rests upon a flat upwardly facing shoulder 490 of a curved rock lever 491 secured on a collar 492 which is fast on a shaft 493 mounted in bearings in the frames 3 and 6 (Fig. 41). A downwardly extending arm 494 (Fig. 5) of lever 491 carries a link or lever 515 connected to the auxiliary sign printing mechanism, and its lower end cooperates with the adjacent forward key 358 of its column in a manner to be later described. A collar or hub 495 (Fig. 41) is also secured to said shaft 493 and has secured thereto left and right hand depending rock arms 496 and 496a. The arm 496 is provided on one side with a pin 497 which operates, in a manner to be later explained, to prevent the depression of any total key while said subtracting key is depressed.

498 (Fig. 41) represents a third sleeve mounted on and secured to shaft 493 near its inner end, and having associated therewith mechanism for effecting subtraction which is fully described in the parent application.

The auxiliary sign mechanism

There are two sign printing mechanisms for printing designating signs (which may be either words, abbreviations or arbitrary symbols) to the right of numbers as printed. The first may be termed the "main sign printing mechanism", and operates to print signs when any shifting key of the set, comprising the total keys 345, 356, 357 and 358, the no-add key 471 and the special key 473, is depressed; also to print a sign with the first number printed and added on an accumulator after said accumulator has been cleared or all the accumulators have been cleared. This mechanism is related to, and has been described with, the stop bar of the identifying shifting keys.

The second sign printing mechanism is what may be termed the "auxiliary sign mechanism" and operates to print signs when either or both the auxiliary key and subtracting key are operative; said auxiliary and subtracting keys constituting a set of shifting keys separate from the above mentioned set. As described in the parent application, a type carrier and a controlling stop bar, similar to stop bars for the numeral and total keys, is provided. Said stop bar is associated with an arm 513 (Fig. 5) connected through a link 514 to a pivot rod 746, supported by a pair of rock arms 707 which are rigidly secured to each other and pivoted on a stud 544. The arm 513 is provided with a pivot or stud at its lower end, which is slidably engaged with a slot in the front end of the bar or link 514. A spring 514a connects the link 514 and arm 513.

An auxiliary sign cam lever 515 (Fig. 5), provided at one end with a slot cam 745 which embraces the pivot rod 746, is pivoted at its opposite end to the arm 494 of the subtracting key rock lever and is connected near its cam end by a link 516 to the rear end of arm 466 of the auxiliary key mechanism. The slot cam 745 is constructed with a dwell at each end and positioned with relation to the pivot of lever 515 so as to move the pivot 746 two steps as the last mentioned pivot rides from one to the other of said dwells. Thus, when the auxiliary key is depressed, its arm 466 raises cam lever 515 which causes rod 746 to move link 514 and arm 513 two steps rearwardly.

The auxiliary sign cam lever 515 is pivoted to the arm 494 of the subtracting key rock lever, so that when the subtracting key is depressed the lever 515 is bodily displaced and moves the link 514 one step.

Upon the concomitant setting of the auxiliary and subtracting keys lever 515 is both bodily displaced and rocked about its pivot, thus imparting a greater amount of throw to the link 514 than is imparted by either key alone, viz: three steps, and the type bar controlling stop is positioned accordingly.

No-print key

Sometimes it is desired to add a list of numbers without printing the same, and to permit of doing this a no-print key 470 is provided and operatively connected with the printing mechanism. The no-print key 470 (Figs. 1 and 5) is arranged in the row of identifying shifting keys. The lower end of the shank of this key bears upon a flat upwardly facing shoulder 517 on a curved rock arm 518 mounted on and fast to a sleeve 519 (Fig. 41) secured to the shaft 520, which may be termed the no-print shaft. This shaft has its bearings in the frames 3 and 6 and has a collar 521 fixed on its inner end adjacent to frame 6. Riveted to the collar 521 is a depending rock arm 522, the movement of which disables printing in the manner described in the parent application.

No-add key

Means are provided whereby the accumulators are made inoperative while the printing device remains operative whereby a number may be printed without affecting any of the accumulators. The mechanism for this purpose is constructed as follows:

471, Figs. 1 and 5, represents a no-add key situated in the column of identifying shifting keys. The lower end of the shank of this key engages with a flat upwardly facing shoulder 530 on a curved rock arm 531 mounted on and secured to a sleeve 532 (Fig. 41) loose on the tie rod 7 between frames 3 and 6. A depending rock lever 533 is secured to sleeve 532 at its inner end. The rock lever 533 has a rearwardly extending arm 534 (Fig. 5) which operates on the clear sign mechanism, and a downwardly extending arm 535 connects at its lower end with means whereby the carriage may control the function of this key, as will be hereinafter described. Projecting laterally from the side of arm 535 is a pin 536 (Figs. 5 and 42) which is positioned in front of a forwardly facing rear shoulder on a link 538, extending forwardly in the machine in a plane parallel with frame 3 and having a rearwardly facing front shoulder 539 near its forward end. The shoulder 539 faces and is directly in front of a lip 540 on a neutralizing rock arm 541 pivoted loosely on the minus transfer shaft 638, and functioning to control the engagement of the totalizers with their actuators in the manner described in the parent application.

Horizontal rule key

Means are provided for automatically printing a horizontal line, as for instance, between the bottom of a column and its total.

472, Figs. 1 and 5, represents a horizontal rule key located in the column of identifying shifting keys. The lower end of the shank of this key engages with a flat upwardly facing shoulder 548 on a curved rock arm 549 fast on the sleeve 550 secured to one end of a shaft 551 having its bearings in frames 3 and 6 (Fig. 41). To sleeve 550 is secured a depending rock arm 552 from the lower portion of which projects a pin or shoulder 553. This pin 553 supports the hooked rear end of the aforementioned link 538, the hook 554 of which engages with said pin 553. On the opposite end of shaft 551 from that on which sleeve 550 is mounted is secured a second sleeve 555 having fast thereon a depending rock arm 556 which controls a horizontal ruling mechanism in the manner fully described in the parent application.

Special key

473, Figs. 1 and 5, represents a special key situated in the row of identifying shifting keys. One purpose of this key is to position the main sign mechanism for printing a special sign with any desired item for which purpose a special type is provided and if desired a modified stop bar may be provided to suit the requirements of any particular business.

Assuming that in a particular business or business system it is desirable to indicate a balance by a printed sign; a special type can be provided for printing the desired sign, in lieu of the sub-total sign, by holding down the special key 473 while the sub-total key is depressed. For this purpose the stop tooth or lug 293 cooperating with the special key is placed on the stop bar to normally rest nearer its key than the lug cooperating with the sub-total key, so that upon depressing both the sub-total and special key and operating the machine, the special sign for "balance" is printed in lieu of the sub-total sign with the number representing the sub-total. The special key is not locked down upon depressing it but is intended to be held down by the operator until locked by 478 at the operation of the machine.

The special key has a beak or detent 297ª on lock bar 478, Fig. 30. This beak has its entire under face 477 inclined. When the special key is depressed it operates to release all the other shifting keys depressed (in the manner described for the number key) and if not held depressed until the machine operates the key will slide upward along the cam face 477, releasing itself from the detent 297ª; the restoring spring of this key being made sufficiently strong for this purpose. If, however, the special key be held depressed, a second shift key may be depressed, and when the machine is thereafter operated the special key will be locked down, owing to the lock bar being immovably locked during the greater portion of the operation of the machine.

The sub-total key

Means are provided for printing a sub-total from either set of accumulators, when desired. For this purpose, a key 345, hereinafter referred to as the "sub-total key", is provided. If the machine is operated with the sub-total key alone depressed a sub total will be taken from the main accumulators. Said sub-total key may also control the printing of an identifying sign, such as a * to identify a main sub total, and the * in conjunction with the usual auxiliary accumulator identifying sign to indicate an auxiliary sub-total.

Figure 2:
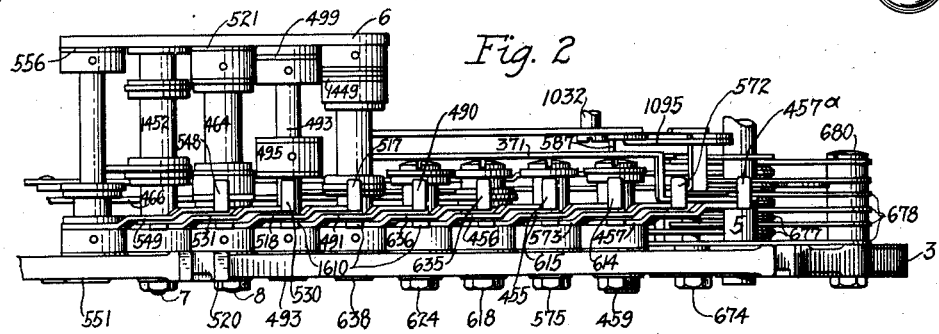
Fig. 2 is a fragmentary plan view showing the arrangement of the shifting key levers, the keys and keyboard being removed.

572, Figs. 2 and 5, represents a flat upwardly facing shoulder of a curved rock lever 573, the shoulder 572 being positioned directly under the lower end of the shank of the sub-total key 345. The lever 573 is mounted on and secured to a sleeve 574 (Fig. 41), loose on a stud 575 secured to the frame 3, and has a depending arm 576 (Fig. 42) which carries a pin 577 near its center, said pin extending laterally into a recess 578 in a nearly horizontal link 585ᶜ, the function of which will be presently explained. Other connections from lever 576 and link 585ᶜ effect the control of the totalizers for taking a sub-total in the manner fully described in the parent application.

The total key

356, Figs. 1 and 5, represents the total key which is designed for printing a total of either the main or auxiliary accumulators together with a designating sign and at the same time to clear said set of accumulators or turn them to the zero position.

614, Fig. 2, is an upwardly facing flat shoulder positioned directly under the end of the stem of the total key 356, said shoulder being on a rock lever 615. The lower arm 616 of lever 615 is connected to a link 585ª for a purpose to be presently explained.

617 (Fig. 41) is a sleeve loose on a stud 618 secured to the frame 3, said sleeve having the lever 615 mounted on and secured to it at one end. 619 is a rearwardly extending lever secured to a second sleeve on stud 618 and acting to control

The plus-transfer key

The plus-transferring key 357 (Figs. 1 and 5) is designed to cause printing of the total upon and the clearing of one set of accumulators, and the adding of the amount of such total upon the other set of accumulators, leaving the first set clear; and to cause simultaneous printing of a designating sign. In construction and operation it is generally similar to the total keys, heretofore described.

455, Fig. 2, represents an upwardly facing shoulder on a rock lever 456, said shoulder being positioned directly under the lower end of the shank of the plus-transfer key. The lever 456 is secured on a sleeve 623 (Fig. 41) loosely mounted on a stud 624 secured to the frame 3. A lower arm 625 (of lever 456) carries near its end a laterally projecting pin 626 (Fig. 42) which engages with a slot 627 in the edge of the cooperating link 585ᵈ, extending parallel with and generally similar to the aforementioned links 585ᵃ, 585ᵇ and 585ᶜ. The connections from lever 625 control the totalizer engaging devices to effect the transfer of a total from one totalizer to another in the manner described in the parent application.

The key 357 has a cooperating stop lug on the bar 488 which operates to position a type on the main sign mechanism to print an identifying sign with the number showing the total or amount transferred; and when both the auxiliary and plus-transfer keys are used the plus-transfer and the auxiliary signs are printed simultaneously with the transferred total.

The minus-transfer key

Means are provided, as described in the parent application, for automatically printing a total of one set of accumulators, clearing said set, and subtracting said total from the other set of accumulators. This is useful for many purposes, one of which is to facilitate the taking of trial balance sheets from a ledger or the like so these sheets will show all the debit and credit items, together with the individual balance of each account, and at the same time retain the net balance, whether debit or credit, in the machine; and when all the ledger accounts have been listed and balances printed print the net or trial balance of all the accounts.

Figure 42:
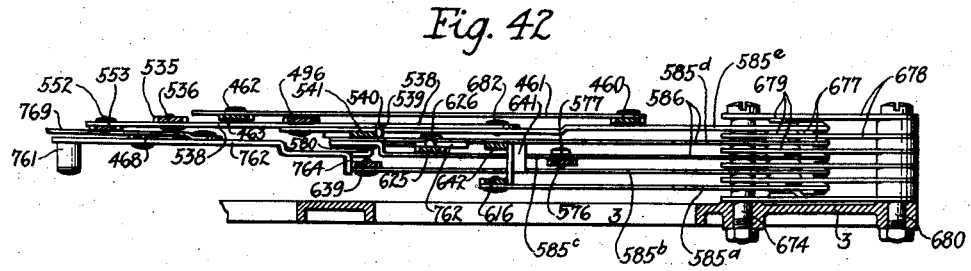
Fig. 42 is a fragmentary sectional plan view illustrating the shifting key interlock links and their connections.

635, Fig. 2, represents an upwardly facing flat shoulder on a rock lever or key lever 636, said shoulder standing directly under the lower end of the shank of the minus-transfer key 358. 637, Figs. 2 and 41, represents the sleeve on which lever 636 is secured, and 638 the shaft upon which said sleeve is mounted, said sleeve being fast to said shaft so that both move together. 639, Figs. 5 and 42, is a depending arm of rock lever 636 and carries near its lower end a pin 640 which pivotally connects it with the rear end of the respective link 585ᵇ. This link 585ᵇ also carries a bent-over finger 641 which normally stands in front of the depending arm 642 of the lever 619 of the total key 356.

643, Fig. 5, represents a rear arm of lever 636. This arm cooperates with arm 494 of the subtracting key 469 so that the depression of either key locks the other, as follows:

When the subtracting key is depressed a finger 644 of arm 494 moves over a laterally projecting finger 645 on arm 643, thereby locking the minus-transfer key 358. When the minus-transfer key is depressed it causes the finger 645 to move up in rear of finger 644, thereby locking the subtracting key against depression.

The other mechanisms controlled or actuated by the movement of sleeve 637 are fully described in the parent application.

Identifying shifting key levers

All of the levers that are immediately actuated by the identifying shifting keys, and which comprise the arms 549, 531, 518, 491, 636, 456, 615, 573 and 457, respectively, (Figs. 2 and 5) are preferably stamped from sheet metal, as are all other elements of the machine, where such construction is practical, and although they vary in details all embody the same general principles of construction, namely:

Each of these key levers is formed with an axle seat, such as the seat 458 (Fig. 41) for the key lever 457, through which extends the axle or shaft, such as shaft 459, on or with which it is mounted to rock or swing; each is formed with an upwardly and forwardly curved arm having its forward end bent over to form a substantially horizontal ledge underlying its respective key. Each curved arm is offset by being bent laterally (see Fig. 2); and each of said levers is formed with a guide arm or lug 1610 (Figs. 2 and 5) except that this guide arm may be omitted in forming the rearmost of the levers (as illustrated). The rearmost arm 549 is guided and prevented from moving leftward by the guide arm 1610 of the next adjacent key lever, the latter being retained against movement to the right by the contact of its own arm 1610 with the rearmost key lever, and against movement to the left by the arm 1610 of the adjacent forward key lever 518.

From the foregoing it will be seen that these key levers reciprocally and mutually guide one another and prevent axial movement of one another at all times. By offsetting the key contacting arms as shown the hubs of all the key levers are permitted to be arranged in alignment and in the same vertical plane, but this same arrangement could be attained by offsetting the guide arms, so that only one offset, instead of the two illustrated, would be necessary for enabling the key contacting arms to clear each other.

Identifying shifting key interlocking mechanism

The column of identifying shifting keys comprises two groups, one group of which is connected with a locking or blocking system. The keys of said first group are in two sub-groups. One key only of the first sub-group may be depressed, depression of any such key locks out all keys of the second sub-group, and the keys of said second sub-group reciprocally lock out all keys of the first sub-group. There is no interlocking whatever between keys of the two main groups. The auxiliary key, non-print key, and the special key, comprise one main group; and the remaining shift keys comprise the second main group. The four total keys constitute one sub-group of which only one can be depressed at a time, and the subtraction, non-add and ruling keys, comprise the second sub-group.

The mechanism whereby only one total key can be depressed at a time; whereby the ruling key 472, no add key 471, and subtracting key 469 are locked against depression by any one of the total keys; and whereby all the total keys are locked against depression by the no-add key, the ruling key, or the subtracting key; is constructed as follows:—

One of the links of the group 585 (Fig. 42), as heretofore described, is pulled rearwardly every time a total key is depressed. One of the purposes of this movement is the operating of the shifting key interlock.

674, Figs. 6 and 42, represents a rod or stud mounted on frame 3 and extending through guide slots 675 in the links 585$^a$, 585$^b$, 585$^c$, and 585$^d$, of the total keys and the link 585$^e$ of the subtracting key mechanism. The rear hooked end of link 585$^e$ rests on pin 497 of the subtracting key rock arm 496, as shown in Fig. 5. Springs 613 normally hold the links of the group 585 in their foremost position so that the rear ends of slots 675 rest against rod 674. Each link carries at its forward end a disk, stop or wedge 677 on each side; said disks or stops (Figs. 6 and 42) having beveled edges and being secured immovably to their respective links by rivets or any desirable means. 678 represents a number of links, one of which is mounted loosely at its rear end on rod 674 between each link of the group 585 and its next adjacent link; and one of said links 678 is mounted on each side of the group 585 on said rod 674. The several links 678 carry beveled disks, wedges or stops 679, similar to 677, and so positioned that normally each of the wedges 677 lies just forward from and in a position to enter between a pair of the wedges 679. The forward ends of links 678 are mounted on a rod or stud 680 fastened to the frame 3.

The link 538, Fig. 5, (as previously described) is connected with the ruling and no-add keys, so that the depression of either of these keys forces said link rearward. This link 538 is loosely connected with the subtracting link 585$^e$ so that the latter may move rearward independently of the link 538, but the link 538, in moving rearward, carries the link 585$^e$ with it. This loose or slack connection of the subtracting-link and link 538 comprises a hook 681, on the front end of link 538, and a laterally projecting pin 682, on the link 585$^e$, said hook 681 resting over said pin 682.

The no-print key 470, special-key 473, and auxiliary key 452 are not connected with the blocking system, and any of these may be depressed at the same time that one of the keys connected with said blocking system is depressed.

The wedges or stops 679 are so spaced apart that when one of the links of the group 585 moves rearward, there is sufficient space for its respective wedge 677 to enter between its two adjacent disks 679, but the wedges 679 are thereby forced against each other so that there is no room for the entrance of a second wedge 677.

When any key connected with the blocking system is depressed it operates, as hereinbefore described, to draw one of the links rearwardly, forcing its wedge 677 into the space between said wedges 679 and presses them laterally, thereby filling all the available space between the wedges 679, and if it is then attempted to depress any other key connected with another link, its wedge 677 will be blocked against rearward movement and the respective key will be thereby blocked against movement.

As the subtracting key, no-add key, and horizontal rule key have one wedge in common they may be depressed simultaneously, and do not operate to block the depression of each other. Should any of the keys connected with the blocking system be depressed in error, subsequent depression of the correct key is not prevented, as said correct key would release said incorrect key by means of lock bar 478 before its wedge or stop 677 would be forced between the wedges 679.

The driving mechanism

The driving mechanism of this machine is constructed to be operated manually, although if it is desired it may be operated by power.

The mechanism comprising this hand operated driving device is constructed as follows:—

The machine is provided with an operating key 741 and an operating lever 775. In ordinary operations of the machine the operation of the key furnishes sufficient power; but in doing heavy work the operating lever should be used from time to time to store up a surplus amount of power, said operating lever being particularly constructed for this purpose.

Figure 3:
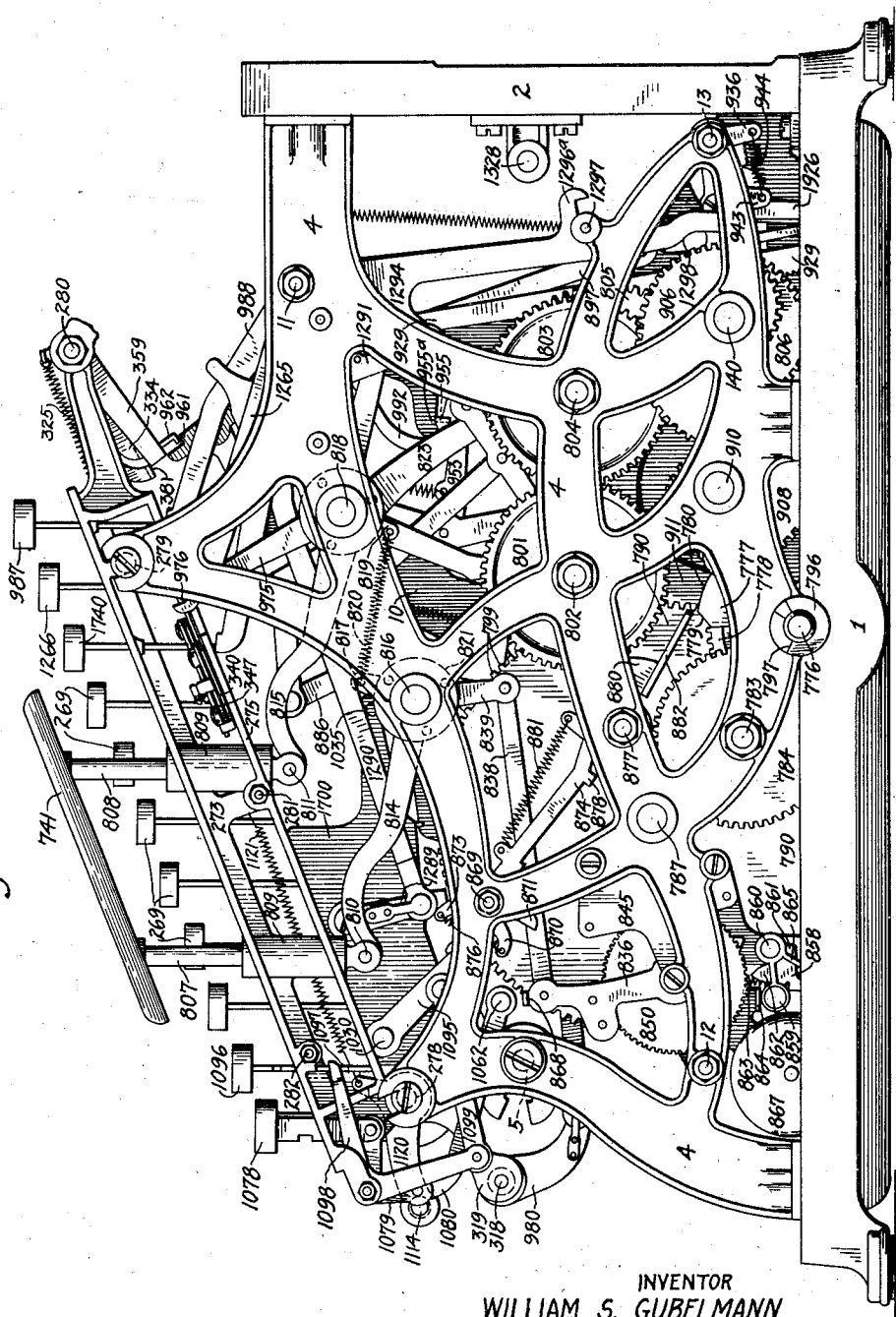
Fig. 3 is a right side elevation of the machine except the carriage, the cover being removed.
Figure 4:
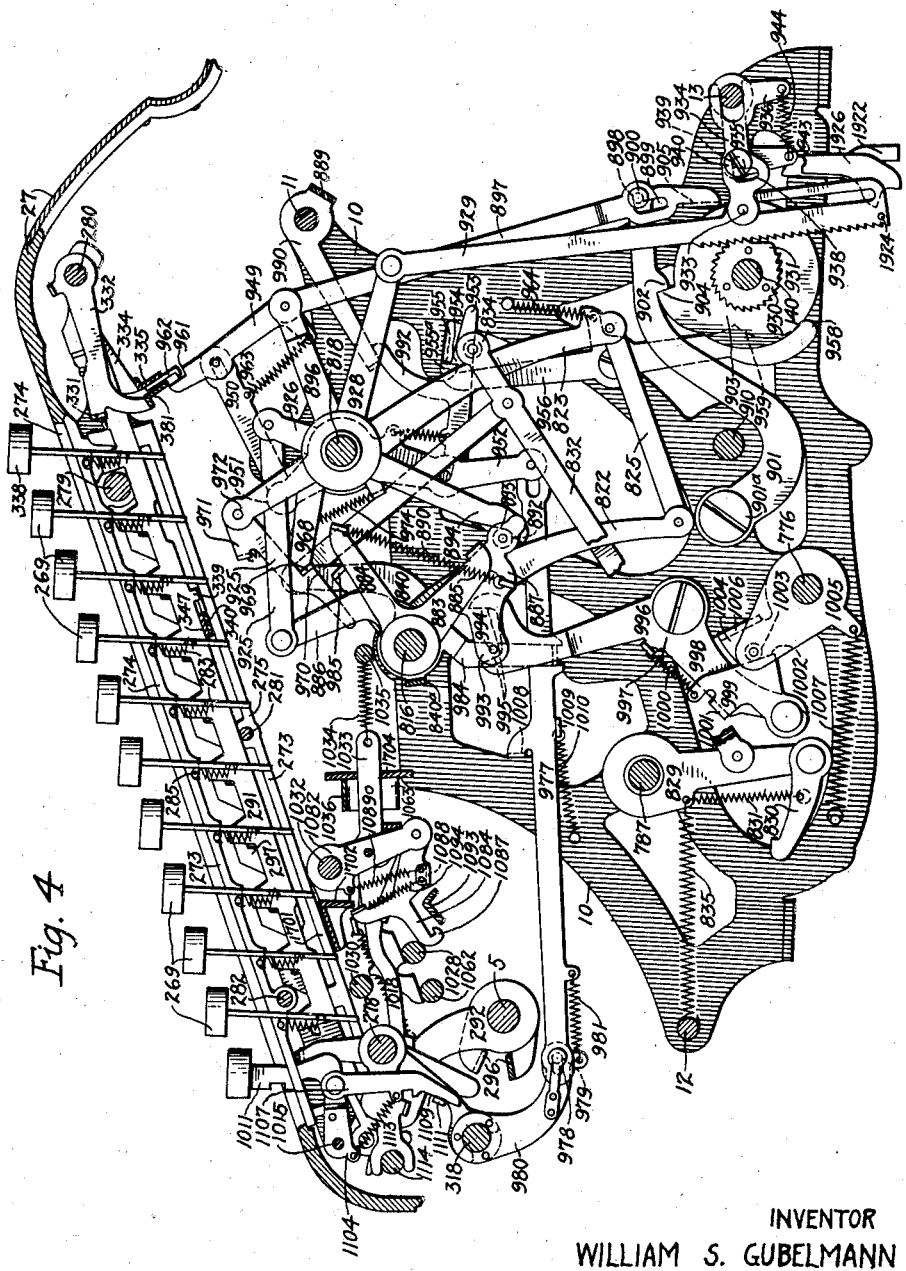
Fig. 4 is a fragmentary vertical longitudinal section showing the parts associated with the operating key.

The operating lever 775 is removably secured on the outer end of a transverse shaft 776 which may be termed the operating lever shaft and is mounted in the frames 4 and 10 (Figs. 3 and 4). The shaft 776 has attached to it a segmental body 777 comprising a portion carrying gear teeth 778, a stop shoulder 779, a guide portion 780, and a second stop shoulder 781. The gear teeth 778 of this segmental body mesh with the teeth of a small gear wheel the rotation of which transmits power to a spring motor comprising a gear 790 on shaft 787. The movement of handle 775 also releases the main operating shaft 140 for rotation by the spring motor, all as more fully described in the parent application.

The operating key

Situated at the right hand side of the keyboard and extending above the same is a key 741, Figs. 1, 3 and 44, which performs functions similar to those of the operating lever and may be termed the "operating key". This key comprises two stems or shanks, one 807 toward the front of the machine and the other 808 toward the back, which pass through two guideways 809, Fig. 3, secured in the keyboard frame. At their lower ends the stems 807 and 808 carry lateral pins 810 and 811, respectively, which work in slots in front and rear rock arms 814 and 815. The front rock arm 814 is mounted on a shaft 816 and has an upwardly projecting ear 817, and the rear rock arm 815 is mounted on a shaft 818 and has a downwardly projecting ear 819. A spring 820 connects the ears 817 and 819 and tends to hold the operating key in its elevated position. Hubs 821 are provided for arms 814 and 815, said hubs being secured to said arms and also to their respective shafts 816 and 818 so that said shafts are turned by the depression of the operating key. Means are provided comprising an arm 823 (Fig. 4) associated with shaft 818 and an arm 822 associated with shaft 816, by which the excess of power applied to operating key 741 is stored in the power spring, all as fully described in the parent application.

Control of operating shaft

Means are provided for releasing the operating mechanism when the operating key is depressed, as illustrated in Figs. 4 and 44.

883 represents a rock lever secured on the shaft 816 of the operating key mechanism, said rock lever having upper and lower rear arms 884 and 885. 886 and 887 represent upper and lower arms respectively of a rock lever mounted loosely on shaft 816 adjacent to lever 883. 888 is a bent over finger on arm 884; 889 is a similar finger on arm 887, and 890 is a spring connecting fingers 888 and 889 and tending constantly to hold arm 887 against a finger 891 projecting laterally from arm 885. The arm 887 carries a roller 892 near its end, which roller normally stands in front of a cam face 893 of a lower arm 894 of a rock lever 895 mounted loosely on shaft 818 and having a rearwardly and upwardly projecting arm 896, which arm is connected at its rear end to a link 897 which extends downwardly in the machine. The link 897 is broadened near its lower end and a bayonet slot is formed in this broadened portion. This slot has a rearwardly extending upper portion 898, and a downwardly extending lower portion 899. 900 represents a pin extending laterally from the rear end of a curved rock arm or detent 901, which rock arm is pivoted at 901a to the frame 10 and which pin extends normally into the upper rear portion 898 of the slot in link 897. 902 represents a downwardly extending stop lug formed on the under side of the rock arm 901 near its rear end, said stop lug having a forwardly facing abrupt edge. 903 represents a locking disk or cam which is mounted on and secured to the main operating shaft 140 near the right-hand end of said shaft; and 904 is a stop lug or shoulder formed on the disk 903 and having an abrupt face adapted to engage with the abrupt face of the stop lug 902.

When the operating key is depressed the shaft 816 is turned, thereby rocking lever 883 which, through spring 890, raises arm 887 so that roller 892 rides up the cam 893 rocking arm 894 rearwardly. As arm 894 moves rearwardly, the arm 896 is raised, lifting link 897 which, through the medium of the shoulder in the slot 898 and pin 900, raises the rear end of rock arm 901 so that the stop lug 902 is drawn out of engagement with the stop lug 904 of the operating cam, allowing the operating cam 903 and shaft 140 to be rotated by the spring motor.

Means are provided for stopping the operating shaft at the end of one revolution when the operating key is held depressed.

905 (Fig. 4) represents a finger projecting from the lower front edge of the link 897 and standing in the path of the stop lug 904 of the disk 903. During the first part of the revolution of the disk, the stop lug 904 strikes the finger 905 forcing the link 897 rearwardly, whereby the pin 900 on arm 901 passes out of the upper portion 898 of the slot and drops down in the portion 899. The arm 901 is thus lowered so that the stop 902 will engage the stop 904 when the disk 903 has completed a revolution, even though the link 897 should remain raised. After the operating key 741 is released the link 897 is lowered, and its lower end drops forward by gravity and again engages the pin 900 in the upper rearward extension 898 of its slot.

*Operating key restraining mechanism*

Means are provided for restraining the return of the operating key, as shown in Figs. 3 and 4.

925 represents a rearwardly extending link connecting the arm 886 with the upper arm 926 of an elbow lever mounted on shaft 818. The rear arm 928 of lever 927 supports a depending ratchet bar 929 having ratchet teeth on its lower front edge. 930 represents a ratchet wheel secured to the main operating shaft 140, the teeth of which engage the ratchet teeth of the bar 929. The ratchet wheel 930 comprises three sheets of metal arranged side by side and riveted to a hub or sleeve secured on the main operating shaft 140, the disk 903 being riveted to the other end of said sleeve.

When the operating key is depressed the arm 886 is moved to draw link 925 forward, thereby swinging arm 926 forward, rocking lever 927 and causing arm 928 to lift bar 929, the ratchet teeth thereof sliding idly over the teeth of ratchet wheel 930. If the operating key be now released, the train of mechanism tends to force ratchet bar 929 down, but is prevented from doing so by the teeth on bar 929 engaging the teeth on ratchet wheel 930, so that the ratchet bar descends with the revolution of wheel 930 thereby preventing noise and jar.

In case the operating key or lever is only partly depressed, but not far enough to set the operating mechanism in motion, the ratchet bar 929 is held in its partly elevated position by engagement of its teeth with the ratchet wheel 930, which does not move until the machine is set in operation. The ratchet bar connections 927, 925, and 886 are also held in their partly operated positions, and by means of the connections with the operating key (previously described) hold it in its partly depressed position. Since the operating key is connected to ratchet bar 929, the ratchet teeth of which are engaged by ratchet wheel 930 fast to the operating shaft 140; and, since shaft 140 is governed by the fly wheel, the return of the operating key is also governed by the fly wheel.

When the operating key has been depressed and released, the operating key returning spring 820, through the train of mechanism above-described, exerts a downward pressure on ratchet bar 929. Thus the spring is connected to shaft 140 and fly wheel 911, and exerts a slight winding effect upon the motor spring 789.

Means are provided for disengaging the operating key restraining means when the operating key is held down too long, and for rendering it again operative when the key is released and allowed to assume normal position.

931 (Fig. 4) represents a high tooth on the ratchet wheel 930. The lower portion of the ratchet bar 929 is broadened and in this broadened portion is formed a slot 932 in which works a pin 933 extending laterally from the front end of a bar 934. This bar 934 has a slot 935 near its rear end, by means of which slot said bar is mounted on the tie rod 13. 936 is a depending rear finger on bar 934. A bayonet slot near the middle of bar 934 has a downwardly extending front portion 938 and a rearwardly extending upper portion 939, in which latter portion normally rests a pin 940 mounted on frame 10 and extending through a bar 941. Said bar 941 lies parallel with bar 934 and has a rear forked end 942 which straddles the tie rod 13. 943 represents a lower front finger on bar 941, and 944 a spring connecting fingers 936 and 943, which spring tends to keep bar 934 in its forward position with the pin 940 in portion 939 of the bayonet-slot, and to raise the front end of bar 934.

When the operating key is depressed and held depressed the ratchet bar 929 is held in its elevated position and the teeth on ratchet wheel 930 trip idly by the teeth on bar 929 until near the completion of the revolution of ratchet wheel 930, at which time the tooth 931 impinges upon the bar 929, forcing it back. The front edge of slot 932 contacts with pin 933 and pushes bar 934 rearwardly until pin 940 stands over portion 938 of the bayonet slot. The spring 944 now raises the front end of bar 934, so that the pin 940 stands in the portion 938 of the slot, thus locking bar 929 out of engagement with ratchet wheel 930 so that bar 929 is free to descend. When bar 929 descends, the upper end of slot 932 strikes pin 933 forcing bar 934 down until pin 940 stands opposite portion 939 of the bayonet slot; spring 944 now draws bar 934 forward into its normal position. The spring 944 normally holds bar 934 forward and by so doing holds bar 929 in engagement with ratchet wheel 930.

When the operating key is held depressed too long the restraining mechanism thus becomes inoperative, and when the key is thereafter released its return springs brings it to normal with a considerable shock and noise. The operator will thereby be warned that he is not using the machine in the manner intended and will soon learn to operate the machine properly by releasing the key immediately after depressing it.

Universal stop bar releasing mechanism

Universal means are provided for releasing the stop bars of the keys from the detent pawls during the first part of the depression of the operating key, as shown in Figs. 3, 4 and particularly 44 and 46.

945 represents a cam face on the front edge of the lower arm 946 of a rock lever 947 mounted loosely on shaft 818. This cam is operated on by the same roller 892 which operates on cam 893 of the releasing mechanism and is similar to cam 893 but steeper so that cam 945 is operated before the main operating shaft is released. 948 is a rear arm of lever 947 and supports at its end an upright latch 949, which has a pin and slot connection near its upper end with a link 950, which link connects with the upper arm 951 of another rock lever, also loosely mounted on shaft 818, which lever has a downwardly extending arm 952. Arm 952 carries a rearwardly projecting bar 953 having a hook or shoulder 954 on its upper edge. 953a represents a spring for holding bar 953 in a raised position. This hook contacts with a finger 955 from upper arm 956 of a rock lever 957 mounted on a pin 957a secured to the frame 10. The lower arm 958 of lever 957 lies adjacent to the disk 903 and has on its rear edge a cam face 959 which is adapted to be engaged by a pin 960 on the disk 903. The latch 949 has a shoulder 961 which is under a foot 962 secured to the universal detent pawl releasing bar 335. A spring 963 tends to hold latch 949 rearwardly with shoulder 961 under foot 962. A spring 964 tends to hold lever 957 in position for pin 960 to strike cam face 959. 955a represents a stop-shoulder formed on the frame 10 and adapted to limit the forward movement of finger 955 and arm 956.

When the operating key is depressed, during the first part of the downward movement thereof roller 892 rides up the cam face 945, thereby rocking lever 947 which raises latch 949. Latch 949 lifts foot 962, thereby raising the universal detent pawl releasing bar 335, which releases the stop bars by raising all the detent pawls 333. These detent pawls 333 have been holding the locking bars 290 in their intermediate position, but when raised to release the stop bars 289 they allow the locking bars 290 to move to their rearmost, key locking position. When disk 903 has completed substantially half its rotation the pin 960 strikes cam face 959, rocking the lever 957; which through finger 955, hook 954, and bar 953, pulls arm 952 rearward, swinging arm 951 forward.

This draws link 950 and latch 949 forward, withdrawing shoulder 961 from under foot 962, whereupon the bar 335 falls of its own weight.

Operating key locks keyboard

Means are provided for locking all the number and total keys upon depressing the operating key, as shown in Figs. 3, 4 and particularly 44 and 45. 965 represents a cam face on a lower arm 966 of a rock lever 967 mounted loosely on shaft 818. This cam face is operated on by roller 892 which operates on cams 945 and 893. It is generally similar to said cams, but is more sharply inclined, so that it is actuated first; the order of operation being, first cam 965, then cam 945 and then cam 893. 968 represents the upper arm of lever 967, which arm carries a lateral finger 969 engaging with a shoulder 970 of an arm 971 which is connected with the upper end of a rock-arm 972 mounted on one end of a sleeve 973 turning loosely on shaft 818. A spring 974 connects arm 971 to a finger on lever 967, normally holding the arm 971 hooked over finger 969, and likewise holding cam face 965 against roller 892. 975 represents a rock arm mounted on the opposite end of sleeve 973 from arm 972. This rock arm has a fork at its end which engages with one arm of an elbow lever 976 supported in the keyboard frame and connected by its other arm with the universal locking bar 340, which has been fully described under the heading "Operation of machine locks all the number keys".

When the operating key is depressed, the roller 892 rides up on the cam face 965, rocking the lever 967; finger 969 pulls arm 971 forward; this rocks arm 972, sleeve 973, and arm 975; the latter, by means of its forked end, turns elbow lever 976, thereby advancing the bar 340 to lock all the number and total keys in a manner hereinbefore described.

When a key is only partly depressed it prevents locking movement of bar 340, and this bar prevents movement of the train of mechanism back to cam 965; which cam detains roller 892 and thereby detains arm 887. As the operating key is depressed the spring 890 is idly strained. As the arm 887 is blocked, its upper arm 886 (Fig. 46) is not moved and the operating key restraining mechanism connected therewith remains unoperated.

Early key release

Means are provided for an early release of the number keys. The mechanism for this purpose (shown in Figs. 4 and 44) is constructed as follows:

977 represents a link having a slot-and-pin attachment to the lower end of arm 952 and extending forwardly therefrom in the machine. 978 is a slot in link 977 near its front end, and 979 is a pin extending through slot 978 and secured to an arm 980 mounted on the universal restoring bar 318. 981 is a spring which runs from a depending ear on link 977 to a similar ear on arm 980 and which normally holds said link and arm toward each other so that pin 979 rests in the rear portion of slot 978. 982 represents a rock lever mounted loosely on shaft 816, said rock lever having upper and lower arms 983 and 984, respectively. The arm 983 ends in a bent-over finger 985, and arm 984 ends in a laterally projecting finger 986, which latter finger is confined between two lugs on the under edge of link 977.

When the operating key is depressed, the arm 971 of the keyboard-locking mechanism previously described stands in the path of the finger 985 of arm 983. When the pin 960 now strikes cam 959, causing arm 952 to be pulled rearwardly, it first acts to drop the universal detent-pawl releasing bar 335 as already described. Arm 952 in moving rearward carries with it link 977, which in turn rocks the lever 982, finger 985 pushing arm 971 up so that it is unhooked from finger 969, whereupon the spring 350 (Fig. 9) restores to normal position the bars 340 and 347 and the train of mechanism therefrom to and including arm 971. Immediately thereafter the pin 979 on arm 980 having traversed slot 978, link 977 pulls arm 980 rearward, swinging bar 318 rearward. As previously described, this movement of bar 318 restores all the locking bars 290 and thus releases all depressed number keys. As the pin 960 is so positioned as to strike cam 959 late in the first half of the operation of the machine, the keys are restored early in the operation of the machine. The slack connection between link 977 and arm 980 allows the movements to occur in the order described. 1008 represents a stop shoulder formed on the upper edge of link 977 and adapted to abut against a portion of frame 10 so as to prevent link 977 from moving too far forward. 1009 represents a lug formed on the under edge of link 977, to which is connected spring 1010 which returns link 977 and connected parts to their normal position when released.

The repeat key

Situated in the column with the operating key and rearward therefrom are three keys, the rearmost of which is the repeat key, the mechanism for which key is constructed as follows:

987, Fig. 44, represents the repeat key, which is constructed and supported similarly to the number keys. The end of the shank of this key rests over the bent-over front end of a rock arm 988 mounted loosely on tie rod 11, a yoke 989 connects this arm with a companion arm 990 which is also mounted on tie rod 11 and extends downwardly and forwardly, ending in a lateral finger 991 which overlies an upwardly curved arm 992 on the hook bar 953 of the universal stop bar releasing mechanism.

When the repeat key is depressed it swings arm 988 about the rod 11 and, by means of yoke 989, arm 990 and finger 991, forces arm 992 down until it has removed the hook 954 from the path of finger 955, thus rendering inoperative the mechanism for unlocking and restoring the keys and for releasing the universal detent controlling bar 335. A spring 1744, from arm 968 to anchor 1743 secured to frame 10, holds arm 988 in normal position.

Operating lever connections

Means are provided whereby the operating lever may control all the functions of the machine which the operating key controls. For this purpose the forward rock arm 822 of the operating key mechanism has on its front edge a projection 993 carrying a pin 994, which pin is normally against the forward one of the two spaced shoulders 995 on the upper end of an arm 996 of an elbow lever 997 pivoted on a short stud secured in the frame 10. The lever 997 has a lower front arm 998 to the end of which is pivoted a pawl 999. A spring 1000 attached to an ear on the lever 997 and an ear on the pawl 999 tends to hold the latter with a bent over finger 1001 thereof in contact with the upper edge of arm 998. The pawl 999 has a nose 1002 which normally projects under a roller 1003, carried between two rocking plates or crank arms 1004 and 1005 mounted on and secured to the operating lever shaft 776. The plate 1004 is adjacent to the frame 10 and has a flexible finger 1006 which projects through an opening in frame 10 and acts as a stop for limiting the return stroke of the operating lever. 1007 is a spring secured at one end to the frame 10 and at the other to a finger on crank arm 1005 and adapted to return the operating lever. The lever 997 constitutes a loose connection between the operating lever and operating key, being loosely connected at one end by the elements 1002 and 1003 and at the other end by the pin 994 and the shoulder 995.

When the operating lever is depressed, the plates 1004 and 1005 are rocked by shaft 776, and said plates force roller 1003 against the upper edge of nose 1002, thereby swinging lever 997 about its pivot; so that the front shoulder 995 forces pin 994 rearward, thereby rocking the arm and link assembly 822, 825, 823. Arms 822 and 823 being attached to shafts 816 and 818 respectively, depression of the operating lever operates all of the mechanism which the operating key operates. When the operating lever is released, roller 1003 trips idly past nose 1002 raising the pawl 999 without affecting the lever 997.

The various and functional keys

Situated in a transverse row at the front part of the keyboard of the machine is a series of keys which may be termed the "various" keys. One of these keys is situated forward from and between of each pair of adjacent rows of number setting keys; that is, one is placed between the units and tens columns, a second between the tens and hundreds columns, etc.; there being in all one less "various" key than there are rows of number setting keys. There are also four "functional" keys, three of which are situated in the row with the "various" keys, while the fourth is placed at the extreme right of the keyboard and in the transverse row with the number "one" keys of the several columns of number setting keys. The "various" keys have certain functions in common and each has in addition some one special function.

The common functions of these keys are vertical ruling, splitting and column locking. The performance of each of these functions is in part controlled by one of the "functional" keys, three of these keys being assigned respectively to the functions of column locking, vertical rule, and splitting. Any one, two, or all three of the common functions may be performed at the same time. The fourth "functional" key operates in conjunction with any of the "various" keys to control the performance of its individual or "specific" function. The common functions of the various keys will first be considered.

Splitting, or dividing the keyboard

It is often desirable to split or divide the keyboard accumulating mechanism and printing mechanism, so that two or more sets of numbers simultaneously set up on different parts of the keyboard may be separately printed and accumulated. In the absence of a more expressive term, the word "divide" is hereinafter employed to define a point at which the machine is split. For the purpose of splitting the machine, means are provided as follows:

1st. Means are provided for preventing automatic zero printing across the divide when the splitting mechanism is operative.

2nd. Means are provided for preventing carrying across the divide when the splitting mechanism is operative.

3d. Means are provided whereby, when the machine is split or divided and numbers are accumulated in excess of the capacity of any division of the machine except the one on the extreme left, the mechanism in attempting to carry across the divide will operate a detector or audible indicator to notify the operator that the capacity of one division has been exceeded.

4th. Means are provided for preventing the coupling of the nines at the divide when the splitting mechanism is operative.

5th. Means are provided for rendering part of the total printing mechanism inoperative when the adding mechanism has been split.

Each of the "various" keys has its stem 1011 (Figs. 52, 54, 56 and 60) guided in a slot in the upper plate 274 of its particular section 273 of the keyboard frame. The mechanisms associated with the several "various" keys are similar, hence only one will be described. In the forward edge of each stem or shank 1011 is a notch or depression 1012, which is adapted to engage the top plate 274 of the keyboard frame when the key is depressed and pushed forward, thereby locking the key in its depressed position. The lower end of shank 1011 is pivoted to a rock lever 1013 having an upwardly projecting finger 1014 which normally rests against the under side of the plate 274, preventing the elevation of the shank 1011 above its proper normal position. The lever 1013 is pivoted on a pin 1015 which passes through a front arm on the plate 274 of the keyboard frame. This plate has a slot extending from front to rear into which the lever 1013 projects and in which it is secured by the pin 1015. Lever 1013 has a downwardly extending arm 1016 which carries about midway of its length a lateral pin 1017. Pin 1017 is engaged by a hook 1019 on a rearwardly extending link 1018 which has near its rear end a slot 1020 through which passes a pin 1021 which binds link 1018 to several other parts about to be described. 1022 represents a pawl having a slot 1023 near its rear end through which passes pin 1021. This pawl is arranged next to link 1018 and extends forwardly parallel thereto. 1024 is an ear on the upper edge of pawl 1022 to which is attached one end of a spring 1025 the other end of which is attached to an ear 1026 on link 1018. The pawl 1022 has a lower face 1027, which rests on a horizontal transverse rod 1028, and a stop 1029 on the forward part of its upper edge, which stop normally occupies a position below and to the rear of a horizontal transverse rod 1030. Next to pawl 1022 is a short upwardly extending link 1031 which is hung loosely at its upper end on a transverse rod 1032 and supports with its lower end the pin 1021. Arranged next to the link 1013, on the side opposite to pawl 1022, is a rearwardly extending link 1033 which is also pivoted on pin 1021, said pin having its head on the opposite side of this link. The link 1033 has attached to its rear end a spring 1034, the other end of which spring is attached to a transverse rod 1035; said spring tending constantly to pull the pin 1021 and its adjuncts into their normal positions. Near the forward end of the link 1033 is pivoted the forward end of a split bar 1036, the different bars 1036 being offset varying amounts near their forward ends (Fig. 65) to accommodate the set of bars to the wide spaces between the "various" keys and the narrow spaces between the elements of the accumulating and printing mechanisms.

When any "various" key 1011 is depressed it rocks lever 1013, which pulls forward link 1018 which in turn draws pawl arm 1022 forward by means of spring 1025. In moving forward, link 1018 carries with it pin 1021, thus drawing link 1033 and also split bar 1036 forward. The forward movement of the split bar controls the interruption of automatic zero printing at the right of digits, of transfers and nines coupling, in the manner fully described in the parent application.

As heretofore stated, each of the "various" keys controls several functions. In order to perform the "split" function without the other functions the bar 1028 is moved upwardly to carry the pawls 1022 into locking engagement with the rod 1030, thereby locking any displaced split bar 1036 in its forward position regardless of the position of the "various" key. This is done by the use of the key 1050.

*The split key*

The mechanism whereby the bar 1028 is forced up by the depression of the "split" key is constructed as follows:

The split key 1050 (Figs. 1, 48 and 65) is similar to the "various" keys in construction, has the locking notch 1012, and is provided with a cooperating rock lever 1051 mounted similarly to rock levers 1013. 1052 represents a link pivotally attached to the rock lever 1051 and to one of the side arms 1053 of the "split frame." This "split frame" consists of two arms 1053 loosely mounted on the transverse rod 1032 and supporting between them the rod 1028.

When the key 1050 is depressed it rocks lever 1051 which draws link 1052 forward, swinging the split frame up so that rod 1028 raises all the pawls 1022. Those pawls 1022 which are forward are locked from moving back to normal and those which are in normal position are locked from moving forward. The rod 1032 is secured in the side plates 1700 of the functional frame, more fully described in the parent application.

*The vertical ruling mechanism*

Means are provided whereby a line of vertical ruling may be printed between any two adjacent rows of figures at the same time that said figures are printed; that is, vertical ruling may be done between the units and tens, between the tens and hundreds, and between any other two rows, or several lines of ruling may be done simultaneously. As before mentioned, the vertical ruling is done by means of the "various" keys. The mechanism for this purpose as shown in Figs. 3, 4 and 67, is constructed as follows:

Like the split mechanism, the vertical rule mechanism comprises a plurality of similar units, one of which will be described. Each link 1018 of the split-mechanism has a finger 1054 at its rear end, which finger extends to the left from its link 1018 in back of a link 1055 similar to link 1031 of the split mechanism. The link 1055 is supported by rod 1032 and supports a pin 1056 similar to pin 1021. Next to link 1055 (on pin 1056) is a vertical rule pawl arm 1057, and next to arm 1057 is a rearwardly extending link 1058 similar to link 1033 of the split mechanism. The pin 1056 is constructed so as to hold the members 1055, 1057 and 1058 movably together. Pawl arm 1057 is provided with a slot 1059 through which pin 1056 passes, a stop shoulder 1060 and a lower face 1061, which face rests on a horizontal transverse universal bar or rod 1062. A spring 1025 holds pawl arm 1057 forward. 1063 represents a vertical rule bar which is secured to link 1058 and extends rearwardly therefrom; 1064 represents a spring connecting the rule bar to its corresponding split bar 1036; and 1065 is a spring from link 1058 to rod 1035 to hold said link in its rearmost position. The link 1058 has a slot through which pin 1056 passes. This slot is provided to compensate for the difference in movement required to set the split mechanism and that required to set the vertical ruling mechanism, the latter being less than the former. The mechanism by which the forward movement of the vertical rule bar 1063 effects the printing of a vertical line is fully described in the parent application.

Although only a single splitting and a single vertical ruling mechanism has been described, there is one of each for each "various" key and operable thereby, these mechanisms for each "various" key being counter-parts of the similar mechanisms for every other "various" key.

To provide for vertical ruling without performing the other functions of the "various" keys depressed, a bar 1062 acts to latch the pawls 1057 forward in a manner similar to that in which the "split" pawls are latched by bar 1028.

The vertical rule key

The means by which the universal bar or rod 1062 is raised is constructed as follows:

1078, Figs. 1 and 47, represents the vertical rule key, and is constructed similar to the "various" keys; 1079 is the rock lever for key 1078, mounted as are the rock levers of the "various" keys; and 1080 is a rearwardly extending link connecting rock lever 1079 to one of the side arms 1081 of the vertical rule frame. This frame consists of the two side arms 1081 pivoted on bar 1032 and supporting between them the universal bar or rod 1062.

When key 1078 is depressed it rocks lever 1079, which draws link 1080 forward, moving the vertical rule frame up until the rod 1062 has raised all the pawl arms 1057 into a locked position.

If any of the "various" keys is purposely or accidentally depressed while the machine is operating the machine will rule and split at a position corresponding to the key depressed, the vertical ruling printed, showing that carrying has been prevented.

The common functional mechanism

As heretofore stated, each of the "various" keys is adapted to partially control the performance of an individual function, in addition to the functions of splitting, vertical rule and column locking, which are common to all of the "various" keys. Certain identical mechanisms are associated with the several "various" keys for controlling the performance of their individual functions, and such mechanisms will now be described, reference being made to Figs. 3, 4, 61 and 66.

1082 represents a plurality of depending links, one for each "various" key, pivoted on rod 1032. Each link 1082 carries at its lower end a pin 1083 which secures it loosely to a pawl 1084 and a pawl-supporting arm 1085, both of which extend forwardly from pin 1083. Each pawl 1084 has an upper extension provided with a lateral finger 1086 and a lower extension provided with a rearwardly facing hook 1087. Each supporting arm 1085 is situated to the left of its respective pawl 1084 and has a lower finger 1088 which is bent to the right under pawl 1084 and up on the right side thereof. This bent-up portion of finger 1088 is connected to an ear on the front edge of link 1082 by a spring 1089 which normally holds arm 1085 and its pawl 1084 in their elevated position. The arm 1085 has also a forwardly and upwardly extending finger 1090 having a bent-over ear 1091, which ear rests against a cam face 1092 on the under edge of link 1018, which cam face normally acts as a stop to limit the upward movement of arm 1085 under the tension of spring 1089. The hook 1087 normally rests above and in front of a locking bar 1093 which is adapted to be swung forward to engage with hook 1087 when pawl 1084 is in its lower position.

1094 represents a spring extending from the bent-up side of finger 1088 to finger 1086, which spring holds pawl 1084 and arm 1085 in contact with each other so that they move as one piece.

When any one of the "various" keys is depressed its cooperating link 1018 is pulled forwardly (as previously described). The forward movement of link 1018 causes cam face 1092 to move forward against ear 1091, forcing down finger 1090. This moves arm 1095 down, drawing pawl 1084 with it by means of spring 1094, until hook 1087 stands directly in front of locking bar 1093.

When the specific functional key is now depressed it moves bar 1093 into engagement with hook 1087, drawing pawl 1084, arm 1085 and link 1082 forward, and the specific function of the particular "various" key depressed is thereby rendered operative, as explained hereinafter.

The mechanism whereby the locking bar 1093 is moved forward is constructed as follows:—

The locking bar 1093 is supported by rock arms 1095 pivoted on rod 1030. The bar 1093 and arms 1095 are preferably formed of a single piece of metal bent into the desired shape. 1096 (Fig. 50) represents the specific functional key. This key is provided with a pair of notches adapted to engage with the keyboard frame when depressed and moved forwardly, so as to hold said key in a depressed position. Instead of being pivoted to its rock-lever, an opening 1097 is cut in the side of the key 1096, which opening receives one arm of the rock lever 1098. 1099 represents a link connecting the lower arm of lever 1098 with one of the rock arms 1095.

When the key 1096 is depressed it turns lever 1098 about its pivot, pulling link 1099 with it, which draws arms 1095 forward, carrying with it the locking bar 1093.

Each of the links 1082 is connected; either directly by a link or indirectly by a yoke, an arm and a link; to the mechanism for the performance of the particular function controlled by its related "various" key, all as fully described in the parent application.

The column lock

Means are provided for locking any one or more of the columns so that any number key which is set in the selected column or columns will remain in its set or operative position during successive operations, automatically repeating the accumulating and/or printing of the set number, while the keys of the other columns remain under the control of the ordinary locking and releasing mechanism and are released during each operation. To accomplish this, the operator depresses the "various" key at the foot of and to the right of the column which it is desired to lock, or in the case of the units column depresses the split key 1050 (which controls this function in the units column) and, while said key is depressed, locks down the "column" lock key 1115, afterwards releasing the "various" key. The selected column will then repeat at each operation of the machine until the column lock key is released. The release of the column lock key renders the machine again normal. The mechanism for this purpose is illustrated in Figs. 1, 4, 8 and 52 to 57, inclusive, and is constructed as follows:

The upwardly projecting restoring lug 310, which has previously been described in the section entitled "Number key locking bar", is formed on the rear arm of rock lever 1100 mounted on the locking bar 290. Spring 314 connects the lower arm of lever 1100 with an arm of the tension finger 311, said spring constantly tending to raise lug 310. 1102 is a stop finger on lever 1100 which by engaging the underside of lock bar 290 limits the upward movement of lug 310. Pivoted on the pin 1015 are two rock arms 1103 and 1104 spaced apart by a washer 1105. The elements 1103, 1104 and 1105 are secured together by a rivet and move as one piece. The arm 1103, which is to the left of its companion arm 1104, is in the same plane with lever 1100, and has a lower front face which is positioned over the rear arm of said lever 1100 between the lug 310 and the pivot pin 309. The arm 1104 has an upwardly facing shoulder 1106 which engages normally with the under side of the top plate 274 of the keyboard frame to limit the upward movement of arms 1103 and 1104. 1107 represents a depending latch mounted on the side of arm 1104, said latch 1107 having a hook 1108 and a cam face 1109 on its front edge. A spring 1110 on latch 1107 has its other end attached to an ear on arm 1104 and tends to hold latch 1107 forward and arms 1103 and 1104 upward. The cam face 1109 cooperates with a finger 1111 on the rock lever 1013 of the "various" key to its right, or in the case of the units column with a similar finger on the rock lever of the split key, so that when one of the "various" keys or the split key is depressed it allows latch 1107 to move forward enabling the hook 1108 of latch 1107 to engage a bent over finger 1112 on a rock arm 1113. The rock arms 1113 of the several columns are pivoted on rod 278, which rod supports the front of the keyboard sections, and these arms extend forwardly from said rod, their front forked ends straddling the universal column lock bar or rod 1114.

When one of the "various" keys is depressed it swings finger 1111 forward allowing the latch 1107 to its left to move forward and engage its hook 1108 on finger 1112. The column lock key is now depressed, which swings the column lock bar 1114 down, as will be described hereinafter. The column lock bar 1114 rocks arms 1113, causing such fingers 1112 as are engaged by hooks 1108 to pull down the respective latches 1107 which carry with them the respective arms 1103 and 1104. Each arm 1103 so moved strikes its lever 1100, rocking it so that the lug 310 is depressed out of the path of the restoring finger 316, which finger passes idly over lug 310 at each subsequent operation of the machine, and the locking bar of the selected column is not restored to normal, so that the same key is held depressed during any desired number of successive operations of the machine.

After the column lock key is depressed, the "various" key or keys which have been depressed are released and move their fingers 1111 from the position shown in dotted lines (Fig. 54) to the position shown in full line in the same figure. The relative positions of the centers of the several moving parts are so arranged that the finger 1111 when returned to normal rests against the front face 1109 of the latch 1107 without moving the latch far enough rearward to disengage hook 1108 from finger 1112. When the column lock key is thereafter released, the latch 1107 is moved up by its spring 1110, and the face 1109 (being inclined) forces latch 1107 back to its normal position.

The mechanism whereby the column lock bar is depressed is constructed as follows:

1115, Fig. 53, represents the column lock functional key, which is situated at the left of the keyboard in front of the column of identifying shifting keys. The key 1115 has a lock similar to those of the "various" keys and the lower end of its shank is pivoted to the rear end of a rock arm 1116, the front end of which rock arm has a hub which is mounted on and pinned to the end of the short rock shaft 385. Said rock shaft is received in bearings in a boss formed on the front end of the filler section 273a of the keyboard frame, said filler section being situated between the section carrying the row of number keys of the highest order and the section carrying the identifying shifting keys. An arm of this filler section projects forwardly of the other sections of the keyboard and carries the boss above referred to at its forward end. Shaft 385, at the other end from that to which arm 1116 is secured and adjacent to the point where the universal correction arm 384 is mounted, has secured to it a rearwardly extending arm 1118 the rear end of which normally rests over a finger 1119, carried by one of a pair of side arms 1120. These arms 1120 are pivoted on the rod 278, which supports the front part of the keyboard frame sections, and support between them the column lock bar 1114 which bar receives the forked ends of rock arms 1113 as above described. 1121, Fig. 8, represents a spring which is secured to the right hand arm 1120 and serves to support arms 1120 and rod 1114.

When the column lock key 1115 is depressed it rocks arm 1116 and shaft 385, moving arm 1118 down upon finger 1119 of side arm 1120, thereby depressing the column lock bar 1114. As the column lock bar moves down it rocks all the rock arms 1113, but operates to lock only those columns whose latches 1107 have been allowed to move forward by the depression of their related "various" keys.

A washer 278a (Fig. 8) is mounted on shaft 278 and has a tongue which fits into a depression between the units keyboard frame section and the section containing the operating key. A similar washer is similarly mounted on rod 280. The purpose of these washers is to confine the mechanism at their right against axial movement.

Key control of carriage

As described in the patent application, the machine is provided with a transversely movable platen carriage carrying a swinging platen frame, platen rotating mechanism, line space counting device, signal device, etc. Said carriage is normally urged to the left by a barrel spring, but when it is desired to print alternately in two columns the carriage may be removed from the control of the spring and connected to be shifted by the main operating shaft 140. For example, it may be desirable to print numbers accumulated in the main totalizer in one column, and those accumulated in the auxiliary totalizer (by depressing the "auxiliary" key) in another column. The mechanism for this purpose is controlled by connections from the hook 1087 associated with the "two column" various key 1300 (Fig. 1). Again, it may be desirable to automatically alternate adding in the two totalizers and printing in two columns without the use of the "auxiliary" key. This is done through connections from the hook 1087 associated with the "alternator" various key 1437.

The carriage being under the control of the spring urging it to the left, means are provided, first for manually permitting the carriage to escape to a second columnar printing position, and second for automatically stepping the carriage from one columnar position to another upon each operation of the machine. The manual control of carriage escapement will now be described.

The column key

The carriage escapement mechanism, fully described in the parent application, is arranged to permit the movement of the carriage from one column to another when link 1264 (Fig. 60) is drawn upward. Link 1264 is supported at its upper end by the rear arm of a key lever 1265 pivoted loosely on the tie rod 11 and extending forwardly therefrom. The front end of lever 1265 is bent over under the lower end of the shank of the column key 1266, said column key being situated just forward from the repeat key (previously described).

When the column key 1266 is depressed, the shank thereof presses down on the front end of lever 1265 causing the rear end of said lever to raise link 1264, and causing the carriage to be released for moving a step or column space.

Column key prevents operation of the machine

Means are provided whereby the depression of the column key 1266 blocks the operation of the machine, and the operation of the machine prevents depression of the column key.

Should the column key be depressed when the machine is operating, the carriage might be moving during printing, thereby causing blurring and improper positioning of printing on the record sheet. To avoid such misoperation, mechanism is constructed as follows:—

The rock lever 976, (Figs. 8 to 15), (which has been described as operating the universal keyboard lock bar 340) has a finger 1267 which extends to the right of and then in back of the shank of the column key 1266 but only part way across the back of said key shank. 1268 represents a notch in the right-hand edge of the column key shank, said notch being normally in the same plane as the finger 1267.

The finger 1267 moves from its normal position into the notch 1268 every time the machine operates, thus locking the column key against depression until the lever 976 returns to normal position. When the column key is depressed the notch 1268 is moved down below the finger 1267, and if it is now attempted to operate the machine the finger 1267 is stopped by the shank of the column key, and the machine is blocked against operation.

Automatic column feed

The means whereby the carriage may be fed laterally at each operation of the machine, as shown in Figs. 1, 3 and 60, is constructed as follows:

1287 represents one of the "various" keys, the particular or individual function of which is automatic column feeding. By means previously described under "The common functional mechanism" this key is operatively connected with its respective depending link 1082, (Fig. 61.) The link 1082 is connected by a yoke 1288 with a link 1289 similar to link 1082 and situated in the power or right-hand section of the machine. Pivoted to link 1289 is a bar 1290 extending rearwardly therefrom and pivotally connected at its rear end to a latch 1291. Latch 1291 stands substantially vertical in the machine and carries a hook 1292 the mouth of which stands normally in rear of a pin 1293 projecting from the side of lever 1265 of the column key mechanism. Latch 1291 is pivoted at its lower end to the front arm of a rock lever 1294 and is so arranged that the upper face of its hook 1292 will act as a cam on pin 1293 to draw lever 1294 forward when said hook is drawn into contact with said pin. 1265ᵃ represents a spring from the column key lever to pin 1297 for holding said lever normal. 1295 represents a spring connecting latch 1291 with the rear arm of lever 1265, said spring tending to hold lever 1265 in its elevated position and latch 1291 in its rearmost position. 1296 represents a stop pin secured on and projecting laterally from frame 4 of the machine, said pin being positioned to limit the rearward movement of the link 1290. The lever 1294 has a rear finger 1296ᵃ which curves about a pin 1297, also secured to frame 4, said pin and finger cooperating to limit the movements of said lever 1294. The lever 1294 is pivoted on the tie rod 11 from which it depends. The lower end of lever 1294 is curved, forming a cam face 1298. 1299 represents a pin secured to the side of the scroll gear wheel 806 and carrying a roller. The spring 1295 in acting on latch 1291 forces lever 1294 into its rearmost position.

When it is desired to have the automatic column feed operative, the "various" key 1287 is depressed, following which the specific function key 1096 is depressed and locked down. By this means, as has already been described, the respective link 1082 is operated to swing yoke 1288 forward, carrying with it the lower end of link 1289. Link 1289 pulls bar 1290 forward, causing latch 1291 to move forward until its hook 1292 engages pin 1293, and lever 1294 is moved into its forward position as determined by finger 1296ᵃ and pin 1297. In its forward position the cam face 1298 stands in the path of the roller on pin 1299 of scroll gear 806. When the machine is thereafter operated, and near the completion of the operation of the machine, pin 1299 strikes cam face 1298, moving it rearwardly. This causes lever 1294 to pull latch 1291 down, which latch, by means of hook 1292 and pin 1293, pulls down the front end of lever 1265 of the column key mechanism. Lever 1265 (as has been previously described) will thereby allow the carriage to move a column space or step. The carriage is released for movement at approximately the time when the identifying shift keys are released.

Check numbers

It is at times desirable to print items alternately in two columns and at the same time preserve an accumulation of only those items printed in one column. This is particularly useful for banks, where it is desired to print check numbers in one column and check amounts in a second, and to preserve an accumulation of the check amounts but not of the check numbers. For this purpose means have been provided, as follows:

1st. For disengaging the alternator bar from the auxiliary key mechanism.

2nd. For neutralizing the accumulating mechanism when printing in the left or main column.

By these means, the accumulation of check numbers (which will be printed on the main or left-hand column) will be prevented, and the accumulation of check amounts (which will be printed in the auxiliary or right-hand column) will be caused to occur on the main accumulator. The mechanism for this purpose is controlled by connections from the hook 1087 associated with the "check numbers" key 1446 of the "various" keys, and rendered effective by the joint use of the check numbers key and the special function key 1096, all as fully described in the parent application.

*No print part of total*

When two lists of numbers are being simultaneously set up and added on the machine, for which purpose the splitting or dividing mechanism (described) has been provided, it is often desirable that the total of one list be printed, and that the total of the other list be not printed. For this purpose mechanism has been provided which is controlled by connections from the hook 1087 associated with the "no print part of total" various key 1479, and is rendered effective by the joint use of key 1479 and special function key 1096, all as more fully described in the parent application.

*Reserve key*

Different lines of business require calculating machines capable of performing different kinds of work, requiring the incorporation of special mechanism into the machine, and in order to control such mechanisms from the keyboard with little or no rearrangement of the latter a reserve controlling key 1740 (Figs. 1, 3 and 60) is provided, which key is arranged to be connected with any such additional mechanism. The shank of the key 1740 is adapted to impinge upon the forward end of a rock arm 1741 mounted on the tie rod 11, and is held in an elevated position by a spring 1742 attached to a finger on arm 1741 and to the part 1743 which anchors the spring of the repeat key mechanism. The arm 1741 may be connected by a yoke, link, or in any convenient manner, with the mechanism which it is desired to control; such as auxiliary column mechanism for causing printing to be done in the auxiliary column while adding on the main accumulator, carriage return mechanism, paper return mechanism, typewriter controlling, multiplication controlling, or controlling mechanism for any other desired function. A number of such functions are described in my prior application, Serial No. 721,141, filed September 19, 1912, now Patent No. 1,817,451, issued August 4, 1931.

*Typewriting mechanism*

Figure 64:
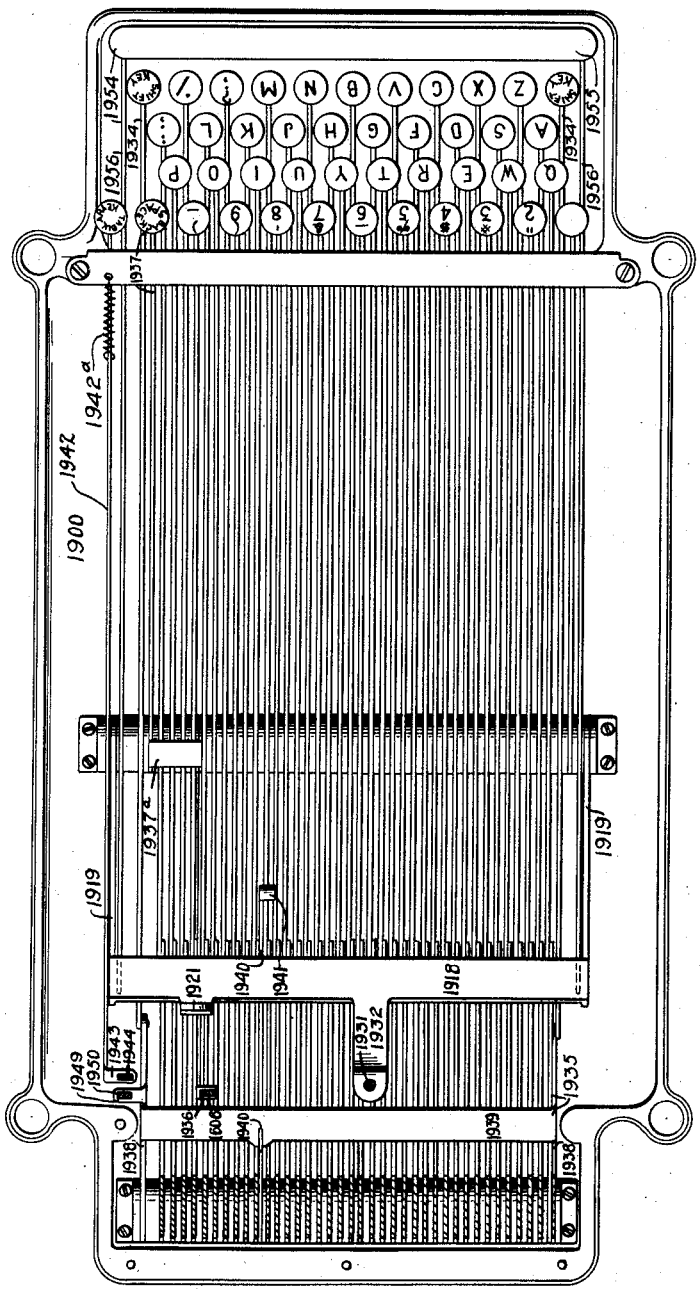
Fig. 64 is a horizontal view, partly in plan and partly in section, showing the typewriter key mechanism.

When it is necessary or desirable, in the operations of accounting or bookkeeping, to write the names of persons, articles of merchandise, months, places, weights, measures, or other words and sentences, this is accomplished by a typewriter mechanism similar to that illustrated in my Patent No. 1,817,451 heretofore mentioned. Such typewriting mechanism may be readily and easily attached to the calculating machine herein described, and which is so connected with the latter that a combined calculating and typewriting machine or a complete and unitary accounting and bookkeeping machine results. One form of such mechanism is as follows:

The typewriter frame 1900, see Figs. 62 and 64, consists of a hollow and substantially horizontal base casting 1901 on the rear end of which is secured a supporting standard 1902. On this base casting is seated the base of the previously described calculating machine or mechanism, and these two mechanisms may be secured in their definite working relation by any proper and desirable means, with the standard 1902 in rear of the carriage 1122 and curving forwardly over the platen 182. Suitable openings are provided through the base 1 for permitting the proper connections to be made between the working parts of the mechanisms carried by the bases or frames 1 and 1900 respectively.

The typewriter keyboard may be of any preferred construction and arrangement, being preferably provided with numerals, punctuations, signs or symbols, a space-bar, shift keys for the upper and lower cases types and tabulator and back-space keys. The construction and connections of these elements will be hereinafter described in detail.

A shaft 1904 is mounted within the hollow base 1901 and forms a pivotal support for the levers of the keys of said keyboard.

A shaft 1908 is supported in the rear end of the base 1901 and forms a pivotal support of a plurality of elbow levers 1909 which have forwardly extending arms 1910 and upwardly extending arms 1911. The arms 1910 each extend over a lateral finger 1912 on the rear end of its respective key lever, while the upper ends of these elbow levers are each pivotally connected by a link 1913 to an arm 1914 of a type bar 1915, the front end of which latter carries typewriter types; there being an upper and a lower case type for each type bar, a type bar for each key 1905, and as many links 1913 as there are type bars. The type bars 1915 are pivotally supported on pivots 1916 which are arranged in a curve within the concavity of the upper end of the standard 1902, and suitable means are provided for spacing the type bars apart and guiding them. The relation of the platen 182 and the type bars 1915 is such that when the platen is in its raised position, out of printing relation with the number types 145, it may be printed upon by the typewriter types on the type bars 1915, as follows:

When any of the typewriter keys 1905 is depressed its lever raises the free end of the respective arm 1910 and thereby swings rearwardly the free end of the arm 1911 and, through the medium of its link 1913, swings the type bar downward against the platen or against the record sheet carried thereby. Displaced type bars are returned to their normal position by their respective springs 1917, and in turn restore the levers 1909 and the levers of the keys 1905 to normal, assisted by the rebound of the types and by spring 1933. Any suitable inking device for the typewriter types may be employed.

*Universal connecting frame*

For the purpose of establishing a convenient and effective means whereby any and all of the keys 1905 control certain mechanisms of the calculating machine, and whereby these typewriter keys are affected by the calculating and number-printing mechanism, a universal bar 1918 extends laterally over the front ends of the arms 1910 and is supported by the latter and held against horizontal movement by two rock arms 1919 to which its ends are secured. These rock arms have their front ends connected to the shaft 1904 which constitutes the pivot about which they swing up and down with the universal bar when the typewriter keys are operated and raise the front ends of arms 1910. The universal bar 1918 and the rock arms 1919 constitute the universal frame.

Operation of calculating machine renders typewriting machine inoperative

For the purpose of preventing accidental or erroneous operating of the typewriting mechanism while operations of accumulating or of number-printing are being performed, mechanism is provided for automatically locking and preventing depression of the typewriter keys, as follows:

A forked blocking arm 1920 is pivotally mounted on and depends from the stud or pin 940, see Figs. 4 and 64, and its crotch normally stands over a finger 1921 which projects upward from the universal frame 1918—1919. The arm 1920 is formed with a rear fork or stop 1922 and a front fork or cam finger 1923, which latter stands at an incline. A pin 1924 is carried by the depending ratchet bar 929 and normally stands against the cam finger 1923 and holds the latter in its normal position; but when the accumulating mechanism or its number printing mechanism is operated the pin 1924 releases the cam finger 1923 and a spring 1925 swings the arm 1920 forward so that its stop 1922 stands over the finger 1921 and prevents it from being raised; thereby preventing the universal bar 1918, the front end of the arms 1910 and the rear ends of the typewriter key levers from being raised; so that the typewriter mechanism is rendered inoperative by the operation of the accumulating mechanism or by the number printing mechanism thereof. When the bar 929 again descends to its normal position its pin 1924 impinges upon the cam finger 1923 and releases the universal frame by moving the stop or blocking finger 1922 out of the path of the finger 1921.

Operation of typewriting machine renders calculating machine inoperative

For the purpose of preventing accidental or erroneous operating of the calculating and number-printing mechanism while any typewriting key is depressed, mechanism is provided as follows:

Pivotally mounted on the same pin 940 with the arm 1920, Figs. 62 and 63, is a depending stop arm or catch 1926 which is provided with a cam face 1927 and a shoulder 1928, the latter being normally held in its rearmost position by the spring 1925. When, however, a typewriter key is depressed, the lever of this key acts on the universal bar 1918 and thereby raises the finger 1921 against the cam face 1927 and forces the shoulder 1928 over the pin 1924, thereby preventing the bar 929 from rising when an attempt is made to operate the calculating mechanism or to operate the printing mechanism thereof; said bar 929 (Fig. 4) being connected, through the medium of the members 928, 926, 925 and 888, with the arm 887, which latter carries the roller 892 that actuates the cam arms 894, 946 and 966. By thus blocking the roller 892 against movement, these cam arms are not operated upon by said roller when either the operating key or operating lever is depressed, and the motor does not operate the calculating mechanism nor the printing mechanism thereof. When the depressed typewriter key is released, the finger 1921 descends and allows the spring 1925 to swing the arm 1926 backward to move its shoulder 1928 from over the pin 1924, so that now the bar 929 will be raised when either the operating key 741 or operating lever 775 is depressed. The tie rod 13 serves as a stop and a positioner for the arms 1920 and 1926 whose stop fingers 1929 and 1930, respectively, abut against said rod 13.

Letter spacing device renders calculating machine inoperative

In order that the typewriter machine may, without typewriting, cause the carriage 1125 to move step-by-step, a space key 1954, comprising a space-bar 1955 and space levers 1956, is provided. The shaft 1904 constitutes the pivotal support to which the space levers 1956 are connected. The rear ends of these levers extend under the universal bar 1918 and are thereby held in their normal position, said universal bar being normally held depressed by the spring-pressed plunger or pusher 1931. If desired, an additional spring may be suitably connected for holding the space key in normal position.

When the space key is depressed, the rear ends of its levers lift the universal bar, thereby lifting the stop or finger 1921 against the cam face 1927 so as to lock down the bar 929 by means of the pin 1924 and shoulder 1928, as more fully described under the previous heading "Operation of typewriting machine renders calculating machine inoperative".

Typewriter space key rendered inoperative by calculating machine

From the foregoing paragraph, in connection with the description under the heading of "Operation of calculating machine renders typewriting machine inoperative", it will be understood how the stop 1922 is swung over the finger 1921 and thereby prevents the universal bar from being raised or the space key from being depressed, while the calculating machine is operating.

The present application being directed to key mechanisms, descriptions and illustrations of many parts of the complete machine have been omitted, and reference is made to the parent application, Serial No. 16,636, filed March 24, 1915, for a complete disclosure. Furthermore, the specific mechanisms which have been described and illustrated are to be understood merely as representative embodiments of inventions which may take many other forms, all falling within the scope of the appended claims.

What is claimed is:

1. In a key controlled machine, the combination of a plurality of rows of keys, supporting means therefor comprising a separate section for each row, spring seats in each of said sections, pins passing through said spring seats and joining two adjacent sections, and a plurality of springs each connecting one of said keys to one of said pins.

2. In a keyboard, a plurality of keyboard sections joined together and each comprising a pair of bars spaced apart and connected together, a row of keys carried by each said keyboard section, and a spring connected to each key, each of said keyboard sections being provided with means for securing said springs on its edge and between said edge and the contiguous edge of the adjoining keyboard section.

3. In a keyboard, the combination of a plurality of keyboard sections arranged in contiguity with one another and each consisting of two bars connected together in spaced relation to each other and having key ways formed in their corresponding edges and cutting the planes of said edges; and a plurality of springs each formed with a loop and with means for connecting it to a key, one of said bars of one keyboard section being provided with studs on which the spring loops are seated, the adjacent edge of an adjoining keyboard section being provided with depressions for receiving the studs and the correlative spring loops.

4. In a keyboard, the combination of a plurality of keyboard sections arranged in contiguity with one another and each consisting of two bars connected together in spaced relation to each other and having key ways formed in their corresponding edges and cutting the planes of said edges; and a plurality of springs each formed with a loop and with means for connecting it to a key, one of said bars of one keyboard section being provided with studs on which the spring loops are seated, the adjacent edge of an adjoining keyboard section being provided with countersinks in which the respective spring loops are seated and into which the said studs extend beyond said loops, whereby said studs constitute dowels for aligning the keyboard sections in proper mutual relation while assembling the keyboard.

5. In a keyboard, the combination of a plurality of keyboard sections each consisting of a bar formed with two spaced plates and a web uniting the plates, said plates having key ways formed therein, means for securing said sections together so as to provide spaces between their webs, keys in said key ways, and a stop bar in each said space between the webs and correlated with the keys for being stopped by the latter.

6. The combination in a keyboard, of a beam provided with key ways and several spaced and staggered lugs, keys in the respective key ways, a stop bar associated with the keys, and a yieldable stop-bar-support consisting of a springy rod sprung into engagement with said staggered lugs.

7. The combination in a keyboard, of a beam provided with key ways and several spaced and staggered lugs, keys in the respective key ways, a stop bar associated with the keys, and a yieldable stop-bar-support consisting of a springy rod bent with its ends substantially at right angles to its intermediate portion and sprung into engagement with said staggered lugs so that its said end portions press up against said stop bar.

8. In a calculating machine, the combination of a keyboard frame section supporting a number key, a second keyboard frame section supporting a shifting key, and a third keyboard frame section interposed between the first said section and the second said section for supporting the mechanism operable by said shifting key for controlling said number key.

9. In a calculating machine, comprising controlling mechanism, controlled mechanism and transmission means connecting said mechanisms, the combination of a keyboard frame section supporting said controlling mechanism, a second keyboard frame section supporting said controlled mechanism, and a third keyboard frame section supporting said transmission means.

10. A key controlled machine comprising a plurality of banks of setting keys, an operating device for operating the machine according to the setting of said setting-keys; and means for preventing operation of the operating device when any of the setting-keys is only partly depressed and allowing said device to operate when all of the depressed keys are completely depressed, said means comprising an element extending transversely of said banks of keys and adapted to be moved in the direction of its length by said operating device, and means displaced by the depression of said keys co-operating with said element.

11. In a key controlled machine the combination of a plurality of keys, a bar mounted for longitudinal movement and being correlated with said keys, a second bar mounted adjacent to the first said bar and being correlated with the keys and adapted to be moved longitudinally, an arm pivoted on one of said bars and loosely connected to the other of said bars, and a spring connected to the arm and to a separate element of the machine.

12. In a key controlled machine, the combination of a plurality of keys, a bar mounted for longitudinal movement and being correlated with said keys, a second bar mounted adjacent to the first said bar and being correlated with the keys and adapted to be moved longitudinally, an arm pivoted on one of said bars and loosely connected to the other of said bars, a shoulder on one of said bars for contacting with the pivotally mounted arm, and a spring connected to said arm between said shoulder and the point at which the said arm is loosely connected as aforesaid.

13. In a key controlled machine, the combination of a plurality of setting keys, a separate locking key, a longitudinally movable bar correlated with said setting keys and locking key for preventing operation of the setting keys when the locking key is in its operative position, operating means for operating the machine according to the setting of said setting keys, a longitudinally movable bar correlated with said setting keys and said operating means for preventing operation of the machine when any one of the setting keys is only partially depressed, and spring-pressed means common to said bars for yieldingly detaining both of said bars in their respective normal positions and allowing one of said bars to be moved while detaining the other or allowing both of said bars to be moved simultaneously.

14. A key controlled machine comprising a plurality of rows of setting keys, an operating device for operating the machine according to the setting of the said setting keys; and means correlated with said keys and operating device for preventing the operation of the operating device when any one of said setting keys is only partly depressed and also for preventing any of the keys from being depressed during the initial part of the operation of the machine but allowing any of the keys to be depressed during a subsequent part of the operation of the machine, said means comprising a member associated with each of said rows of setting keys and displaced by the setting of any key of such row, and a bar extending transversely of said rows of setting keys and movable in the direction of its length into locking relation with said member by the initial movement of said operating device.

15. In combination with a row of setting keys and a mechanism to be controlled thereby, a stop bar cooperating with said setting keys for differentially controlling said mechanism according to the particular key of said row which is set, and means whereby said stop bar is first moved longitudinally and subsequently moved transversely for controlling said mechanism when co-operating with certain of said keys.

16. In combination with a row of uniformly spaced keys, a movable stop bar having thereon a set of stops each of which is arranged to be stopped by one of said keys and is normally spaced apart therefrom a distance which is different from the distance between every other key and its corresponding stop, said stop bar being formed with one of said stops offset from a straight line in which the other of said stops are arranged and being formed with a cam surface; and means against which said cam surface slides for moving the said stop bar so as to move the offset stop into the line priorly occupied by the other of said stops.

17. In a calculating machine, the combination of a reciprocating bar having a stop, a number key having a stem adapted to be moved toward said bar, means for moving said bar longitudinally, and means cooperating with the first said means for moving said bar transversely for causing the stem of said key to engage said stop to limit the longitudinal movement of said bar.

18. In a key controlled machine, an operating mechanism, a plurality of rows of keys for controlling operation of said operating mechanism, a universal key locking bar extending transversely of said rows of keys and adapted to be moved in the direction of its length by said operating mechanism to lock said keys, a universal correction key correlated with all of said rows of keys, and means co-operating with said bar for preventing the universal correction key from being depressed during the displacement of said bar by said operating mechanism.

19. In a key controlled machine, an operating mechanism, a plurality of rows of keys for controlling operation of said operating mechanism, a universal key locking bar extending transversely of said rows of keys and adapted to be moved in the direction of its length by said operating mechanism to lock said keys, a universal correction key correlated with all of said rows of keys, devices for preventing the universal correction key from being depressed during the displacement of said bar by said operating mechanism, said devices comprising a link associated with said universal correction key and moved thereby, and a surface on said universal key locking bar adapted to prevent the movement of said link by said universal correction key when said bar is displaced by said operating mechanism.

20. The combination of a plurality of rows of keys, a plurality of stop members each of which is common to the keys of one row and adapted to be stopped by any one of the keys of its row, operating means arranged to be controlled by the depression of any one of said keys, means for detaining the respective keys in their depressed position, means for releasing the detained keys of each row, a universal correction key correlated with all said keys in all of said rows, means for preventing operation of the machine by said operating means when any one of the keys is partly depressed, and a device for connecting the last said means with said universal correction key for preventing, during the first part of the operation of the machine by said operating means, the universal correction key from being depressed.

21. In a machine of the character described, in combination, a plurality of sets of setting keys, an operated mechanism, an operating mechanism for operating said operated mechanism in accordance with the control of said setting keys, a locking bar for each of said sets of setting keys for retaining any key of its set in depressed or set position, a plurality of levers having forked ends associated respectively with and adapted to displace said locking bars, a universal correction key, a bail actuated by said universal correction key and received in the forked ends of said levers, and means positively connected with said universal correction key and displaced thereby for blocking the movement of said operating mechanism.

22. The combination of a plurality of rows of keys, a plurality of stop members each of which is common to the keys of one of said rows and adapted to be stopped by any of the keys thereof, means for detaining the respective keys in their depressed position, means for releasing the detained keys of each row, a universal correction key correlated with all of said keys in all of said rows, operating means arranged to be controlled by said rows of keys, means for preventing operation of the operating means when any of the keys is only partly depressed, and a device for connecting the last said means with said universal correction key so the said operating means is thereby prevented from operating when said correction key is depressed.

23. In a machine of sectional construction, a separable keyboard section comprising a plurality of rows of keys; a plurality of lock bars, each arranged for locking any of the keys of one of said rows; a plurality of levers each having a depending arm, and each having an erect arm which is correlated with for moving the correlative lock bar; and a universal actuating member having a prehensile but separable engagement with the depending arms of the several levers, whereby said levers are readily separated from said actuating member when said keyboard is removed.

24. In a machine of sectional construction, a separable keyboard section comprising a plurality of rows of keys; a plurality of lock bars, each arranged for locking any of the keys of one of said rows; a plurality of members, each loosely connected to one of said lock bars; a plurality of levers, each having a depending arm, and each having an erect arm which is correlated with one of said members for moving the correlative lock bar; and a universal actuating member having a prehensile but separate engagement with the depending arms of the several levers, whereby said levers are readily separated from said actuating member when said keyboard is removed.

25. In a machine of sectional construction, a separable keyboard section comprising a plurality of rows of keys; a plurality of lock bars, each arranged for locking any of the keys of one of said rows; a plurality of levers, each having a depending arm and each having an erect arm which is correlated with for moving the correlative lock bar relatively to the keys; a pivot mounted under each of said lock bars for supporting its correlative lever; a universal actuating member having a prehensile but separable engagement with the depending arms of the several levers whereby said levers are readily separated from said actuating member when said keyboard is removed; and a universal correction key for actuating the universal actuating member.

26. In a calculating machine, the combination of a plurality of rows of number setting keys; a separate mechanism for each row of keys for securing said keys in a set position, each key being capable of releasing any other key of its respective row from its securing mechanism; a plurality of correction keys, one for each row of number keys and adapted to release any of the number keys of its respective row from their respective securing mechanisms; a universal correction key for releasing all of the number keys of all the rows from their securing mechanisms; operating mechanism for said machine; and means common to said number and correction keys for locking all of said keys against operation during the operation of said machine by said operating mechanism.

27. In a calculating machine, the combination of a plurality of rows of number setting keys; a separate mechanism for each row of keys for securing said keys in a set position; each key being capable of releasing any other key of its respective row from its securing mechanism; a plurality of correction keys, one for each row of number keys and adapted to release any of the number keys of its respective row from their respective securing mechanisms; a universal correction key for releasing all of the number keys of all the rows from their securing mechanisms; operating mechanism for said machine; and means common to said number and correction keys for locking all of said keys against operation during a portion of the operation of said machine.

28. In a calculating machine, the combination of printing types, a series of keys, a special key for causing one of the types to print a special sign, a bar for locking said series of keys and said special key when said machine is operating, said special key being operative for causing said bar to release any depressed key of said series without said special key itself remaining locked by said bar when the machine is inactive.

29. A sheet metal key lever formed with an axle-seat and with a key-contacting arm and a guide arm extending along different radii from its axle-seat.

30. A sheet metal key lever comprising an axle-seat, a curved and offset key-contacting arm, and a guide arm.

31. In a key controlled machine, the combination of a plurality of controlling keys; and a plurality of key levers one for each key and operable thereby, each key lever comprising guiding means for another key lever.

32. In a key controlled machine, the combination of two controlling keys, and two key levers operatively related to said keys, one of said key levers comprising a guide face and the other of said key levers comprising a guide lug, said guide face and said lug cooperating to guide both of said levers in their movements.

33. The combination in a calculating machine of an operable mechanism; a plurality of correlated keys and their associated mechanism each effecting the operation of said operable mechanism, said plurality of keys comprising two groups; a single key mechanism associated with the keys of one of said groups whereby setting of more than one of such keys is prevented; and a member operable by the setting of any of the keys of said second group to co-operate with said single key mechanism for preventing the setting of any key of the first group without preventing the setting of other keys of the second group.

34. In a key controlled machine, the combination of a set of keys; a set of wedges; a set of members each operable by one of said keys and each carrying one of said wedges; means operable by movement of each of said wedges under the influence of their respective keys when depressed for preventing depression of any other of said keys; a second set of keys; and a member common to all of the keys of said second set and carrying a wedge which is movable by any key of its set and cooperative with said means, when any key of its set is depressed, for preventing depression of any key of the first said set without preventing depression of other of the keys of said second set.

35. In a key controlled machine, the combination of a set of keys; a set of wedges; a set of substantially parallel links each operable by one of said keys and each carrying one of said wedges; means operable by movement of each of said wedges under the influence of their respective keys when depressed for preventing depression of any other of said keys; a second set of keys; and a link substantially parallel with the first said links and common to all of the keys of said second set and carrying a wedge which is movable by any key of its set and cooperative with said means, when any key of its set is depressed, for preventing depression of any key of the first said set without preventing depression of other of the keys of said second set.

36. In a calculating machine, in combination a key, a lever operated by said key, an operating mechanism, a second key, and means controlled by said second key adapted to operatively connect said lever with said operating mechanism.

37. In a calculating machine, in combination a key, a member operated by said key, an operating mechanism, a normally ineffective coupler adapted to couple said member to said operating mechanism, means for rendering said coupler effective comprising a control key and a selecting key.

38. In a calculating machine, an operating key having a plurality of shanks, a keyboard section comprising upper and lower plates and a plurality of bosses extending between said plates and guiding said shanks, a plurality of members connected to said shanks, operating mechanism for said machine, and means connected to one of said members for causing said operating mechanism to operate said machine.

39. In a calculating machine, the combination of an operating key, an operating shaft, means operable by the depression of said operating key for causing movement of said operating shaft, and means operable by said shaft for effecting a gradual return of said operating key.

40. In a calculating machine, the combination of an operating key, an operating shaft, means operable by the depression of said operating key for causing movement of said operating shaft, a member operable by said operating shaft, and a member operable by said operating key and cooperating with the first said member for effecting a gradual return of the operating key.

41. In a calculating machine, the combination of an operating key, an operating shaft, means operable by the depression of said operating key for causing movement of said operating shaft, a ratchet wheel secured to said operating shaft and operable thereby, and a ratchet bar cooperative with said ratchet wheel for restraining the return of the operating key.

42. In a calculating machine, the combination of a plurality of rows of number keys, a plurality of bars one for each row of number keys and adapted to be operated by any key of its respective row, a universal bar for locking all of the first said bars against operation, an operating member, and connections from said operating member to said universal bar whereby said universal bar is positively actuated by said operating member.

43. In a calculating machine, the combination of a plurality of rows of movable number keys; a device for locking all of said number keys against movement; a stop bar cooperative with each said row of keys; a plurality of detents, one for each of said stop bars; a device for operating all of said detents; a main operating shaft; a device for controlling movement of said operating shaft; an operating key; and a member operable by said operating key for controlling all three said devices.

44. In combination, a key controlled mechanism comprising an operated member, a connecting device associated with said member, a bar adapted to engage said connecting device and thereby move said operated member, a key and connections therefrom for operating said bar, a second key and connections therefrom for shifting said connecting device into operative relation with said bar.

45. The combination in a calculating machine of an operating device therefor, a plurality of sets of number keys, a plurality of controlling keys other than said number keys, a universal locking device for locking all of said keys by the manipulation of said operating device, a pivotally mounted connecting member comprising a member engaging with said universal locking device, a second pivotally mounted connecting member engaging with the first said connecting member, a third pivotally mounted connecting member loosely connected to the said second connecting member, said third connecting member being provided with a cam, and a connecting device carried by said operating device and provided with a roller which travels on said cam and cooperates therewith for rendering the operating device ineffective when any one of said keys is depressed a distance less than its full stroke.

46. In a calculating machine of sectional construction, the combination of a separable keyboard section, a plurality of rows of keys, a plurality of lock bars each arranged for locking any of the keys of one of said rows, a plurality of levers each having a depending arm and each having an erect arm which is correlated with for moving the correlative lock bar relatively to the keys, a pivot mounted under each of said lock bars for supporting its correlative lever, a universal actuating member having a prehensile but separable engagement with the depending arms of the several levers, to permit the removal of said keyboard section, operating means for said machine, and means operable by said operating means for operating said universal actuating member.

47. In a calculating machine of sectional construction, the combination of a separable keyboard section, a plurality of rows of keys, a plurality of lock bars each arranged for locking any of the keys of one of said rows, a plurality of levers each having a depending arm and each having an erect arm which is correlated with for moving the correlative lock bar relatively to the keys, a pivot mounted under each of said lock bars for supporting its correlative lever, a universal actuating member having a prehensile but separable engagement with the depending arms of the several levers to permit the removal of said keyboard section, operating means for said machine, and means operable by said operating means for operating said universal actuating member before said operating means has completed its operation.

48. The combination of a frame provided with a stop; mechanism supported by the frame; an operating lever; a member connected to the operating lever and carrying a stud, a spring-connection and a stop shoulder; an intermediate connecting device between said stud and said mechanism through which the latter is operated; and a spring secured to said spring-connection for moving said stop shoulder into contact with said stop.

49. The combination of mechanism to be operated; an operating lever therefor; a key and intermediate connections for operating said mechanism independently of the operating lever; and a loose connection between said key and said operating lever whereby the latter performs its work through the said intermediate connections of said key, substantially as specified.

50. The combination of mechanism to be operated; an operating lever therefor; a key and intermediate connections for operating said mechanism independently of the operating lever; a loose connection between said key and said operating lever whereby the latter performs its work through the said intermediate connections of said key; and means for returning said operating lever to its normal position irrespective of the position of said intermediate connections, substantially as specified.

51. The combination of mechanism to be operated, an operating lever therefor, an operating key, connections between the operating key and said mechanism whereby the latter may be operated independently of the operating lever, a shaft on which the operating lever is mounted, a crank arm on said shaft to rotate with said operating lever, a connecting lever having a cam pivotally mounted thereon in such relation to said crank arm as to be actuated thereby when the crank arm moves in one direction and to allow the latter to pass idly by said connecting lever in the opposite direction, and means for connecting said connecting lever with the said connections whereby the operating lever may perform its work through the same connections through which the operating key performs its work.

52. In a calculating machine, the combination of a plurality of normally ineffective devices, a key for rendering all of said devices effective, and a selecting key for retaining one of said devices in its effective position when released from the control of the first said key.

53. In a calculating machine, the combination of a plurality of controlling keys, a plurality of devices for each of said keys and movable thereby, a plurality of selecting keys, and mechanism cooperative with one of the devices of each of said controlling keys and operable by one of said selecting keys.

54. In a calculating machine, the combination of a plurality of controlling keys; a plurality of similar sets of dissimilar devices, one set for each of said keys and controllable by the latter; a plurality of selecting keys; and a plurality of members each cooperative with the similar devices of the several controlling keys and each operable by a separate selecting key.

55. In a calculating machine, the combination of a plurality of controlling devices; a member for simultaneously setting all of said controlling devices; and means, other than said member, for individually locking each of said devices in its set position.

56. In a calculating machine, the combination of a plurality of controlling devices, a key for setting all of said controlling devices, and a second key for locking one of said controlling devices in its set position.

57. In a calculating machine, a plurality of sets of function controlling devices, each set comprising devices for controlling functions similar to functions controlled by corresponding devices of the others of said sets; a plurality of keys associated respectively with said sets of controlling devices, each key being adapted to set all the controlling devices of the associated set; and a plurality of function locking keys, each associated with one function and each adapted to lock the device for performing said function which is set by any of said first-mentioned keys.

58. In a calculating machine, a plurality of sets of function controlling devices, each set comprising devices for controlling common functions similar to functions controlled by corresponding devices of the others of said sets, and each set comprising an individual function device; a plurality of keys associated respectively with said sets of controlling devices, each key being adapted to set all the controlling devices of the associated set; a plurality of common function locking keys, each associated with one of the common functions and each adapted to lock the device for performing said function which is set by any of said first-mentioned keys; and an individual function locking key adapted to render any of said individual function devices effective when set by its key.

59. In a calculating machine, the combination of a plurality of sets of controlling devices, a plurality of keys for setting said controlling devices; and a plurality of selecting keys each adapted to lock the devices of one set in set position.

60. In a calculating machine, the combination of a plurality of controlling devices, a member operable for setting said devices, and a member operable for locking said devices in their set position and in their unset position.

61. In a calculating machine, the combination of a plurality of sets of controlling devices, means for setting said devices, and a key for locking each set of devices in its set position and in its unset position.

62. In a calculating machine, the combination of a plurality of sets of controlling devices, means for setting said devices, and a key for locking in set position such of said devices as are set and locking in unset position such of said devices as are not set.

63. In a calculating machine, the combination of a plurality of setting keys; a locking bar for locking in a set position a key of said plurality; mechanism operable for releasing said keys from the locking bar at each operation of the machine; a device for rendering said mechanism ineffective; a key for setting said device; and a key for locking said device.

64. In a calculating machine, the combination of a plurality of setting keys; a locking bar for locking in a set position a key of said plurality; mechanism operable for releasing said keys from the locking bar at each operation of the machine; a device for rendering said mechanism ineffective; a key for setting said device; and a key for operating and locking said device.

65. In a calculating machine, the combination of a plurality of setting keys; a locking bar for locking in a set position any of said keys; operating means for operating said machine; mechanism operable by said operating means for releasing said keys from the locking bar at each operation of said operating means; a device for rendering said mechanism ineffective; a key separate from said plurality of keys for setting said device; and a key separate from all the other keys for operating and locking the said device.

66. In a calculating machine, the combination of a plurality of rows of setting keys; a plurality of locking bars, one for each row of setting keys and adapted to lock in a set position a key of its respective row; operating means for operating said machine; mechanism operable by said operating means for releasing all of the locked keys from said locking bars at each operation of said operating means; a device for rendering said mechanism ineffective; a plurality of keys for setting said device; and a key for operating said device and locking said device in its operated position.

67. In a calculating machine, the combination of a plurality of rows of setting keys; a plurality of locking bars, one for each row of setting keys and operable for locking in a set position a key of its respective row; a plurality of shoulders, one movably secured to each locking bar; operating means for said machine; mechanism controllable by said operating means and correlated with said shoulders for releasing the locked keys from said locking bars at each operation of said operating means; devices for individually rendering said mechanism ineffective with regard to said locking bars; a plurality of keys, one for each locking bar for individually setting the said devices; and a key for universally operating the individual devices.

68. In a calculating machine, the combination of a plurality of rows of setting keys; a plurality of locking bars, one for each row of setting keys and operable for locking in a set position a key of its respective row; operating means for said machine; mechanism operable by said operating means for releasing the locked keys from said locking bars at each operation of said operating means; devices for individually rendering said mechanism ineffective with regard to said locking bars; a plurality of keys, one for each locking bar for individually setting the said devices, and a key for universally operating the individual devices.

69. In a calculating machine, the combination of a plurality of rows of setting keys; a plurality of locking bars, one for each row of setting keys and operable for locking in a set position a key of its respective row; a plurality of shoulders, one carried by each locking bar; operating means for said machine; mechanism operable by said operating means and cooperative with said shoulders for releasing the locked keys from said locking bars at each operation of said operating means; devices for individually rendering said mechanism ineffective with regard to said locking bars; a plurality of keys, one for each locking bar for individually setting the said devices; and a key for universally operating the individual devices.

70. In a calculating machine, the combination of a plurality of rows of setting keys; a plurality of locking bars, one for each row of setting keys and operable for locking in a set position a key of its respective row; a plurality of rock levers, one pivoted to each locking bar; operating means for said machine; mechanism operable by said operating means and cooperative with said rock levers for releasing the locked keys from said locking bars at each operation of said operating means; devices for individually rendering said mechanism ineffective with regard to any of said locking bars; a plurality of keys, one for each locking bar for individually setting the said devices; and a key for universally operating and locking the individual devices.

71. In a calculating machine, the combination of a plurality of rows of setting keys; a plurality of locking bars, one for each row of keys and adapted to lock in a set position any of the keys of its respective row; an operating mechanism; means normally connecting each locking bar with the operating mechanism; a plurality of controlling keys, one for each row of setting keys; mechanisms each settable by a separate one of said controlling keys and adapted to disconnect a different one of said locking bars from its connecting means; and a key separate from said setting and controlling keys for positioning and locking any of said mechanisms in disconnected position.

72. The combination with a plurality of number setting keys and a locking bar for locking any of said keys in a set position, of a member movably secured to said locking bar and carrying a releasing lug, a releasing lever adapted to contact with said lug when said lug is in its normal position, normally inoperative means for causing relative movement of said lug and said releasing lever for rendering said lever ineffective, a key for rendering the last said means operative, and a key for operating the last said means.

73. The combination with a plurality of rows of number setting keys and a plurality of locking bars one for each row of said keys and each adapted to lock any of the keys of its row in set position; of a plurality of members, one for each of said locking bars and movably secured thereto and each carrying a releasing lug; a plurality of releasing levers, one for each locking bar and each adapted to contact with the releasing lug of its respective locking bar when said lug is in its normal position; a plurality of normally inoperative devices for causing relative movement of the respective lugs and their cooperating releasing levers and thereby rendering said levers ineffective; a plurality of keys, one for each of said devices and each adapted to render its particular one of said devices operative; and a key for operating any of said devices when they have been rendered operative.

74. In a calculating machine, the combination of a plurality of keyboard frame sections, a plurality of number keys carried by each of said frame sections, a device for each said section for locking the keys carried thereby, and a plurality of controlling keys one carried by each said section and operatively related to the locking device of the next adjacent section.

75. In a calculating machine, the combination of a plurality of keyboard frame sections; a plurality of number keys carried by each of said frame sections; a plurality of controlling devices, one for each frame section and carried thereby and cooperative with the number keys thereof; and a plurality of controlling keys, one for each frame section and cooperative with the controlling device of an adjacent frame section.

76. In a calculating machine, the combination of an operating mechanism, a releasing device therefor, a carriage, a key for causing movement of said carriage, and means correlated with said releasing device and said key for locking one when the other is displaced and maintaining the locked condition throughout such displacement.

77. In a calculating machine, the combination of an operating mechanism, a releasing device therefor, a carriage, a key for causing movement of said carriage, and means correlated with said releasing device and said key for locking either when the other is displaced and maintaining the locked condition throughout such displacement.

78. In combination, a settable control key effective when set to perform a function, a selecting and locking key for continuing said function when said control key is restored to normal position, and a function selecting key rendered effective by the depression of said control key to perform an additional function.

79. In combination, a control key for controlling a plurality of functions, means whereby said key alone controls certain of said functions, a selecting key, and means whereby the joint operation of said control key and said selecting key effects the performance of an additional function.

80. In combination, a control key and a selecting key, means whereby operation of said control key alone performs a function, means whereby the joint operation of said control key and said selecting key performs an additional function, and means for eliminating the first function and performing the second function only.

81. In a calculating machine, in combination, a control key, connections from said key for performing a function, a selecting key, a normally ineffective connection from said selecting key for performing a second function, and means controlled by said control key for rendering said connection effective.

82. In combination, a plurality of controlling keys, means whereby each of said keys performs a plurality of functions which are similar respectively to the functions of others of said plurality of keys, normally ineffective means associated with each of said keys for performing an individual function, and an individual function key for rendering said individual function means effective.

83. In a calculating machine, in combination a control key, mechanisms controlled by said key for independently effecting a plurality of functions, and a plurality of selecting keys for determining which of said functions shall be effected by said control key.

84. In a calculating machine, in combination a settable control key, a plurality of settable function selecting keys, and means whereby said function selecting keys control a function determined by the setting of said control key after said control key has been restored to unset position.

85. In a calculating machine, the combination of a plurality of controlling keys; a plurality of separate mechanisms, one for each of said keys and operatively related thereto; means whereby each of said keys renders its respective mechanism capable of being set, and universal means for setting all of said mechanism.

86. In a calculating machine, the combination of a plurality of mechanisms independent of one another, a universal member for setting all of said mechanisms in their respective operative positions, a plurality of mutually similar members each operatively connected to a corresponding one of said mechanisms and normally out of operative relation with said universal member, a plurality of keys one for each of said mutually similar members and each adapted to move its respective similar member into a position to be engaged by said universal member, and means for moving said universal member into operative connection with such of said plurality of members as have been moved by their respective keys.

87. In a calculating machine, the combination of a plurality of mechanisms independent of one another, a universal member for setting all of said mechanisms in their respective operative positions, a plurality of mutually similar members each operatively connected to a corresponding one of said mechanisms and normally out of operative relation with said universal member, a plurality of keys one for each of said mutually similar members and each adapted to move its respective similar member into a position to be engaged by said universal member, a key separate from said plurality of keys, and means operable by said key for moving said universal member into operative connection with such of said plurality of mutually similar members as have been moved by their respective keys of said plurality of keys.

88. A key controlled machine comprising a plurality of banks of setting keys, an individual bar cooperating with the keys of each bank and adapted to be displaced by the depression of any key of said bank and restored to normal position when the key is fully depressed, an operating device for operating the machine according to the setting of said setting keys, a key locking bar extending transversely of said banks of setting keys and adapted to be displaced in the direction of its length by said operating device, cooperating means on said individual bars and said transversely extending bar whereby movement of said operating device is prevented during the displacement of said individual bars and movement of said individual bars and their associated keys is prevented during the displacement of said transversely extending bar.

89. In a calculating machine, the combination of an operating mechanism, a depressible operating key for effecting the operation of said operating mechanism, means for returning said key to normal elevated position, means for restraining the return of said operating key by said returning means, and means actuated by said operating mechanism for rendering the restraining means ineffective.

90. In a calculating machine, the combination of an operating mechanism, a depressible operating key for effecting the operation of said operating mechanism, means for returning said key to normal elevated position, means for restraining the return of said operating key by said returning means, means for rendering the restraining means ineffective, and automatic means for rendering said restraining means again effective.

WILLIAM S. GUBELMANN.